United States Patent [19]

Kawahara et al.

[11] Patent Number: 5,506,629
[45] Date of Patent: Apr. 9, 1996

[54] PROJECTING-TYPE DISPLAY APPARATUS

[75] Inventors: Kan Kawahara; Shigeru Takeuchi; Toshitaka Tachibana; Fusaaki Yamada, all of Nagaokakyo, Japan

[73] Assignee: Mitsubishi Denki Kabushiki Kaisha, Tokyo, Japan

[21] Appl. No.: 268,167

[22] Filed: Jun. 29, 1994

[30] Foreign Application Priority Data

| Jul. 2, 1993 | [JP] | Japan | 5-164619 |
| Oct. 26, 1993 | [JP] | Japan | 5-267268 |
| Dec. 24, 1993 | [JP] | Japan | 5-327769 |

[51] Int. Cl.⁶ .................................................. H04N 5/74
[52] U.S. Cl. ............................ 348/776; 348/827; 348/785
[58] Field of Search ................................. 348/744, 745, 348/748, 749, 750, 776–788, 825–827; 353/100, 101; 313/36, 478; 359/819, 822, 823, 826, 827; H04N 5/655, 5/64, 5/645, 9/31, 5/74

[56] References Cited

U.S. PATENT DOCUMENTS

| 3,037,072 | 5/1962 | Mendoza et al. | 348/748 |
| 4,606,628 | 8/1986 | Vance | 348/785 |
| 5,298,984 | 3/1994 | Numata | 348/778 |

FOREIGN PATENT DOCUMENTS

| 4011475 | 1/1992 | Japan | H04N 5/74 |
| 4-131080 | 12/1992 | Japan | |
| 5-48484 | 6/1993 | Japan | |
| 5227503 | 9/1993 | Japan | H04N 5/74 |
| 5268554 | 10/1993 | Japan | H04N 5/74 |

Primary Examiner—James J. Groody
Assistant Examiner—Michael H. Lee
Attorney, Agent, or Firm—Birch, Stewart, Kolasch & Birch

[57] ABSTRACT

Projecting-type display apparatus, wherein an image forming means frame is supported in such a manner as to be rotatable within a first plane perpendicular to an optical axis of a projection lens, and within a second plane including the optical axis and perpendicular to the first plane. A projecting-type display apparatus comprising means for changing the distance between an image forming means frame and a lens frame continuously or stepwise. A projecting-type display apparatus comprising means for changing the field angle of a projection unit having image forming means and projection lens with respect to a sreen cointinuously or stepwise.

33 Claims, 89 Drawing Sheets

PROJECTING-TYPE DISPLAY APPARATUS

BACKGROUND OF THE INVENTION

1. Field of the Invention

The invention relates to a projection-type display apparatus adapted to magnify and project an image generated from image forming means such as a CRT (Cathode-Ray Tube) onto a screen with the use of a projection lens system.

2. Description of Related Art

Conventionally, a color projection-type display apparatus having three, namely, red, green, and blue projection units 183x, 183y, and 183z as shown in a plan view of FIG. 1 has been well known. An optical axis 128k of the central projection unit 183y is at right angles to a screen 199 in the horizontal direction, while that of each side projection unit 183x, 183z is inclined a field angle θ1 to cross at the central portion of the screen 199. In order to focus the image all over the surface of the screen 199, in each of the side projection units 183x and 183z, a tube axis 121k of a projection tube 121 is inclined to the optical axis 128k of a projection lens 128 (by a tilt angle θ2 between the tube axis 121k and the optical axis 128k). In the case where the projection units 183 are inclined also in the vertical direction, the tube axis 121k of each projection tube 121 is vertically inclined to the optical axis 128k of the respective projection lens 128.

Meanwhile, for the application to a variety of models having different projection distances and screen sizes, the relative angle of the projection tube to the projection lens is necessary to be changed in a projecting-type display apparatus. Similary, in a projecting-type color display apparatus consisting of three projection units for red, green, and blue colors, the above relative angle should be set separately for each projection unit so as to meet the difference in the refractive indexes of the projection lenses.

As such, the projecting-type display apparatus has conventionally been so constructed as to be conformed to various kinds of projection units or different size of the screen that uses a common spacer block and separates a projection tube frame for holding a projection tube and a lens frame for holding a projection lens, thereby changing the relative angle between the frames.

FIG. 2 shows a diagrammatic transverse sectional view showing one projection unit of the projecting-type display apparatus disclosed in, for example, Japanese Utility Model Application Laid-Open No. 60-61881 (1985). A reference numeral 121 indicates a projection tube such as a CRT or the like, and 128 is a projection lens having a plurality of lens elements.

The projection lens 128 is held by a lens frame 153 having a through hole 128d in conformity with the outer peripheral shape of light at the entering side. A plurality of through holes 153v penetrating in the optical axis direction of a projection unit 183 are disposed at predetermined positions of the lens frame 153. Connecting bolts 104 each having a threaded portion 104a formed at the front end thereof are fitted with nuts 105 via washers 103 in the through holes 153v. The lens frame 153 is fixed by screws 163 to a fixing angle bar 170 to which the projection unit 183 is to be secured.

The projection tube 121 is fitted into a pressing plate 198 which is rigidly supported by screws 106 to a projection tube frame 151. In the projection tube frame 151, threaded holes 151m are opened at positions respectively opposite to the through holes 153v. The projection tube 121 is coupled to the projection lens 128 when the threaded portions 104a of the connecting bolts 104 are meshed into the threaded holes 151m of the projection tube frame 151. Since a plurality of connecting bolts 104 are rotated independently, the projection tube frame 151 can be inclined an arbitrary angle to the lens frame 153.

In the thus-configured projection unit 183, an image formed by the projection tube 121 is magnified and projected by the projection lens 128 to obtain a large screen. As shown in FIG. 1, generally, three sets of projection units 183 for red, green, and blue colors and each consisting of the projection tube 121 and the projection lens 128 are provided, so that images from the three projection units 182x, 183y, and 183z overlap with each other to form a color image on the screen 199.

As described above, in each projection unit 182x, 183y, and 183z, the tilt angles must be adjusted and the adjustment is realized by rotating the connecting bolts 104 thereby to incline the projection tube frame 151. This allows the tube axis 121k of the projection tube 121 to shift in an arbitrary direction from the optical axis 128k of the protection lens 128. Consequently, the distance S between a lens face 128b of the projection lens 128 and a display face 121c of the projection tube 121 can be adjusted in the vertical and lateral directions of the screen 199, whereby the image is projected in optimum focus to the screen 199.

In the above-mentioned arrangement, however, the rotating center of connecting bolts 104 incline the projection tube with respect to the projection lens may not be constant, or the distance between the projection lens and the projection tube may be changed, thus obstructing the focusing function. Since the air is present between the projection lens and the projection tube, moreover, the arrangement has a drawback that the light emitted from the projection tube is irregularly reflected before entering the projection lens, deteriorating the contrast.

As another prior art example, FIG. 3 shows a section view of a projection unit of a projecting-type display apparatus disclosed in Japanese Patent Application Laid-Open No. 5-40309 (1993). A projection tube 121 is attached to a projection tube frame 151 in the watertight state. An outer peripheral wall 151g of the projection tube frame 151 is formed into a spherical surface, and fitted into a holding portion 161 having a curved guide 161a in such a manner that the projection tube frame 151 is rotatable to the holding portion 161. On the other hand, a projection lens 128 is attached to a lens frame 153 in the watertight state. An outer peripheral wall 153g of the lens frame 153 is a spherical surface, and fitted into the curved-face guide 161a of the holding portion 161. The lens frame 153 is rotatably mounted to the holding portion 161.

A reference numeral 155 indicates a bellows functioning as a coupler which connects the projection tube frame 151 with the lens frame 153 in the watertight state. A cooling liquid 132 is filled in an inside space 131 of the bellows. The inclining angle of the projection tube frame 151 to the lens frame 153 is adjusted by an adjusting screw 164 which passes through the projection tube frame 151 and is meshed with the lens frame 153.

In the thus-constructed projection unit 183, as a display face 121c of the projection tube 121 is heated to considerably high temperatures when an image is projected, the heat is transmitted via the cooling liquid 132 to the lens frame 153 and the projection tube frame 151 made of aluminum having excellent heat-conduction properties, to be radiated from the frames.

For the cooling liquid 132, for instance, ethylene glycol, silicone, or the like is used. Since these kinds of material have a refractive index of the same level as that of glass forming the projection tube 121 and the projection lens 128, the cooling liquid 132 is also effective to prevent the light from the projection tube 121 from being irregularly reflected, in addition to dissipate the heat. Therefore, the deterioration of the contrast of an image projected by the projection lens 128 is prevented, with high luminance achieved.

In the projection unit of the aforementioned type, the tilt angle θ2 of each project,on unit 182x, 183y, 183z in the horizontal direction, and in the vertical direction is changed by rotating the adjusting screw 164, and the focus is properly met both at the center and periphery portions of the screen.

However, the prior art apparatus has a disadvantage in that an inclination reference point used to adjust the tilt angle is an imaginary point and therefore an inclination point cannot be verified. Since the inclination guide slides on a face, the frictional resistance is large. Moreover, when the optical axis is adjusted by using a spherical guide, the guide should be processed with high accuracy so as to fit the concave and convex faces, which increases processing costs. Furthermore, since the apparatus cannot be assembled without dividing the holding portion thereoutside, not only processing accuracy, but assemblying accuracy is required.

FIG. 4 is a section view showing the main portion of a projection unit of a prior art projecting-type display apparatus revealed in Japanese Utility Model Application Laid-Open No. 2-41979 (1990), and FIG. 5 is an exploded perspective view of the projection unit. A reference numeral 201 indicates a projection tube, and 202 designates a spacer block made of a material such as diecast aluminum of superior heat-conduction properties. A wall portion 202a, and a boss portion 202c having threaded holes 202b are formed at, one side of the spacer block 202 to which the projection tube 201 is attached. A pressing plate 203 is fitted to the projection tube 201. The pressing plate 203 has a contact hole 203a butting against an outer peripheral wall 201a of the projection tube 201, and mounting holes 203b respectively located at four corners of the plate 203. The mounting holes 203b of the pressing plate 203 correspond to the boss portion 202c of the spacer block 202. A post 204 with a spring 205 in the outer periphery is inserted in each of the mounting holes 203b into touch with the boss portion 202c. A screw 207 passing through a washer 206 runs is passed through the post 204 and is fitted into the corresponding threaded hole 202b of the boss portion 202c. In consequence, the projection tube 201 is pressed to the spacer block 202 while being uniformly pressed thereto by the pressing force of the springs 205. A deflection yoke 208, a focus magnet 208, and a CRT board 210 are attached to the projection tube 201.

On the other hand, a barrel 211a of the projection lens 211 is attached to the other side of the spacer block 202 by screws 212. A projection tube packing 213 is disposed between a display face 201b of the projection tube 201 and a projection tube mounting face 202d of the spacer block 202, and a lens packing 214 is set between a lens face 211b of the projection lens 211 and a lens mounting face 202e of the spacer block 202. A space 215 defined by the projection tube 201, the projection lens 211, and the spacer block 202 is kept to be in the watertight state and filled with a cooling liquid 216 such as ethylene glycol and so on. An expansion content produced when the cooling liquid 216 thermally expands is accommodated in a tank 217. The cooling liquid 216 blocks the light emitted inside the display face 201b of the projection tube 201 not to return to the fluorescent screen, thereby preventing the contrast of a projection image from being degraded. The heat which, when the projecting-type display apparatus operates, is generated at the display face 201b of the projection tube 201 is transmitted via the cooling liquid 216 to the spacer block 202, to be discharged outside.

The prior art apparatus in FIG. 4 is constituted of three projection unit, and therefore requires three kinds of spacer blocks 202. In applying the apparatus to different projection distances and screen sizes, it is required to manufacture spacer blocks 202 of different sizes, increasing the design time or costs of die casting molds.

The mounting posture of the projection tube 201 with respect to the projection lens 211 depends on the processing accuracy of the spacer block 202. Even if the apparatus is enormously assembled, no correcting means is provided in the prior art.

FIG. 6 is a section view showing the main portion of a projection unit of a projecting-type display apparatus discussed in Japanese Patent Application Laid-Open No. 43-52141 (1992), and FIG. 7 is a partial enlarged view of the projection unit. In the figures, a projection tube 201 is mounted in the watertight state to one side of a projection tube frame 218 via a first O-ring 219 installed in an annular groove 218a formed in the periphery of an opening of the projection tube frame 218. On the other hand, a projection lens 211 is attached in the watertight state at one side of a lens frame 220 via a second O-ring 221 in an annular groove 220a formed at the peripheral edge of an opening of the lens frame 220.

Between the projection tube frame 218 and the lens frame 220, a cylindrical bellows 222 made of a metallic material containing iron such as stainless steel and urged in the axial direction is attached in the following manner: Rings 223 and 224 which have a plurality of mounting holes 223a and 224a separated a distance in the circumferential direction and function as mounting flanges are welded to both ends of the bellows 222. The ring 223 is held in the watertight state at the other side of the projection tube frame 218 via a third O-ring 225 which is disposed in an annular groove 218b formed at the peripheral edge of the opening of the projection tube frame 218, by tightening the mounting holes 223a of the ring 223 by screws 226. Similarly, the ring 224 is supported in the watertight state at the other side of the lens frame 220 via a fourth O-ring 227 set in an annular groove 220b at the peripheral edge of the opening of the lens frame 220, when the mounting holes 224a of the ring 224 are screwed by screws 228. A cooling liquid 216 is filled in the space in the watertight state. According to the above arrangement, the heat of a display face 201b of the projection tube 201 heated to very high temperatures is transmitted via the cooling liquid 216 to the spacer frame 202 made of diecast aluminum showing excellent heat conduction properties, and dissipated from the spacer.

The lens frame 220 is slidably supported by a holding portion 229 having a spherical face in touch with the frame. The projection tube 218 is coupled to the holding portion 229 by an adjusting mechanism 232, so that the relative angle of the projection tube 218 to the holding portion 229 is variable.

FIG. 8 is a diagram showing the projecting-type display apparatus having three projection units 234 configured as described above with reference to FIGS. 6 and 7. In the same manner as in the apparatus shown in FIG. 1, the center projection unit 234 is disposed at right angles to a screen 235, and the side projection units 234 are inclined to the screen 235 by the field angle θ1. In each side projection unit 234, a projection tube block 230 comprising the projection tube 201 attached to the projection tube frame 218 via the first O-ring 219 is disposed with the tilt angle θ2 to a lens block 231 in which the projection lens 211 is fitted to the lens frame 220 via the second O-ring 221. The tilt angle θ2 is adjusted by the adjusting mechanism 232. Accordingly, images from the three projection units 234 overlap with each other on the screen 235, and the focus is not even at the periphery portion of the screen.

In the prior art apparatus, although the relative position between the projection tube 201 and the projection lens 211 is adjusted by the adjusting mechanism 232, it is important to maintain the space 215 in the watertight state during the time so as to prevent the cooling liquid 216 from leaking. However, the cooling liquid 216 is sealed at four points in the apparatus and, four sealing members are requited. In other words, there are four potentially dangerous points to leak the cooling liquid 216, making the apparatus inferior in terms of costs and reliability.

When the bellows 222 is to be fixed by the screws, either the projection tube frame 218 or the lens frame 220 obstructs the fixing work, lowering the efficiency. Since the bellows 222 is made of a metal, the bellows lacks flexibility, and the volume of the bellows cannot be changed even when the cooling liquid 216 expands by the heat of the projection tube 201. Further, the distance between the projection tube frame 218 and the lens frame 220 should be secured long to mount the bellows 222.

FIG. 9 is an exploded perspective view showing a projection unit of a prior art projecting-type display apparatus, and FIG. 10 is a side section view of the projection unit. A projection tube 1 such as a CRT or the like as image forming means is held by a substantially box-like unit base 6 having a rectangular front opening into which the projection tube 1 is to be fitted. A face portion 1a of the projection display apparatus is fixedly bonded to a CRT cover 40 having a recessed portion slightly smaller than the face portion la, and a flange 40a surrounding the recessed portion. More specifically, the face portion 1a is fixed in the fluid-tight state to the recessed side of the CRT cover. A cooling liquid 9 is filled in a space 7 defined by the face portion 1a and the recessed portion.

In the figures, a projection lens 2 magnifies and projects an image formed by the projection tube 1. The projection lens 2 is screwed to a lens bracket 41. The lens bracket 41 and the CRT cover 40 are fixed to the unit base 6 by sending four stud bolts 42 erected in the vicinity of four corners of the opening of the unit base 6 through holes formed at the four corners of each of the lens bracket 41 and the CRT cover 40, and then fastening the bolts with nuts 43. Spacers 44 and 45 in a wedge-shaped section of a different thickness are held between the CRT cover 40 and the unit base 6 in a manner to decrease the thickness to the inner side.

One projection unit is thus comprised of the projection tube 1 and the projection lens 2 assembled as above. In general, a projecting-type color display apparatus includes, three, i.e., red, green, and blue projection units attached to the unit base 6. In FIGS. 9 and 10, only one projection unit for red color is illustrated.

FIG. 11 is a diagram showing the main portion of a projecting-type display apparatus having three sets of projection units. The red, green, and blue projection units R, G, and B are arranged in this sequence in such a manner that the optical axes thereof cross each other at the center of a screen 99. The light emitted from the green projection unit G which is disposed at the center of the units enters the surface of the screen 99 at right angles. The light from the red projection unit R set at the left side in a plan view, and that projected from the blue projection unit B at the right side enter the surface of the screen 99 at a required field angle θ1. In order to bring the peripheral portion of an image into focus, the projection tube 1 is so arranged as to assume the tilt angle θ2 to the optical axis of the projection lens 2. For attaining the required field angle θ1, each of the red and blue projection units R and B uses a pair of spacers 44 and 45 of a different thickness as shown in FIGS. 9 and 10, while the green projection unit G employs a pair of spacers having the same thickness.

In the thus-configured projecting-type display apparatus, images formed by the projection tubes $1_R$, $1_G$, and $1_B$ are magnified and projected by the respective projection lenses $2_R$, $2_G$, and $2_B$ thereby to form an image on the screen 99.

Generally, the field angle θ1 and the tilt angle θ2 are adjusted at the manufacturing stage of the apparatus in the configuration shown in FIG. 11, that is, the apparatuses are manufactured separately for each screen size and each projection distance. In such prior art projecting-type display apparatuses as above, the field angle θ1 is changed by replacing the spacers with spacers of another combination of thickness after loosening the bolts 43.

When the field angle θ1 is to be changed in the aforementioned method, it is necessary to prepare spacers of different combinations of thickness, and therefore the number of parts is increased. In the case where the projecting-type display apparatus is to be finely adjusted at the installing site of the apparatus, the worker is obliged to carry spacers of various kinds of thickness. Although the field angle θ1 is required to be changed minutely, because of the small difference in thickness of the spacers, it, is difficult for the worker to detect the screen size and the projection distance of the subject projecting-type display apparatus.

The projection lens 2 and the projection tube 1 are fastened by the common nuts 43. When the nuts 43 are loosened to replace the spacers 44 and 45, the projection lens 2 and the projection tube 1 become unstable, leading to unexpected accidents.

Since the three projection units are placed in proximity to each other, moreover, it is hard to replace the spacer between two projection units due to the narrow space and the efficiency is lowered.

SUMMARY OF THE INVENTION

The invention has been conducted in order to solve the above-mentioned problems. It is an object of the invention to provide a projecting-type display apparatus in which, even when components are common to all the projection units, the relative angle between image forming means and a projection lens can easily be changed in conformity with design values.

In a projecting-type display apparatus a projection unit having image forming means and a projection lens coupled via a spacer block is held by a holder which is rotatably supported with a shaft by a base. Therefore, the field angle of the projection unit to the screen can freely be changed. Since the guide for rotating the holder is constituted of a shaft rather than a face, the sliding resistance is small. Moreover, since the guide is a shaft, the rotation center to incline the image forming means to the projection lens can correctly be set and verified and made coincident with an optical inclination reference point.

In the projecting-type display apparatus the fulcrum of the rotation is agreed with the optical inclination reference point. Therefore, images from a plurality of projection units match with each other with high accuracy, forming a highly precise image.

According to a projecting-type display apparatus in a projection unit, an image forming means frame for holding image forming means and a lens frame for holding a projection lens are coupled to each other by a flexible fastening member, and the space between the frames is filled with a cooling liquid. The projection unit is held by a holder which is rotatably supported with a shaft by a base in the projection unit wherein the tilt angle can be changed, the field angle can easily be changed. Moreover, the same effects as those of the above-mentioned projection unit coupled by the spacer block are attained.

In the projecting-type display apparatus the fulcrum of the rotation is made coincident with an optical inclination reference point. Therefore, images from a plurality of projection units agree with each other highly accurately, thus realizing a highly precise image.

In a projecting-type display apparatus an image forming means frame is axially supported with a shaft by a first holder, and the relative angle between the image forming means frame and a lens frame is fixed by a second holder. In a projecting-type display apparatus a second holder is not used, and the relative angle between an image forming means frame and a lens frame is fixed by a base. A projecting-type display apparatus comprises fixing means for fixing the relative angle between an image forming means frame and a lens frame. In any of the above apparatuses, the tilt angle can be set easily.

In the projecting-type display apparatus the outer peripheral wall of the image forming means frame which rotates inside the holder is a curved face. Therefore, the heat generated during the operation of the apparatus can readily be dissipated.

In the projecting-type display apparatus a positioning means for setting the angle of the image forming means to the projection lens stepwise is disposed between the holder and the image forming means frame. Accordingly, the tilt angle can be set by selecting one of a plurality of preset positions.

The projecting-type display apparatus includes an adjusting means for adjusting and fixing the relative angle between the image forming means frame and the holder. For example, the adjusting means is constituted of a spring and an adjusting screw, fixing the relative angle simultaneously with the adjustment of the angle.

In a projecting-type display apparatus a projection tube frame is supported with a shaft by a first holder in such a manner that the projection tube frame is rotatable within a first plane perpendicular to an optical axis of a projection lens, and the first holder is supported with a shaft by a second holder in such a manner that the first holder can rotate within a second plane which includes the optical axis of the projection lens and is perpendicular to the first plane. The rotation within the first and second planes enables the tilt angle and the vertical angle to be changed.

In the projecting-type display apparatus the second holder and the lens frame are formed in an integral body. Accordingly, assembly of the apparatus is simplified, and the assembling accuracy is improved.

The projecting-type display apparatus is provided with a positioning means for setting the angle of the image forming means to the projection lens stepwise between the first and second holders. Accordingly, the tilt angle can be set by selecting one of a plurality of preset positions.

In a projecting-type display apparatus a projection unit coupled by a fastening means is rotatably supported with a shaft by a base. Accordingly, the field angle can easily be changed while the projection unit is incorporated in the apparatus.

In a projecting-type display apparatus a rotation shaft of a base with a projection unit attached thereto is shared with an image forming means frame to rotate the frame in a first plane. Therefore, the number of parts is reduced as compared with the case where the rotation shafts are used not in common.

The projecting-type display apparatus is provided with a plurality of positioning means for setting the mounting angle of the projection unit stepwise between the projection unit and the base in the configuration of claim 15. Accordingly, the field angle can be set stepwise by selecting one of a plurality of preset positions.

The projecting-type display apparatus is configured so that the base is supported with a shaft to be rotatable within the second plane in order to simultaneously incline three projection units. When the rotation in the first plane is carried out to adjust the tilt angle, and that in the second plane is utilized to adjust the vertical angle, the vertical angle can easily be changed while the projection units are incorporated in the apparatus.

It is another object of the invention to provide a projecting-type display apparatus which comprises means for continuously or stepwise changing the distance between an image forming means frame and a lens frame, and the tilt angle, and is therefore able to deal with various kinds of projection distances (screen sizes), can be produced at low costs, showing high reliability and workability.

In the projecting-type display apparatuses a plurality of spacers are inserted between the image forming means frame and the lens frame, so that the frames are elastically fastened to each other. When the spacers are stepped bolts in different in length, for example, a desired tilt angle is secured by matching and the length of the stepped bolts for each fastening position. Since the stepped bolt is a part of a simple shape, it is easy to select the length of the bolt or store the same with relatively low costs. Further, since the bolt can be easily changed from the side of the lens surface of the projection unit, the work is conducted easily. The apparatus has a large degree of freedom in the layout of lenses thereinside.

In the projecting-type display apparatus stepped bolts of the same length are used together with washers different in thicknesses. A desired tilt angle is obtained by fitting the thickness of washers for each fastening position.

The projecting-type display apparatus is configured so that, in the configuration of claim 19, the stepped bolts having the same length are inserted into insertion holes having different seat heights. A desired tilt angle is obtained by selecting the seat height for each fastening position.

The projecting-type display apparatus is configured so that, seats for the spacers are formed like steps or stairs at four corners of the two frames to face each other, and the spacers are inserted into one of the seats, thereby ensuring a desired tilt angle. At the assembling time of the apparatus, it is not necessary to pay attention to the length of the bolts, and it is enough only to recognize the relationship between the holes at four corners of each frame, and the specified conditions. In this way, the spacers are inserted simply with few errors. The insertion portion may be spherical.

The projecting-type display apparatus is configured so that, an insertion portion of each spacer is formed in a polygonal of an even number, and the distances between two opposite sides are different, from each other. Therefore, the tilt angle can be changed by rotating the insertion portion.

The projecting-type display apparatus is configured so that, seats for the spacers are formed like steps or stairs at four corners of each frame to confront to each other. Therefore, the tilt angle defined by the opposing faces of the frames can be adjusted by a combination of the rotation of the insertion portions of the spacers with the selection of seats. This spacer is unnecessary to replace and enough to slide up and down, and therefore, this configuration is advantageous in terms of efficiency and reliability. Besides, since the worker does not need to carry the spacer for replacement, the configuration is advantageous also in terms of management. When the spacers having spherical portions are to be vertically slid, the spherical face is slippery to improve the workability. The spacers in the polygonal shape are clamped in a simple manner to rotate the same, so that a single set of spacers realizes various tilt angles. If the spacers are slid vertically as well, a further increasing number of tilt angles are achieved.

It is a further object of the invention to provide a projecting-type display apparatus in which image forming and a projection lens are held by a frame, with a long hole is formed in a frame base fixed to one face of the frame, so that the frame base is rendered rotatable with respect to a base within the range of the long hole, whereby the field angle can be changed with ease.

A projecting-type display apparatus is characterized in that a frame base is securely attached to a frame holding an image forming means and a projection lens, and the frame base is mounted to a base in such a manner as to be rotatable in a direction to change the field angle. Therefore, the frame base can be rotated centering the shaft with respect to the base, whereby the field angle can be changed without increasing the number of parts to be replaced.

The projecting-type display apparatus is characterized in that, a long hole is formed at a position separated from a rotation shaft of the frame base, and the base is provided with an engaging member to be engaged with the long hole. Therefore, the range of the rotation of the frame base is limited, and hence the damage and deterioration of the efficiency resulting from the excessive rotation of the frame base can be avoided.

The projecting-type display apparatus is characterized in that, a plurality of fitting portions are provided at the lateral side of the frame base separated from the rotation shaft, and the base has a positioning member which is selectively fitted into one of the fitting portions to set the rotation angle of the frame base with respect to the base. When the frame base is rotated to a position where the positioning member is agreed with one of the fitting portions, the positioning member is fitted into the fitting portion, and the rotation angle of the frame base with respect to the base is determined, whereby the field angle is set. Since the fitting portion into which the positioning member is to be fitted is selectable, the field angle can be changed and in a plurality of levels corresponding to the number of the fitting portions of the frame base.

The projecting-type display apparatus is characterized in that, a hole having a smaller diameter at one end in the thickness wise direction than at another portion is formed at a position separated from a rotation shaft of the frame base. An engaging stopper is inserted in the hole from the other end to be exposed partially at the surface thereof and is pressed from the other end. At the same time, a plurality of holes are formed to receive the exposed part of the engaging stopper in the base at the same distance to the rotation shaft as the same distance to the rotation shaft as between the shaft and the hole. When the frame base is rotated to a position where the hole into which the engaging stopper is inserted is agreed with one of the holes formed in the base, the exposed part of the engaging stopper is fitted into the hole, and the rotation angle of the frame base with respect to the base is determined, whereby the field angle is set. Since the hole to fit the exposed part of the engaging stopper is selectable, the field angle can be changed and set in a plurality of values corresponding to the number of the holes into the engaging stopper is to be fitted.

The projecting-type display apparatus is characterized in that, the apparatus further comprises: a polygonal cam which is rotatably supported with a shaft at an eccentric position by the base, one of a plurality of faces of the polygonal cam being selectively brought in touch with the frame base by the rotation of the polygonal cam; and means for pressing the frame base into contact touch with the polygonal cam. When the polygonal cam is rotated, the distance between the rotation center of the polygonal cam and one face of the frame base in contact with the polygonal cam is changed. In accordance with this change, the rotation angle of the frame base with respect to the base is changed, so that the field angle can be changed in a plurality of values corresponding to the number of faces of the polygonal cam.

The projecting-type display apparatus is characterized in that, the apparatus further comprises: a spacer having a portion of a different thickness; means for pressing the frame base into touch with the spacer in the rotating direction of the frame base; and a hole into which the spacer is to be inserted and fitted in the frame base. When the position of the spacer to be fitted into the hole is selectable, the distance between the spacer and one face of the frame base is changed. Accordingly, the rotation angle of the frame base with respect to the base is changed, and, the field angle can be changed in a plurality of values corresponding to the number of thicknesses of the spacer.

The projecting-type display apparatus is characterized in that, a plurality of holes are formed at positions which are separated from a rotation shaft of the frame base, and the base is provided with a positioning member which is selectively fitted into one of the holes, and means for elastically pressing the positioning member against the frame base. When the frame base is rotated to a position where the positioning member is agreed in position with one of the holes, the positioning member is fitted into the hole, and the rotation angle of the frame base with respect to the base is determined, whereby the field angle is set. Since the hole into which the positioning member is to be fitted is made selectable, the field angle can be changed and set in a plurality of values corresponding to the number of the holes.

The projecting-type display apparatus is characterized in that, the apparatus further comprises a lever having a fulcrum rotatably attached to the base and one end engaged with the frame base, and a plurality of recesses into which the other end of the lever is selectively fitted are formed in the base. When the lever is driven, the frame base is rotated, and, the other end of the lever is fitted into one of the recesses. In consequence, the rotation angle of the frame base with respect to the base is determined, whereby the field angle is set. Since the recess into which the lever is to be fitted is selectable, the field angle can be changed and set in a plurality of values corresponding to the number of the recesses.

The projecting-type display apparatus is characterized in that, the apparatus further comprises: a pair of L-shaped bolts each having a threaded portion at one end, the threading direction of the threaded portions being different from each other; a rod-like nut to mesh with the L-shaped bolts at both ends thereof; and means for rotating the rod-like nut. The rod-like nut has threads in different, directions at both ends. The L-shaped bolts are rotatably held at the other ends by frame base, and the frame base changes The angle to the base when the rod-like nut is rotated. When the rod-like nut is rotated, the meshing depth of the L-shaped bolts in the rod-like nut are changed thereby to change the distance between the L-shaped bolts. As a result, the frame base is axially rotated with respect to the base, whereby the field angle is changed.

The projecting-type display apparatus is characterized in that, a rotation shaft of the frame base is on a center line in the main scanning direction of an image formed by the image forming means. Therefore, the frame base can be rotated with using as an axis the center of the image in the scanning direction, and the shift of the image when the field angle is changed is restricted to minimum, the apparatus is hence adjusted furthermore accurately.

The projecting-type display apparatus is characterized in that, a mark to confirm the field angle is formed in the vicinity of the plurality of fitting portions separated from the rotation shaft of the frame base. Therefore, the field angle can easily be confirmed from the mark at the side of the fitting portion where the positioning member is fitted.

The above and further objects and features of the invention will more fully be apparent from the following detailed description with accompanying drawings.

DESCRIPTION OF THE PREFERRED EMBODIMENTS

Hereinafter, the invention will be described in detail with reference to the drawings showing the embodiments thereof.

Embodiment 1

Figure 1:
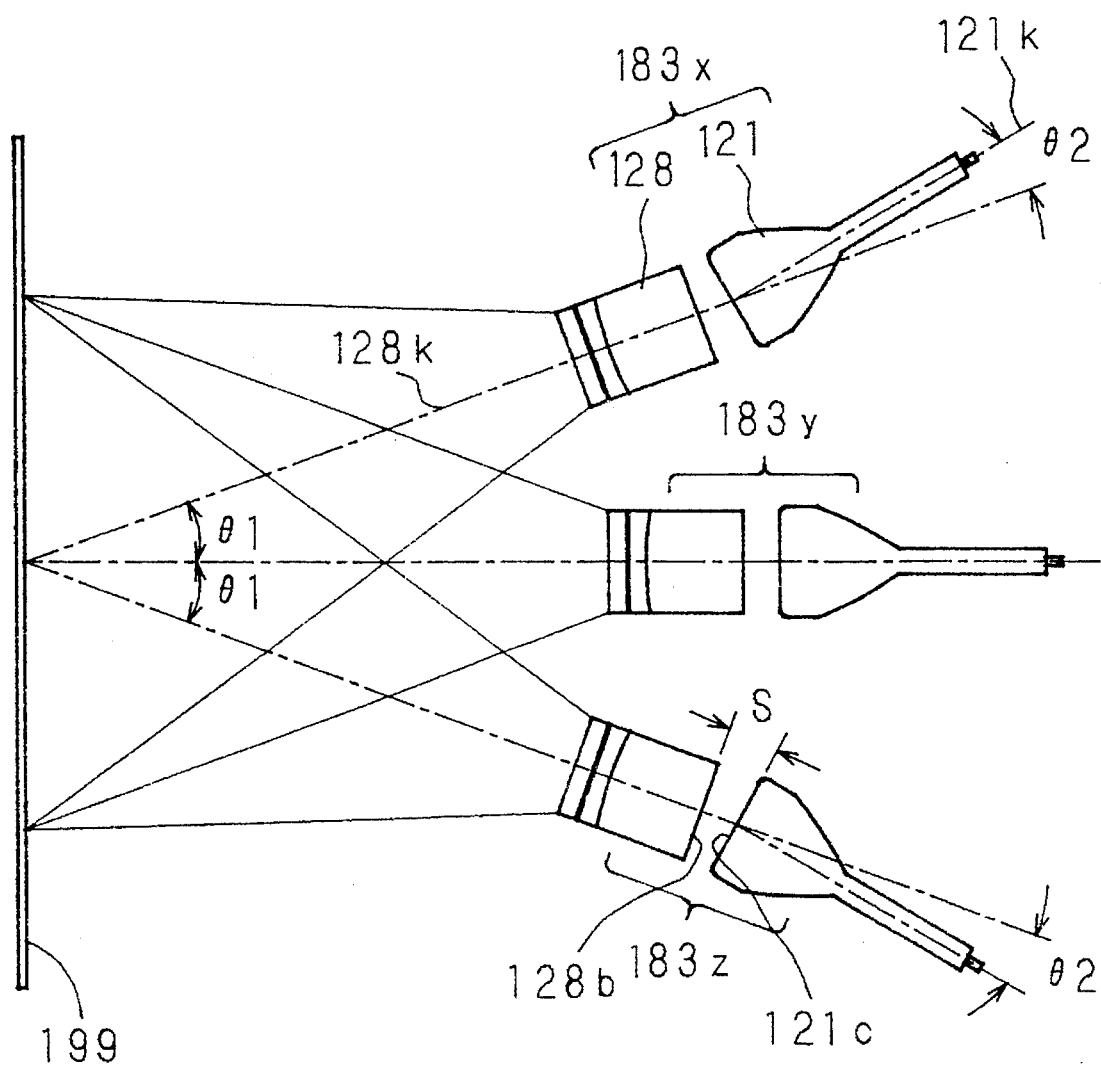
FIG. 1 is a diagrammatic plan view showing a prior art projecting-type display apparatus having three projection units.
Figure 2:
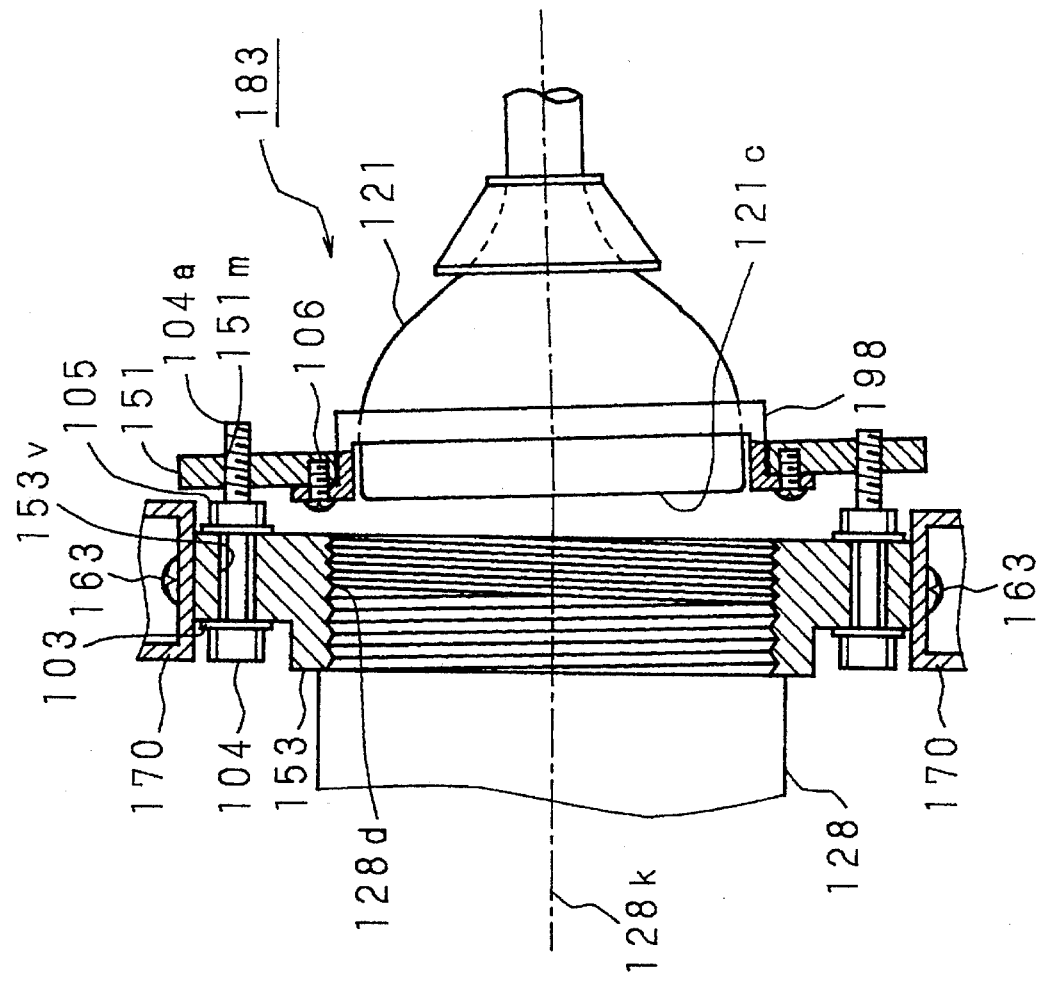
FIG. 2 is a transverse sectional view showing the main portion of a prior art projection unit.
Figure 3:
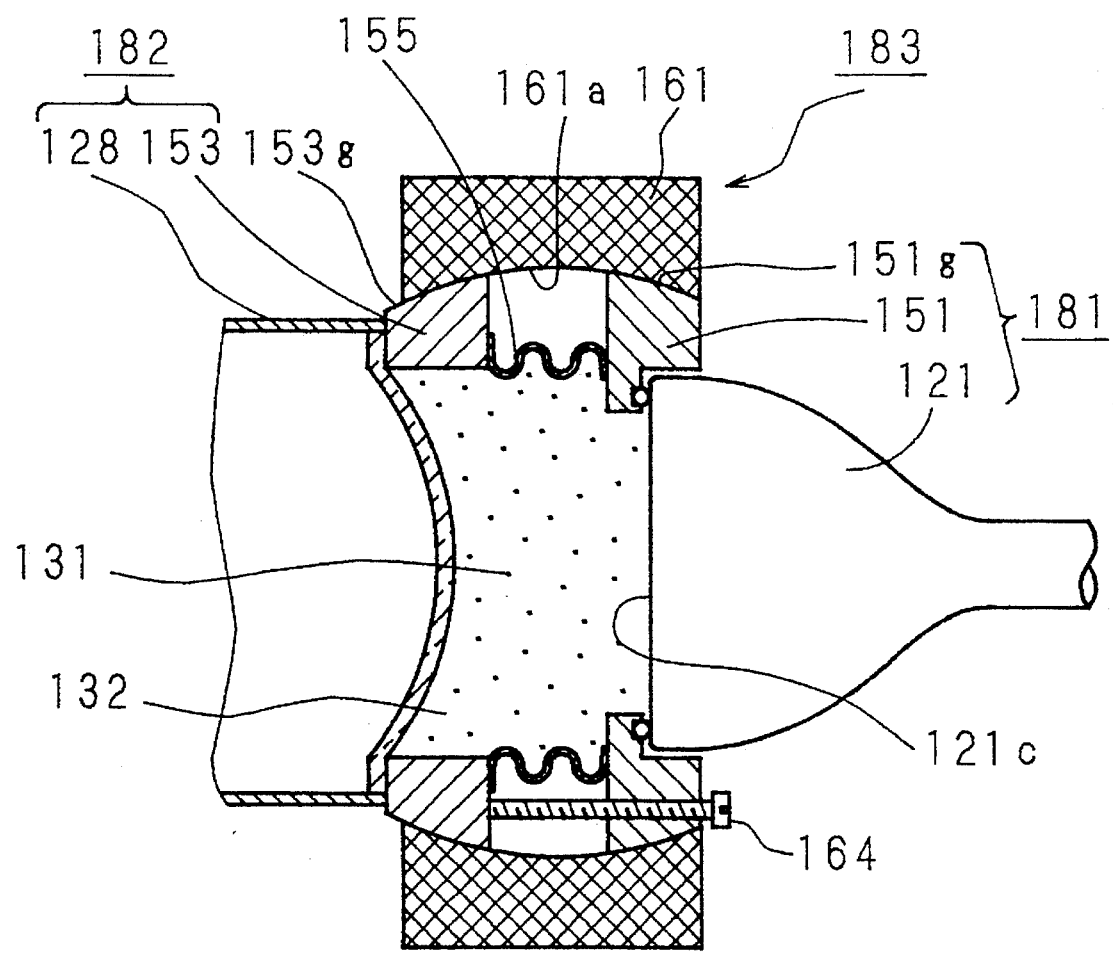
FIG. 3 is a section view showing the main portion of a prior art projection unit.
Figure 4:
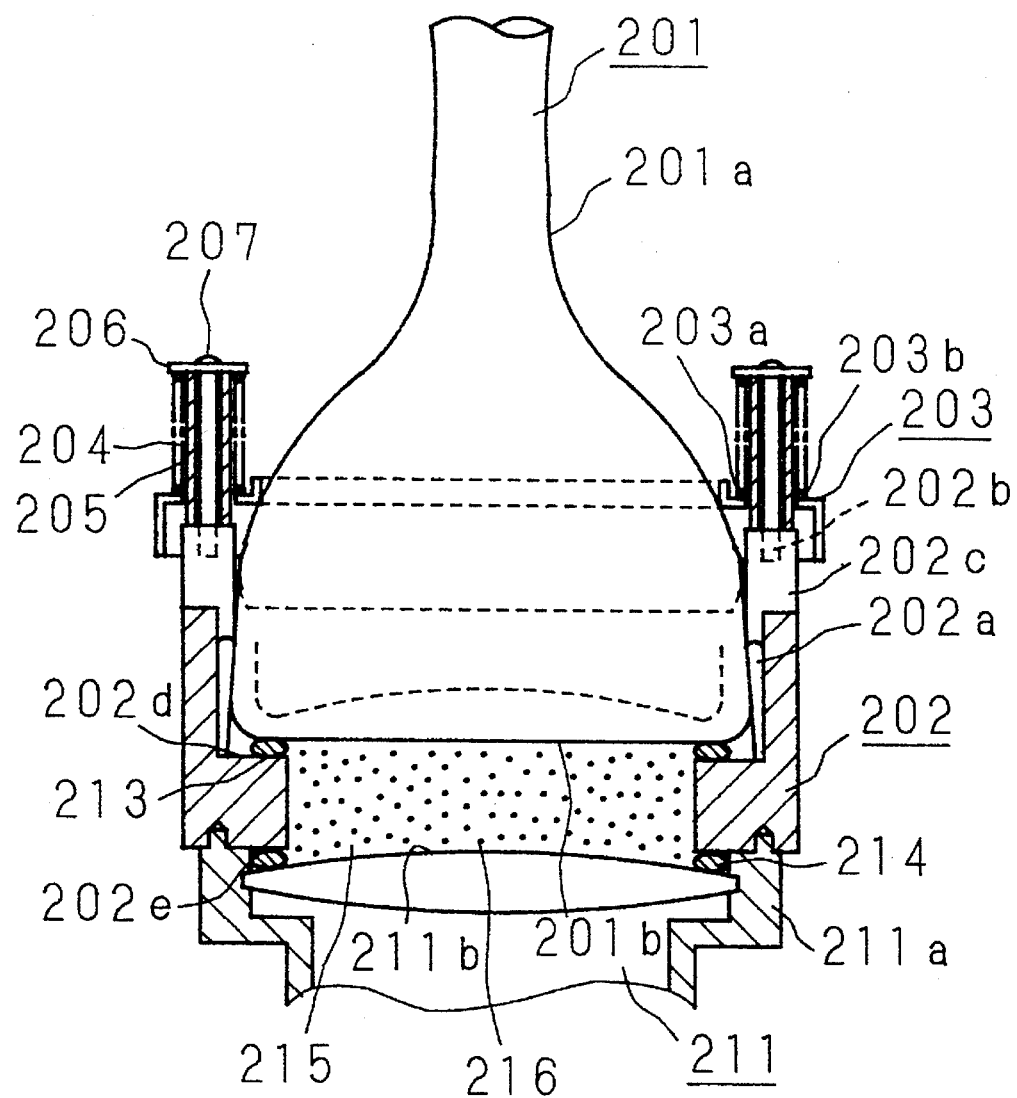
FIG. 4 is a section view showing the main portion of a prior art projection unit.
Figure 5:
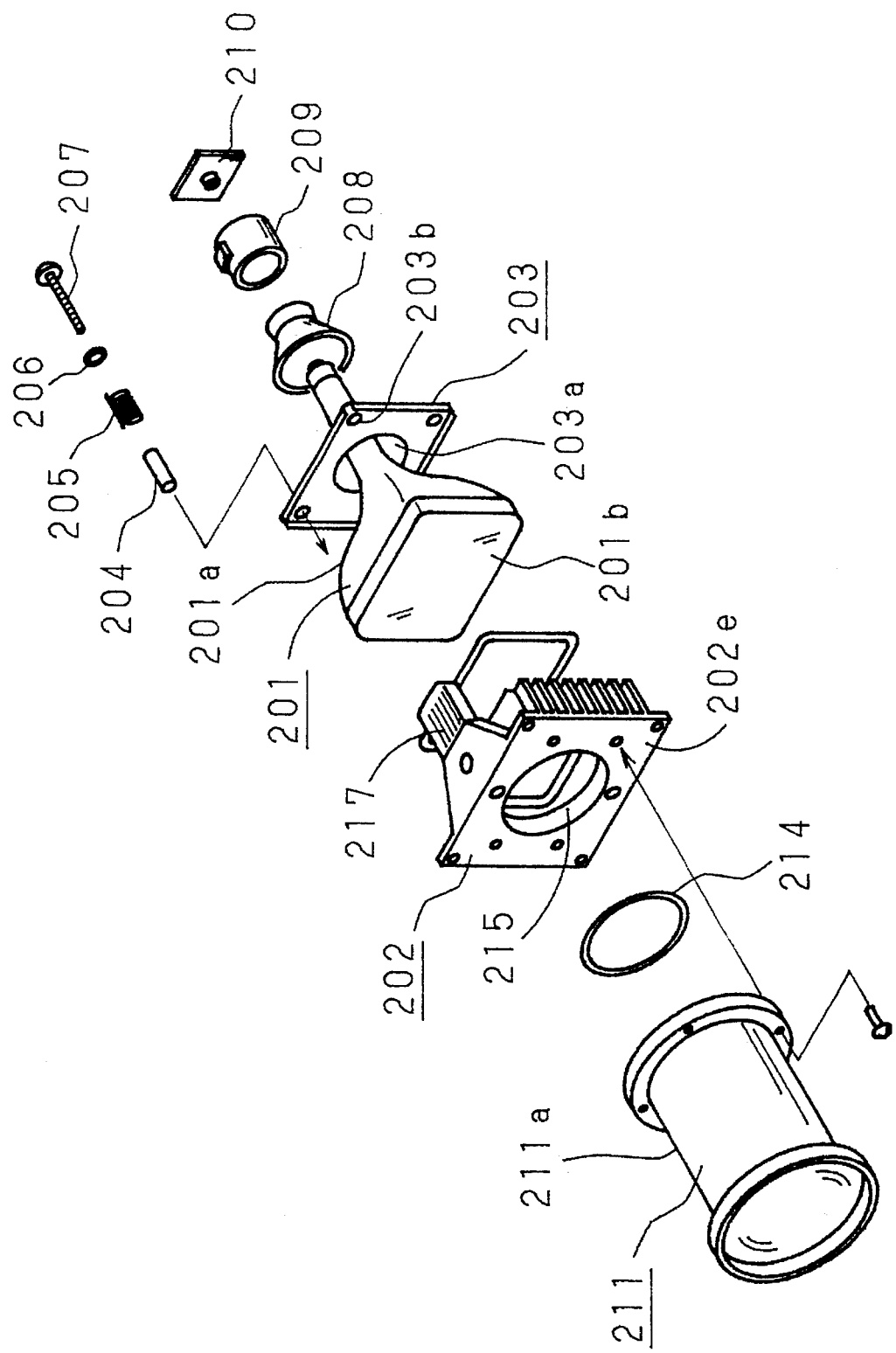
FIG. 5 is an exploded perspective view of the unit of FIG. 4.
Figure 6:
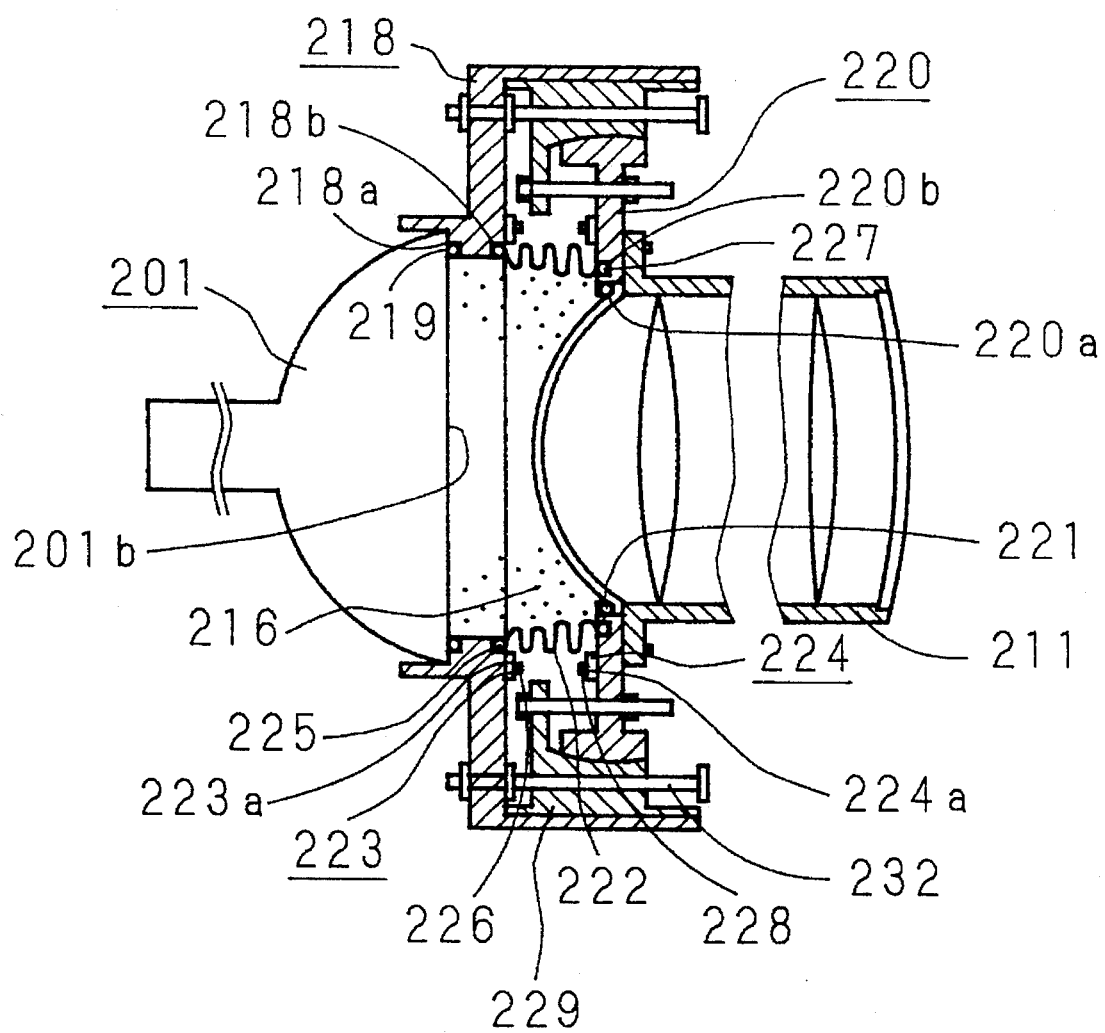
FIG. 6 is a section view showing the main portion of a prior art projection unit.
Figure 7:
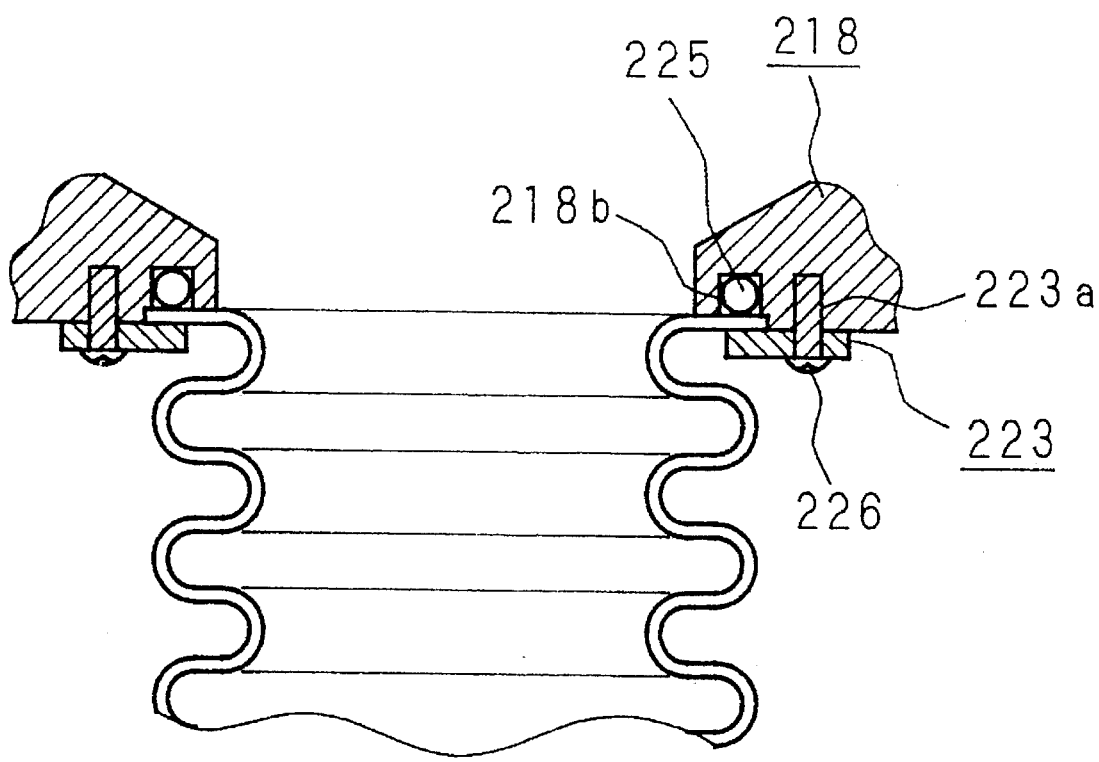
FIG. 7 is a section view showing the main portion of the unit of FIG. 6.
Figure 8:
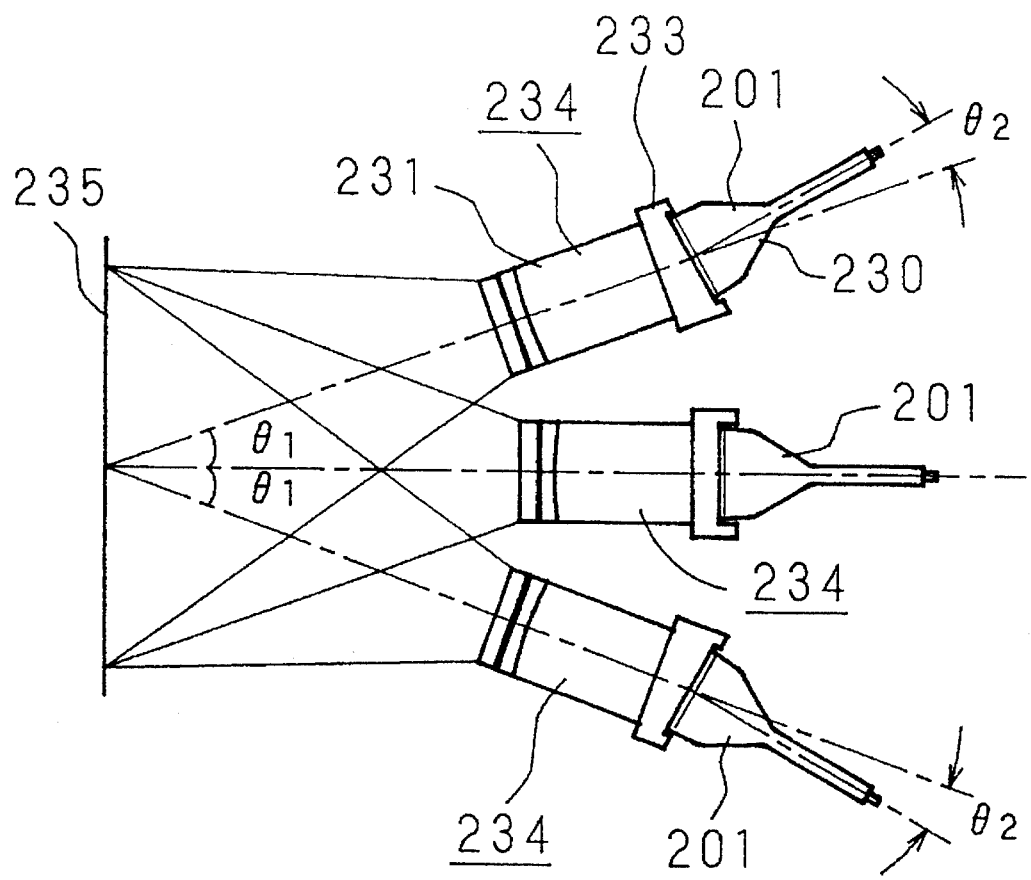
FIG. 8 is a diagrammatic plan view showing a prior art projecting-type display apparatus having three projection units.
Figure 9:
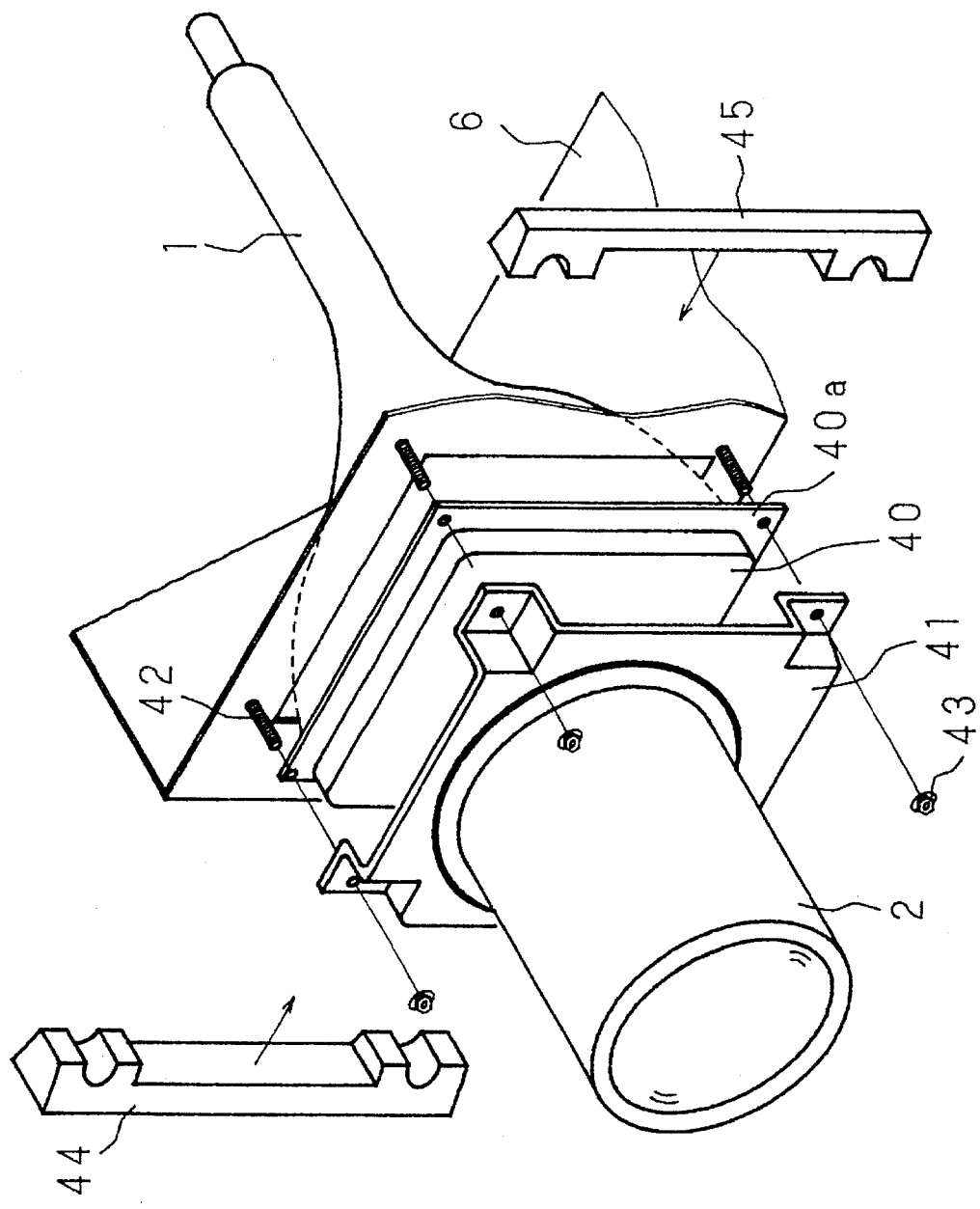
FIG. 9 is an exploded perspective view showing a prior art projection unit.
Figure 10:
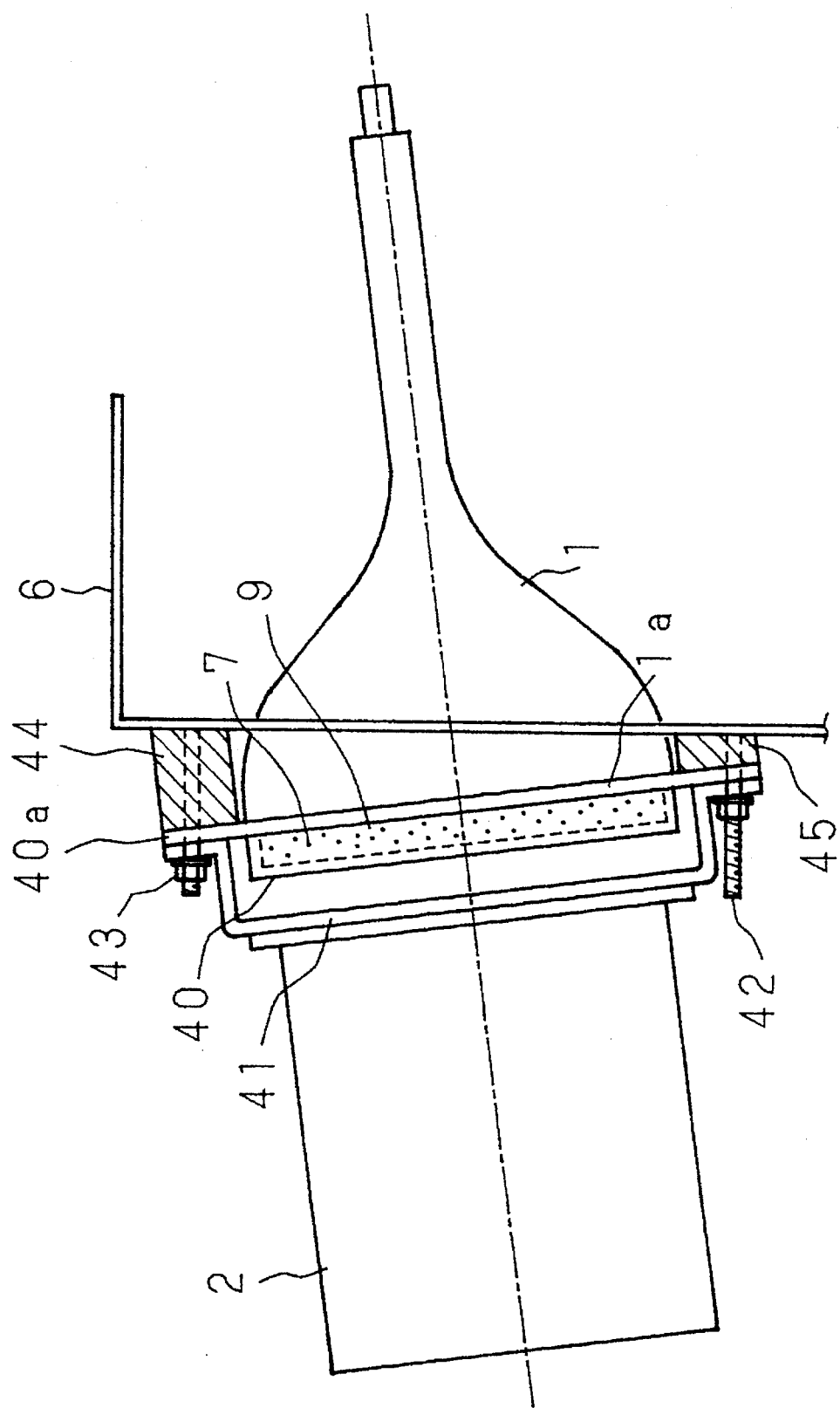
FIG. 10 is a side section view showing a prior art projection unit.
Figure 11:
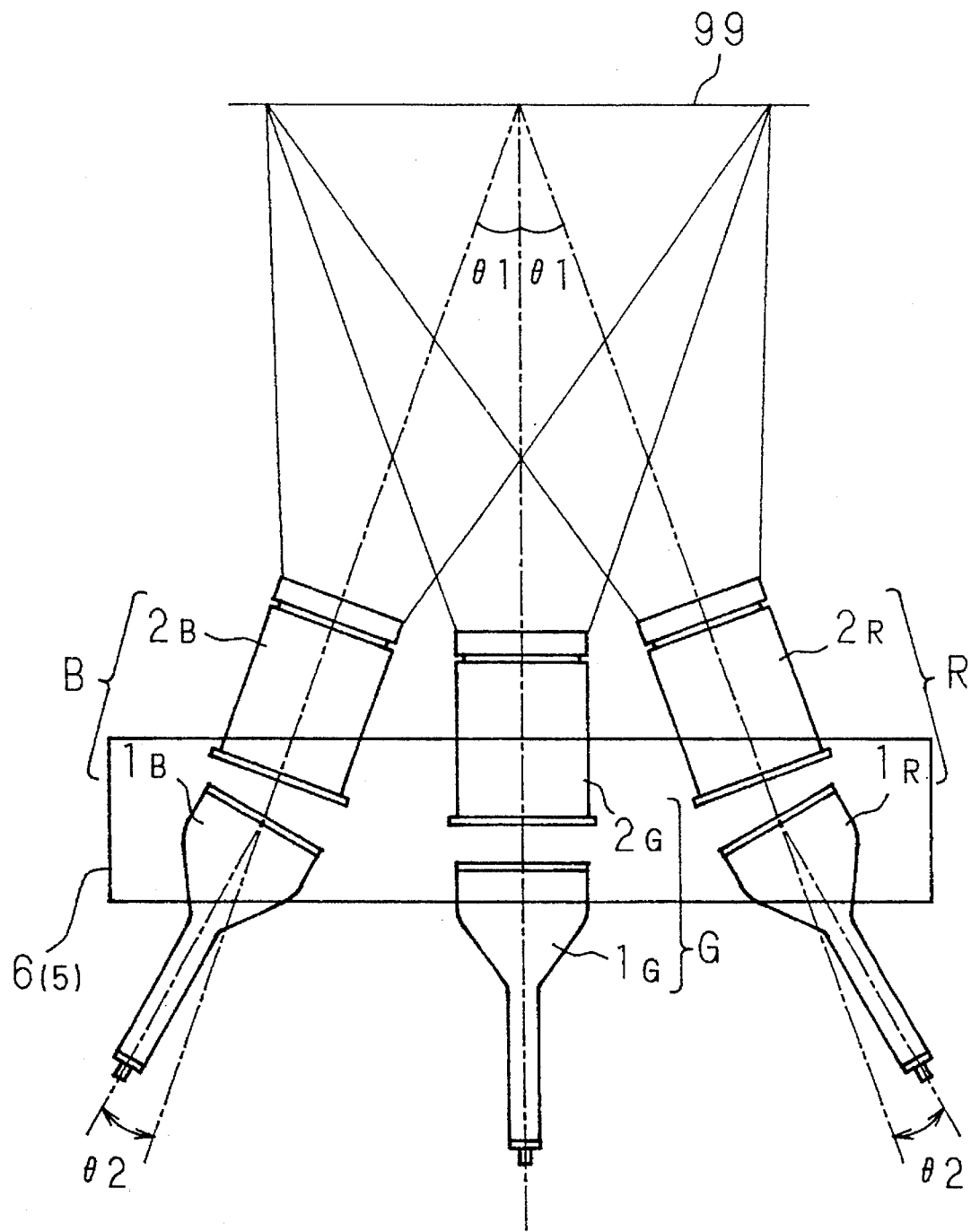
FIG. 11 is a diagrammatic plan view showing a prior art projecting-type display apparatus having three projection units.
Figure 12:
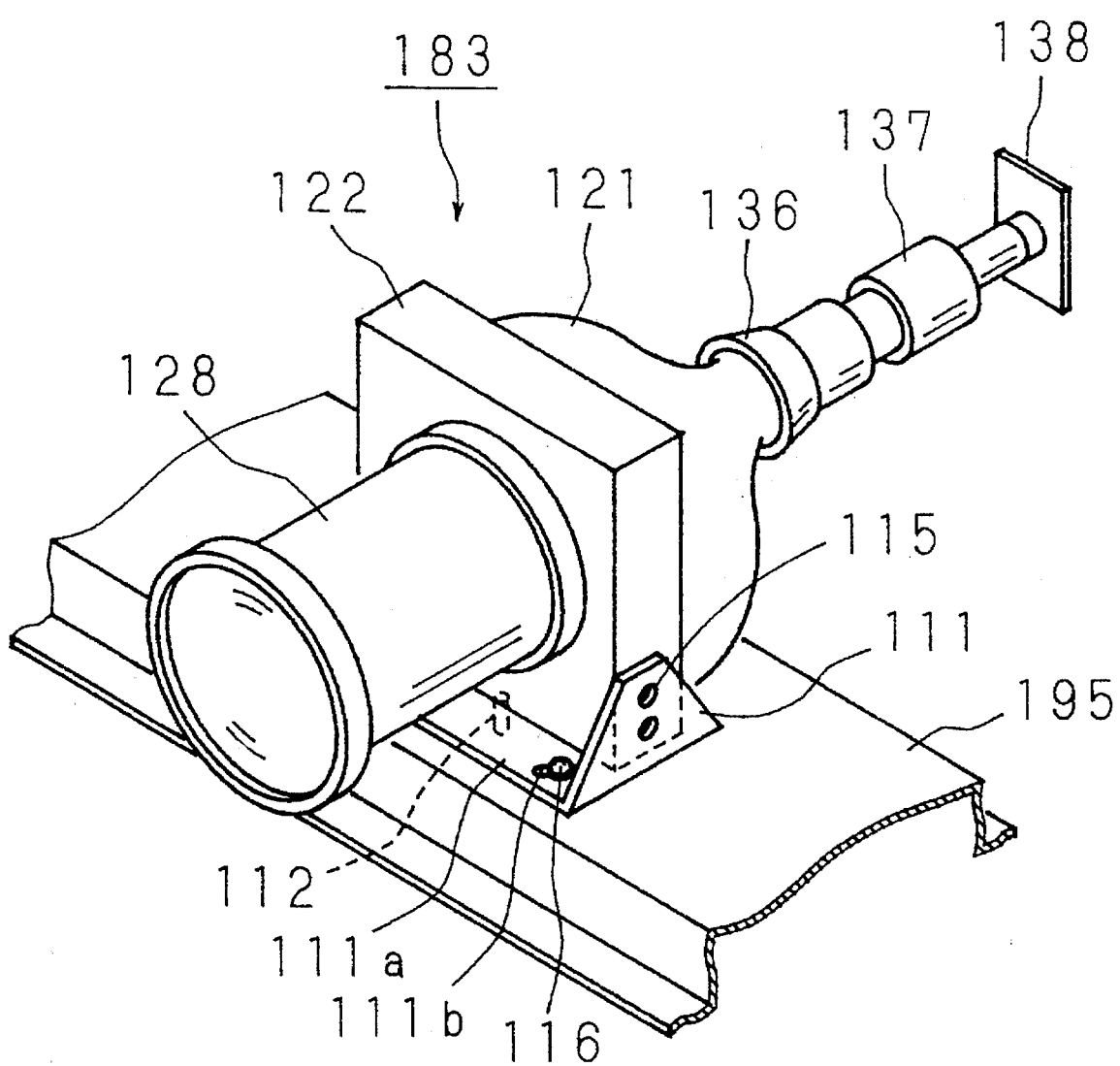
FIG. 12 is a perspective view showing a projection unit of Embodiment 1 of the invention.
Figure 13:
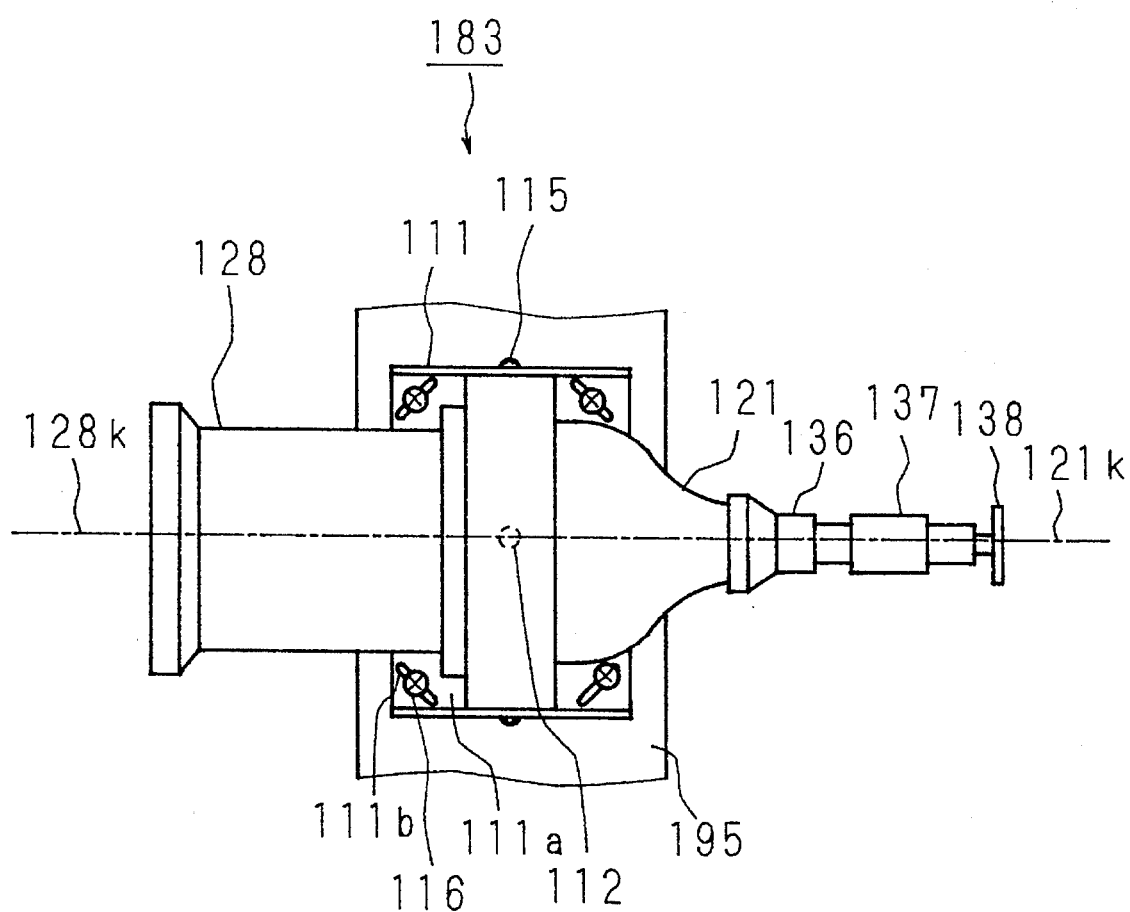
FIG. 13 is a plan view of the unit of FIG. 12.

FIG. 12 is a perspective view of a projection unit in Embodiment 1 of a projecting-type display apparatus according to the invention (hereinafter referred to as "the present apparatus"), and FIG. 13 is a plan view of the projection unit. In the figures, a projection tube 121 which is a CRT, and a projection lens 128 for magnifying an image are coupled to each other by a spacer block 122 made of a material such as aluminum having excellent heat conduction properties. These components constitute a projection unit 183. A deflection yoke 136, a focus magnet 137, and a CRT board 138 are attached to the projection tube 121.

In the projection unit 183, the spacer block 122 is rigidly fastened to a holder 111 by screws 115. The holder 111 is rotatably supported on a base 195 by a first rotation shaft 112, and is fixed to the base 195 by mounting screws 116 via long holes 111b formed at a mounting face 111a of the holder 111. Accordingly, the projection unit 183 can be mounted at a predetermined angle.

Even without correcting an optical axis 128k and a tube axis 121k, therefore, three units for red, green, and blue colors are realized by the same projection unit 183, and may be automatically adjusted.

Figure 14:
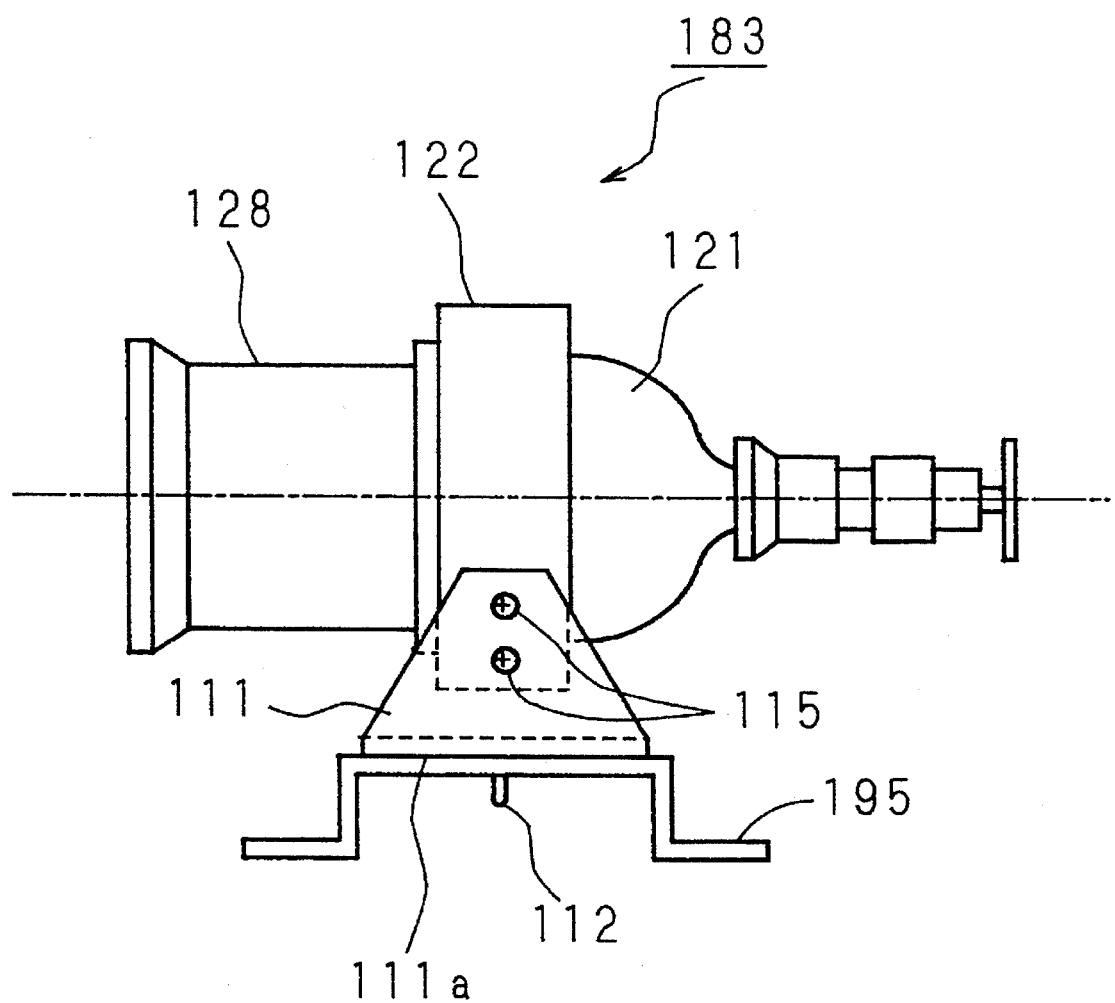
FIG. 14 is a side view showing the projection unit of Embodiment 1 at the time of horizontal projection.
Figure 15:
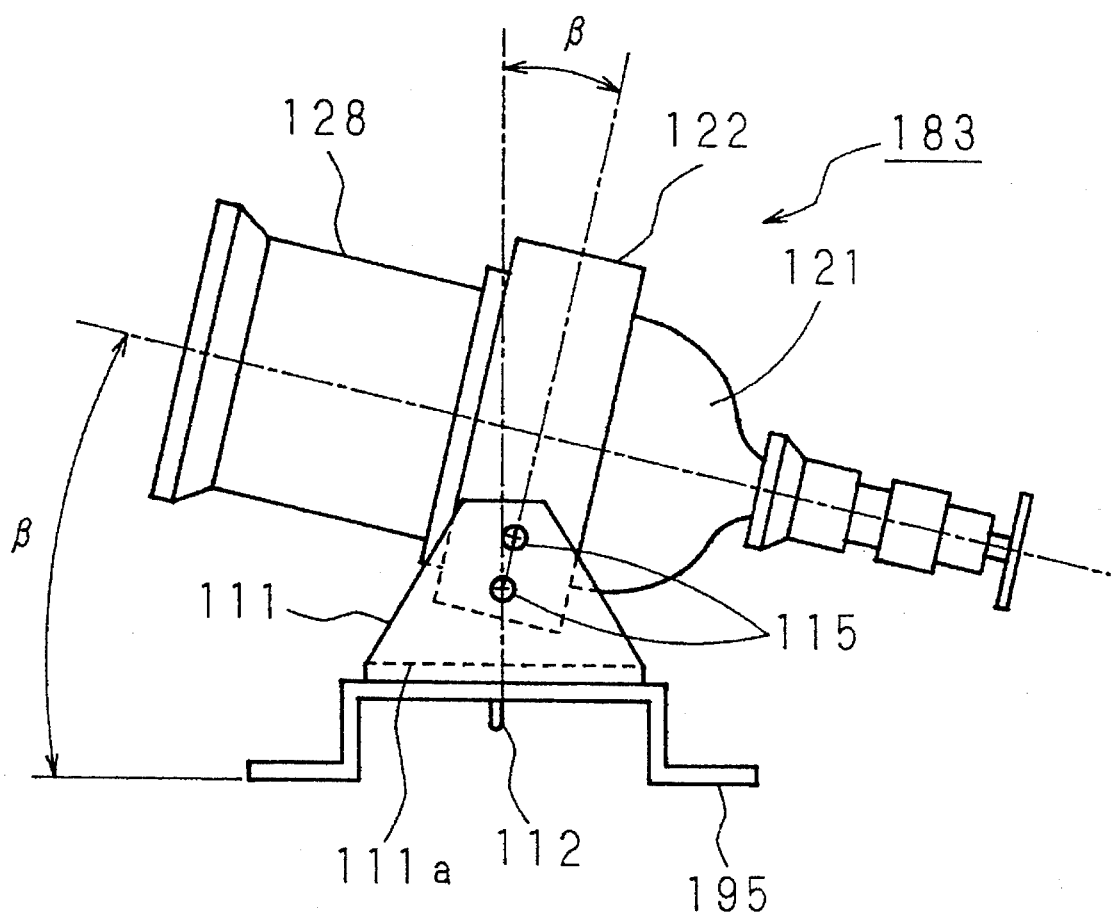
FIG. 15 is a side view showing the projection unit of Embodiment 1 when the vertical angle is changed.

FIGS. 14 and 15 are side views of the projection unit in the cases where the vertical angle (projection angle in the vertical direction) is changed in the projecting-type display apparatus of Embodiment 1. FIG. 14 indicates the mounting angle of the projection unit 183 to the holder 111 when the image is projected in the horizontal direction. Threaded holes arranged in the vertical direction in the spacer block 122 are fastened by screws 115 to the corresponding mounting holes formed similarly ill the holder 111 in the vertical direction.

In contrast, FIG. 15 illustrates the state where the image is projected with a vertical angle $\beta$ by the same projection unit 183. In this case, the mounting holes formed in the holder 111 are inclined the vertical angle $\beta$ to the mounting face 111a of the holder. When this holder 111 is used, the projection unit 183 mounted to the base 195 is inclined by the angle corresponding to the inclination of the mounting holes of the holder 111, because the threaded holes of the spacer block 122 are vertically arranged.

According to the embodiment, the mounting holes of the holder 111 are inclined at different angles, whereby the projection unit 183 can be mounted at any angle.

Embodiment 2

Figure 16:
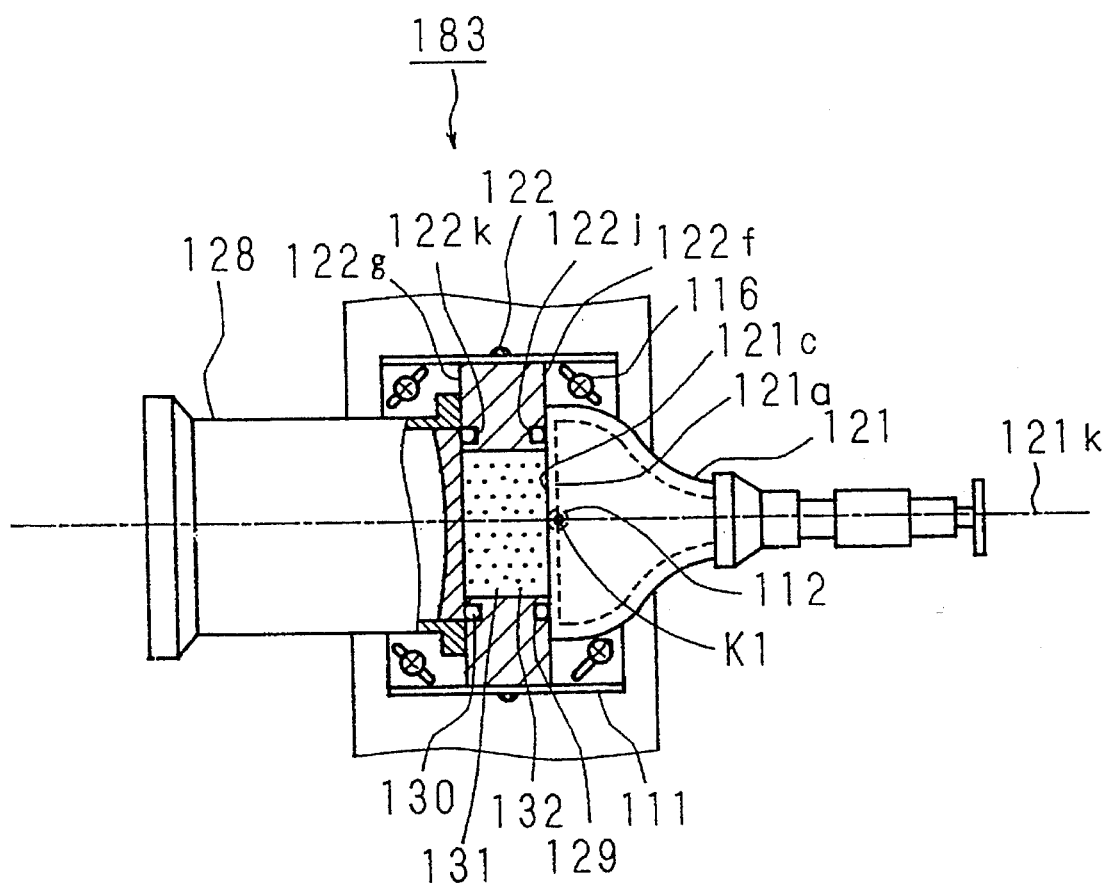
FIG. 16 is a plan view including a section of the main portion of a projection unit of Embodiment 2 of the invention.

FIG. 16 is a plan view including a section of the main portion of a projection unit of Embodiment 2 of the present apparatus. A cooling liquid 132 is filled in the space between a projection tube 121 and a projection lens 128. A projection tube packing 129 is disposed in an annular groove 122j formed at the peripheral edge of an opening of a projection tube mounting face 122f of a spacer block 122, so that the projection tube 121 and the spacer block 122 are coupled with in the watertight state. A lens packing 130 is fitted in an annular groove 122k at the peripheral edge of an opening of a lens mounting face 122g, so that the projection lens 128 and the spacer block 122 are coupled with in the watertight state. A space 131 defined by the projection the 121, the projection lens 128, and the spacer block 122 is filled with the cooling liquid 132.

In the projecting-type display apparatus, a reference point to set the projection unit 183 is generally an intersection K1 of an image display face 121a of the projection tube 121 and the tube axis 121k. A first rotation shaft 112 of the holder 111 holding the projection unit 183 is located on the vertical axis passing through the intersection K1.

Figure 17:
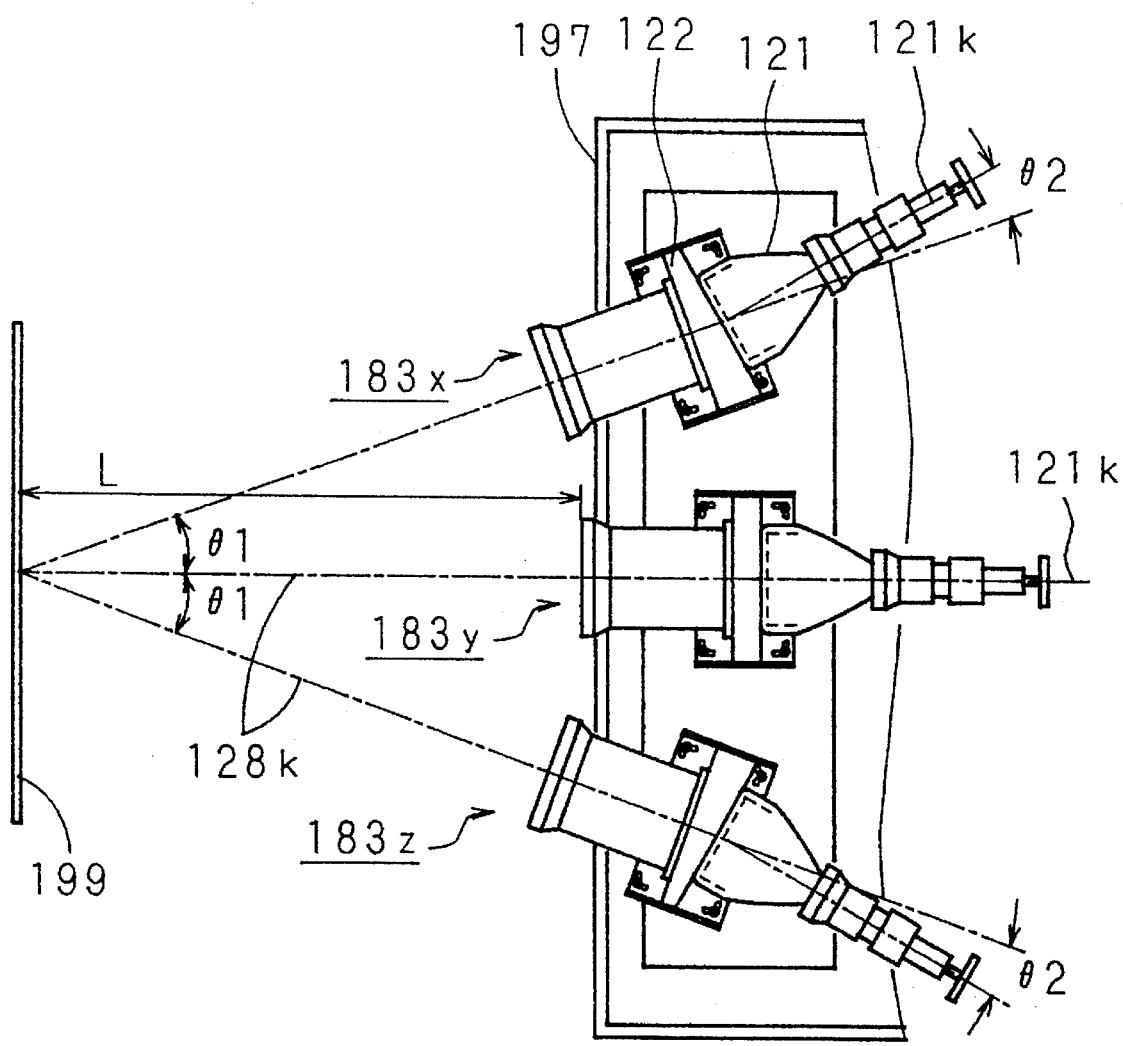
FIG. 17 is a diagrammatic plan view showing a projecting-type display apparatus of Embodiment 2 in which three projection units are used.

FIG. 17 is a plan view of the apparatus when three projection units 183 in the constitution as in FIG. 16 are mounted on the base 195 attached to an outer case 197 at a Field angle $\theta$1. In the center projection unit 183y, the optical axis 128k of the projection lens 128 and the tube axis 121k of the projection tube 121 are on the same line, whereas, in the side projection units 183x and 183z, the projection lens 128 and the projection tube 121 are arranged to assume a tilt angle $\theta$2 to the horizontal direction. Therefore, the focus is met both at the center and periphery portions of a screen 199. In this case, the above-mentioned intersection K1 serves as a reference point for the field angle $\theta$1 and the tilt angle $\theta$2. The first rotation shaft 12 is set on the vertical axis passing through the intersection K1. The same components as those of FIG. 12 are designated by the same reference numerals, and the description is omitted.

In the projecting-type display apparatus of Embodiment 2, the space between the projection tube 121 and the projection lens 128 is filled with the cooling liquid 132. Therefore, the heat of display face 121c of the projection tube 121 which is heated to considerably high temperatures during the operation is transmitted via the cooling liquid 132 to the spacer block 122 made of aluminum which is excellent in heat conduction, to be discharged outside. As the cooling liquid 132 is, for example, ethylene glycol, silicone, or the like, having the equivalent refractive index to that of the projection tube 121 and the projection lens 128 of glass, the cooling liquid 132 is also effective to guide the light from the projection tube 121 to the projection lens 28 without refracting the same, as well as to dissipate the heat. Therefore, irregular reflections are prevented and the deterioration of contrast is avoided.

As described above, the side projection units 183x and 183z are inclined the field angle $\theta$1. When the size of the screen is changed, the projection distance L, and eventually the field angle $\theta$1 are changed. In this event the projection units 183 are required to be inclined without changing the optical reference. In order to change the field angle $\theta$1, since the first rotation shaft 112 which axially supports the holder 111 of the projection unit and the unit base 195 is coincident with the optical reference point K1, it is enough to rotate the holder 111 about the rotation shaft 112. In the case where the projection lens 128 and the projection tube 121 are inclined at the tilt angle $\theta$2, the focus on the peripheral edge of the screen 199 should be moved by, for example, electric adjusting means.

Embodiment 3

Figure 18:
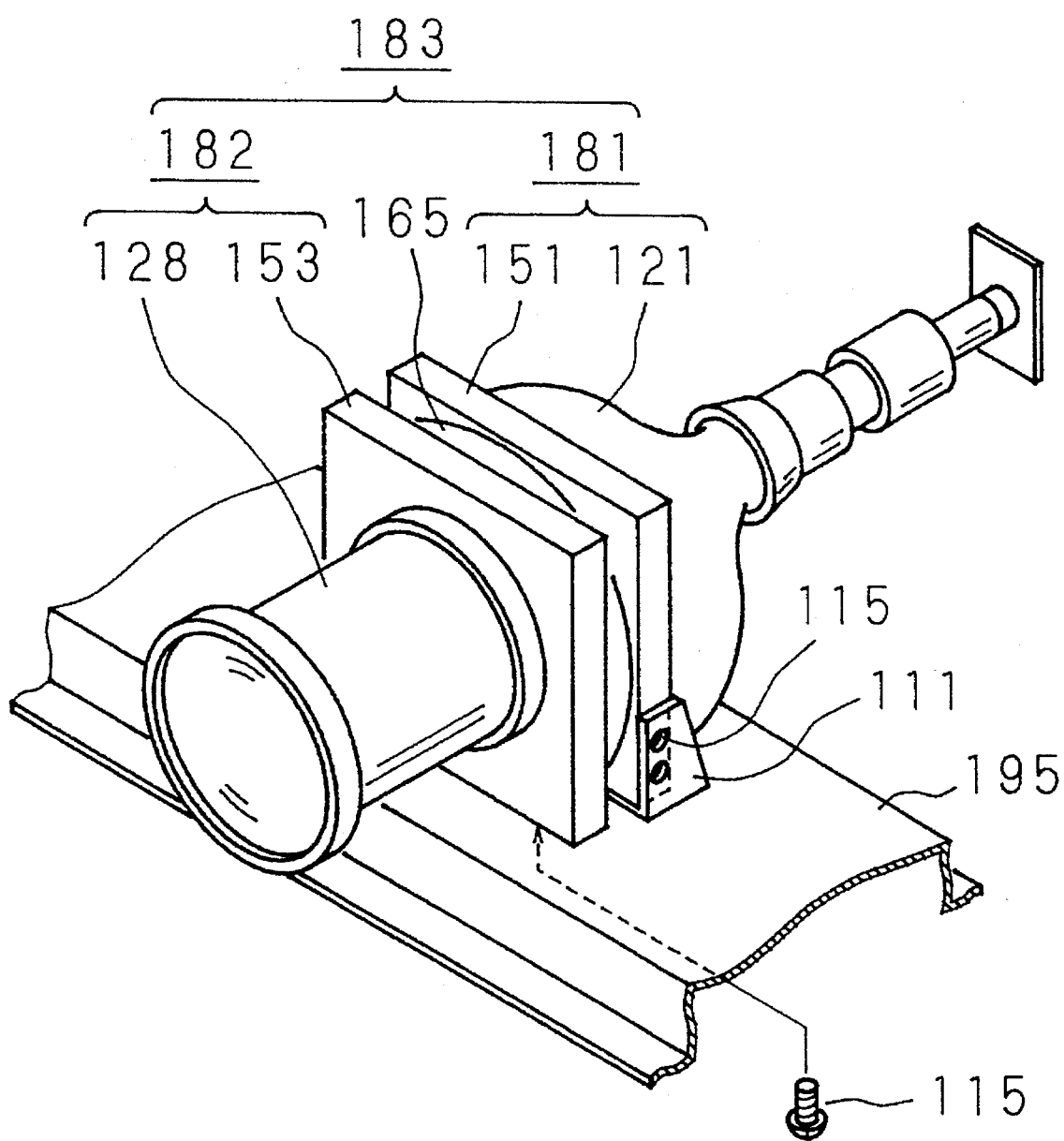
FIG. 18 is a perspective view showing a projection unit of Embodiment 3 of the invention.
Figure 19:
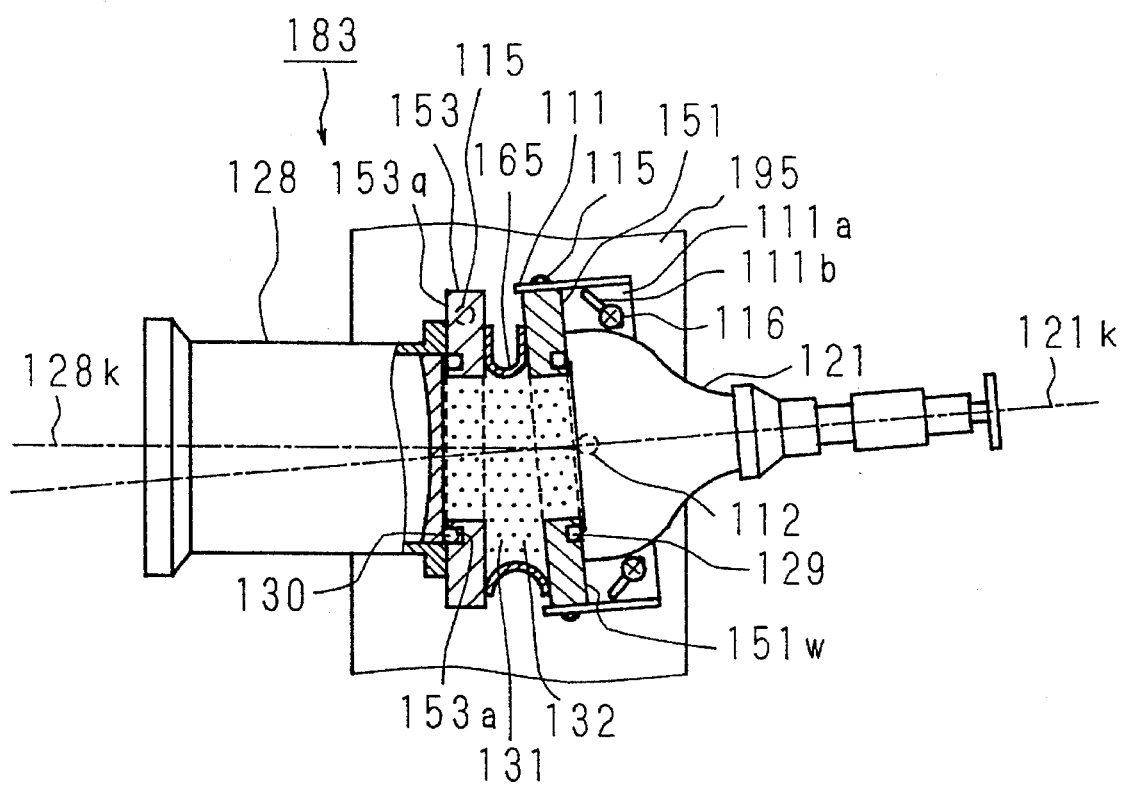
FIG. 19 is a plan view including a section of the main portion of Embodiment 3.

FIG. 18 is a perspective view showing a projection unit in Embodiment 3 of the present apparatus, and FIG. 19 is a plan view including a side cross section of the main portion of the projection unit. A projection lens 128 and a lens frame 153 are connected in the watertight state by a lens packing 130 set in an annular groove 153a at the peripheral edge of an opening of a lens mounting face 153q of the lens frame 153. These components constitute a lens block 182. A projection tube 121 and a projection tube frame 151 are connected with each other in the watertight state by a projection tube packing 129 disposed in an annular groove 151a at, the peripheral edge of an opening of a projection tube mounting face 151w of the projection tube frame 151, These components constitute a projection tube block 181. The lens frame 153 and the projection tube frame 151 are connected in the watertight state via a flexible packing sheet 165 molded of rubber or the like. The packing sheet 165 is set to the frames with an appropriate degree of slack so as to maintain the watertight state even if the angle of the blocks 181 and 182 is changed. A space 131 defined by the projection tube block 181, the lens block 182 and the packing sheet 165 is filled with a cooling liquid 132, thereby constituting a projection unit 183.

The lens frame 153 is fixed to a unit base 195 by screws 115 from the rear side. On the other hand, the projection tube frame 151 is mounted to a holder 111 by screws 115. The holder 111 is axially supported on the unit base 195 by a first rotation shaft 112, and secured to the unit base 195 by clamping long holes 116b of a mounting face 111a by means of mounting screws 116. The same components as those of FIG. 12 are designated by the same reference numerals, and the description is omitted here.

In the embodiment, since the lens frame 153 is tightly fixed to the unit base 195 by the screws 115, the mounting angle of the projection lens 128 is constant in contrast, since the projection tube frame 151 is held by the holder 111 which is axially supported on the unit base 195 by the first rotation shaft 112, the projection tube 121 is rotatable with respect to the projection lens 128 about the first rotation shaft 112. While the projection tube 121 is rotated by a predetermined angle, the holder 111 is fixed to the unit base 195 by fastening the mounting screws 116 into the long holes 111b formed on the mounting face 111a of the holder 111.

In the embodiment, the space 131 between the projection lens 128 and the projection tube 121 is filled with the cooling liquid 132. Since the projection unit is configured as described above, the cooling liquid never leaks even when the projection tube frame 151 is rotated.

Figure 20:
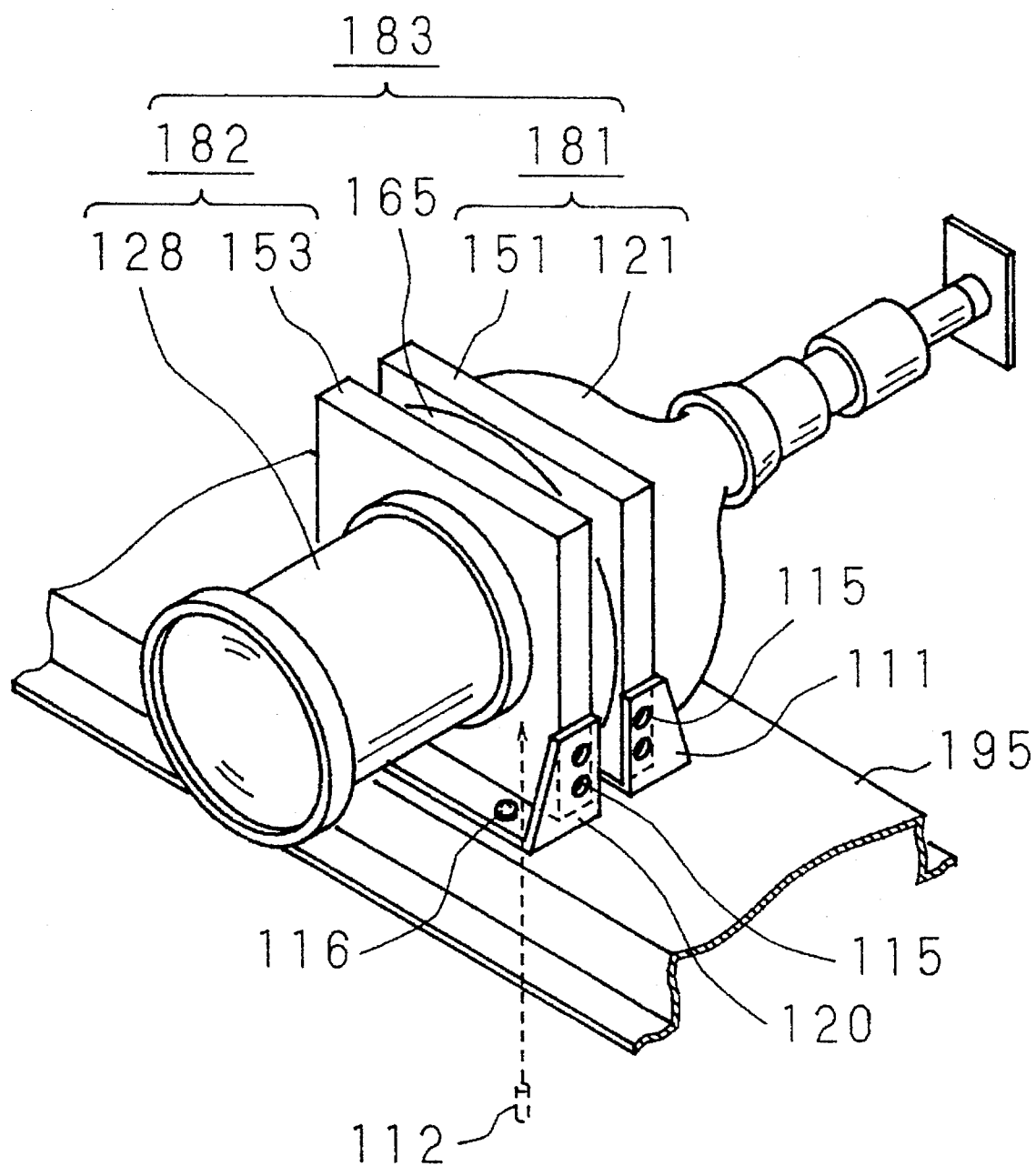
FIG. 20 is a perspective view showing a projection unit of a modification of Embodiment 3.

FIG. 20 is a perspective view showing a modification of Embodiment 3. In the same manner as in Embodiment 3, the holder 111 holding the projection tube frame 151 is axially supported on the unit base 195 by the first rotation shaft 112. The lens frame 153 is held by fastening the screws 115 onto a lens holder 120 which is fixed to the unit base 195 by mounting screws 116. Also this configuration achieves the same effects as those of the embodiment described above.

Figure 21:
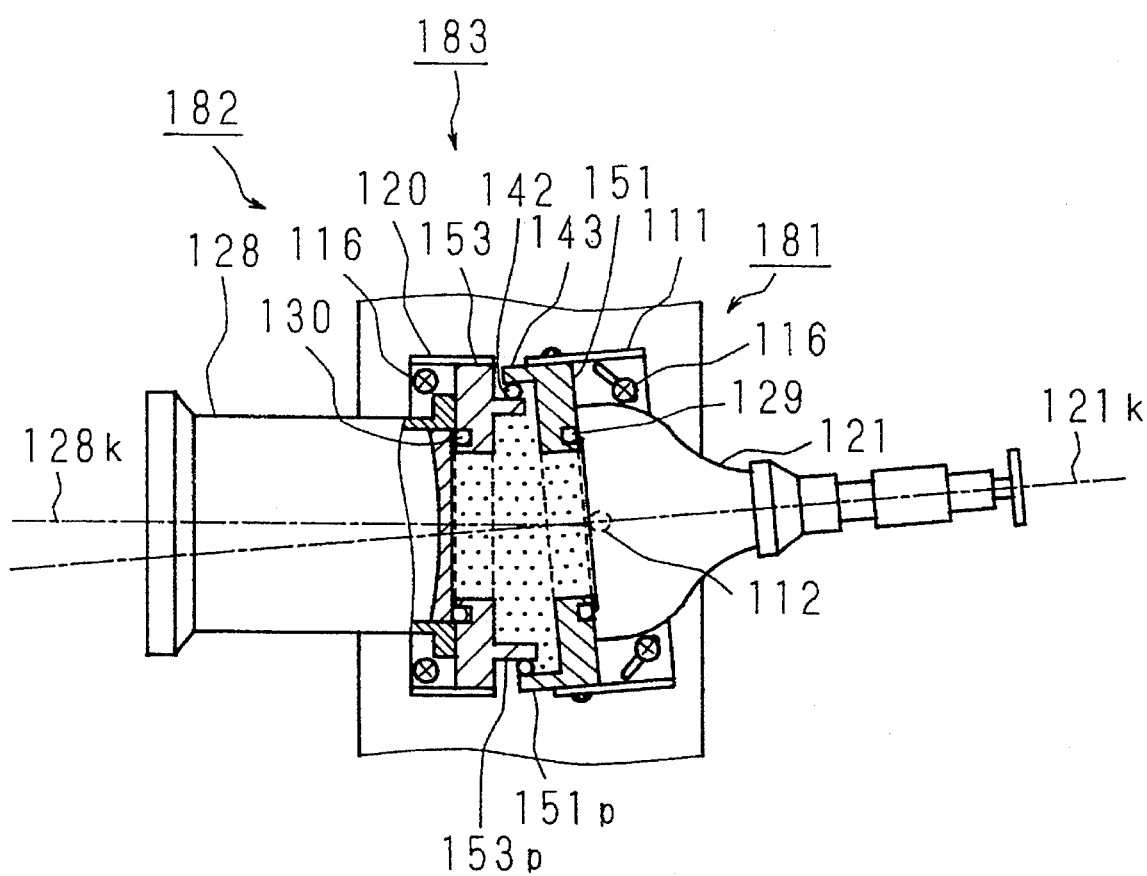
FIG. 21 is a plan view including a section of the main portion of another modification of Embodiment 3.

FIG. 21 is a plan view including a section of the main portion in another modification of Embodiment 3. The projection lens 128 is attached in the watertight state to the lens frame 153 via the lens packing 130. A round pipe portion 153p having a projection or protrusion in cross section is provided at the face of the lens frame 153 towards the projection tube 121. On the other hand, the projection tube 121 is set in the watertight state to the projection tube frame 151 via the projection tube packing 129. A round pipe portion 151p in the same cross section as the round pipe portion 153p is formed at the face of the projection tube frame 151 at in the side of the projection lens 128. A predetermined gap 143 is secured between the round pipe portions 151p and 153p. An O-ring 142 is inserted in the gap 143 to be compressed by the outer wall of the round pipe portion 153p, and the inner wall of the round pipe portion 151p, thereby keeping the watertight state.

When the projection tube 121 is to be inclined to the projection lens 128, the holder 111 holding the projection tube frame 151 is rotated about the first rotation shaft 112, and the gap 143 between the round pipe portions 151p and 153p is increased at one side and reduced at the opposite side. However, the gap 143 changes little because of the small inclination of the projection tube 121. In consequence, the degree of compression of the O-ring 142 is so little changed as to maintain the watertight state, making it possible to change the angle of the projection tube 121 while the cooling liquid 132 is filled.

In the modification, the round pipe portion 151p of the projection tube frame 151 is at the outside, and the round pipe portion 153p of the lens frame 153 is at the inside. The positional relationship of the round pipe portions may be inverted. Moreover, a groove may be formed in each of the round pipe portions 151p and 153p to set the O-ring 142. The faces of the round pipe portions 151p and 153p where the O-ring 142 is set may be curved, with the same effects attained.

Embodiment 4

Figure 22:
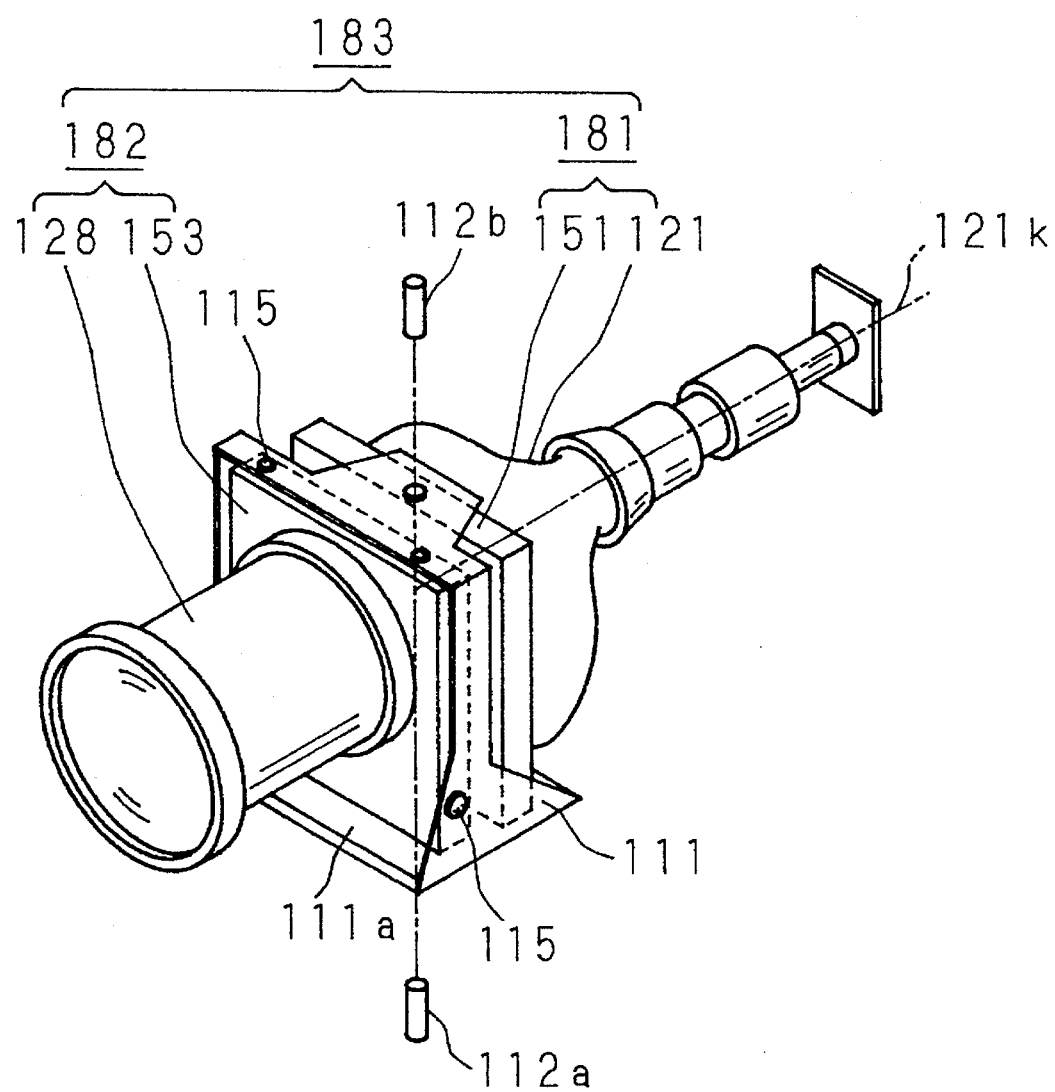
FIG. 22 is a perspective view showing a projection unit of Embodiment 4 of the invention.
Figure 23:
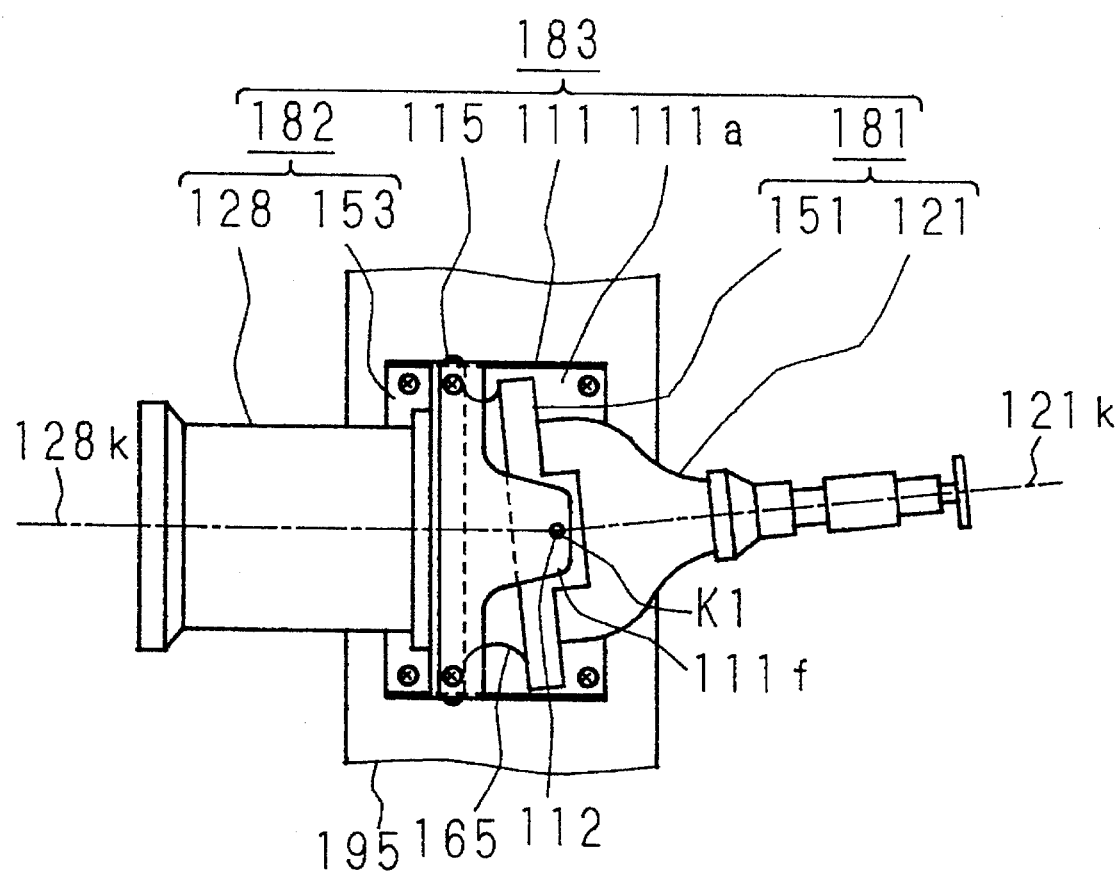
FIG. 23 is a plan view of the unit of Embodiment 4.

FIG. 22 is a perspective view showing a projection unit of Embodiment 4 of the present apparatus, and FIG. 23 is a plan view of the projection unit. As described before, generally, a reference point to set a projection unit 183 in a projecting-type display apparatus is an intersection K1 of an image display face (not shown) of a projection tube 121 and a tube axis 121k. First rotation shafts 112a and 112b of a holder 111 holding the projection unit 183 are positioned on the vertical axis passing through the intersection K1.

The holder 111 is connected to a lens frame 153 by screws 115. The first rotation shaft 112a is disposed on a mounting face 111a of the holder 111 on the axis below the intersection K1. An upper face 111f of the holder 111 is extended to reach the axis above the intersection K1, and the upper first rotation shaft 112b is set on the face. A projection tube frame 151 is rotatably supported by the lower and upper first rotation shafts 112a and 112b. The same or corresponding components as those of FIG. 18 are designated by the same reference numerals, and the description is abbreviated.

In this configuration as well, the projection tube 121 can be inclined to the projection lens 128 about the first rotation shafts 112, thereby attaining the same effects as those of Embodiment 3.

Embodiment 5

Figure 24:
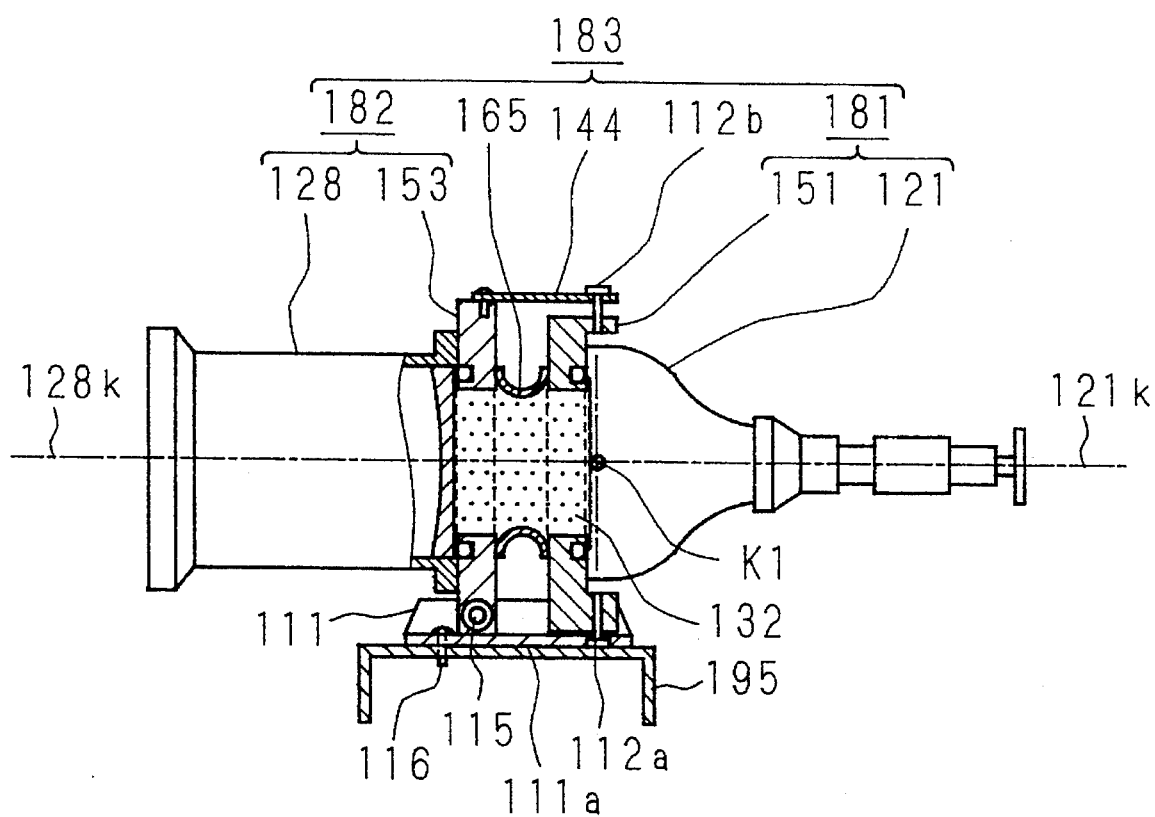
FIG. 24 is a side view including a section of the main portion of a projection unit of Embodiment 5 of the invention.

FIG. 24 is a side view including a section of the main portion of a projection unit of Embodiment 5 of the present apparatus. A holder 111 does not cover the whole of a lens frame 153, but holds only the lower portion. The holder 111 is fastened to the lens frame 153 by screws 115. In the same manner as in Embodiment 4, a first rotation shaft 112a is arranged on a mounting face 111a of the holder 111 on the axis below an intersection K1. On the other hand, an independent shaft plate 144 is fixed to the upper face of the lens frame 153 by screws 115. A first rotation shaft, 112b on the axis above the intersection K1 is provided in the shaft plate 144. A projection tube frame 151 is rotatably supported by the first rotation shafts 112a and 112b. The same components as those of FIG. 18 are designated by the same reference numerals, and the description is omitted.

In the embodiment, the projection tube 121 can be inclined to the projection lens 128 about the first rotation shafts 112, thereby attaining the same effects as those of Embodiment 3.

Although, the shaft plate 144 is prepared for each of the projection units 183, alternatively, three projection units may be retained by a single shaft plate. The same effects are similarly attained.

Embodiment 6

Figure 25:
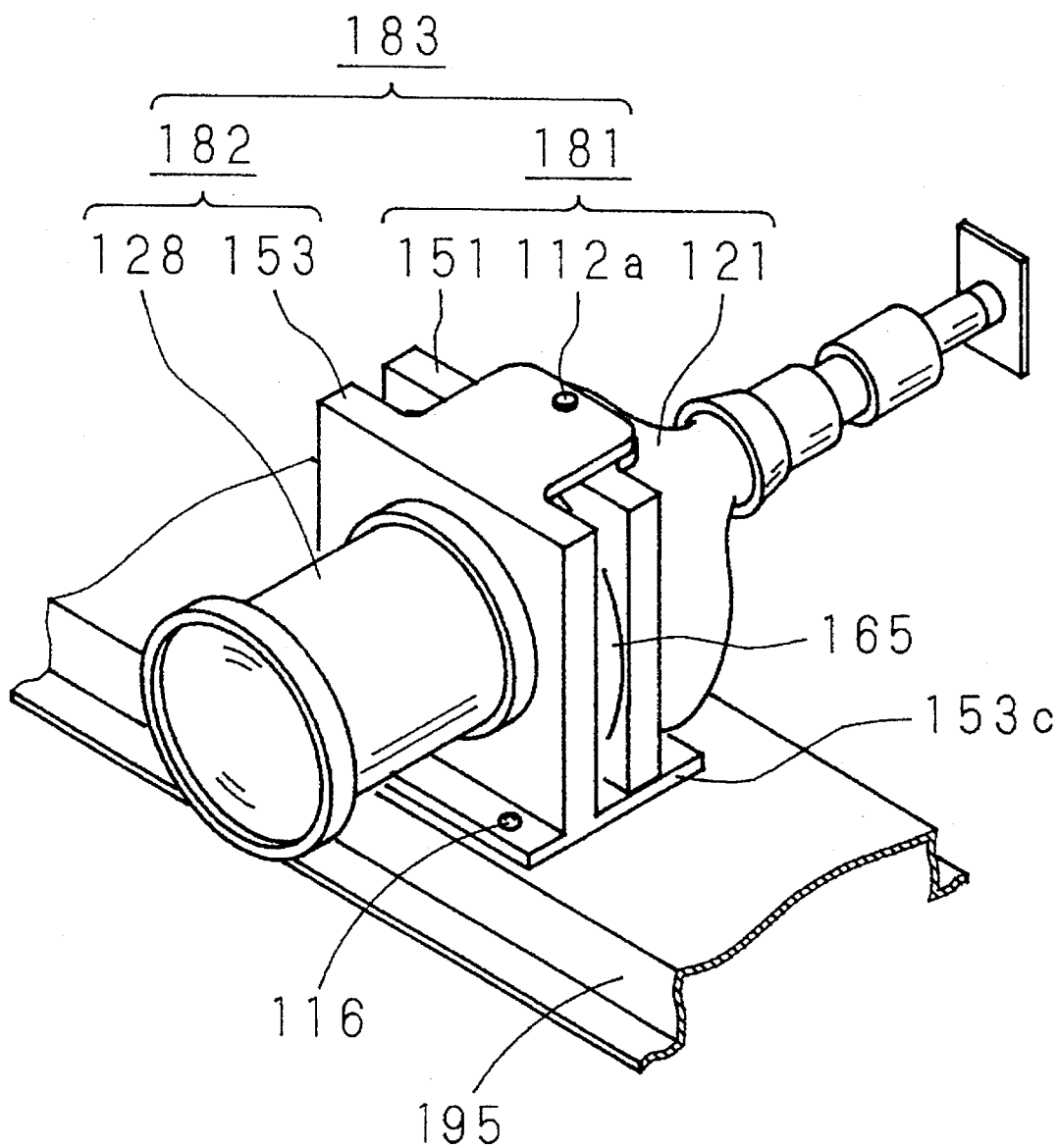
FIG. 25 is a perspective view showing a projection unit of Embodiment 6 of the invention.
Figure 26:
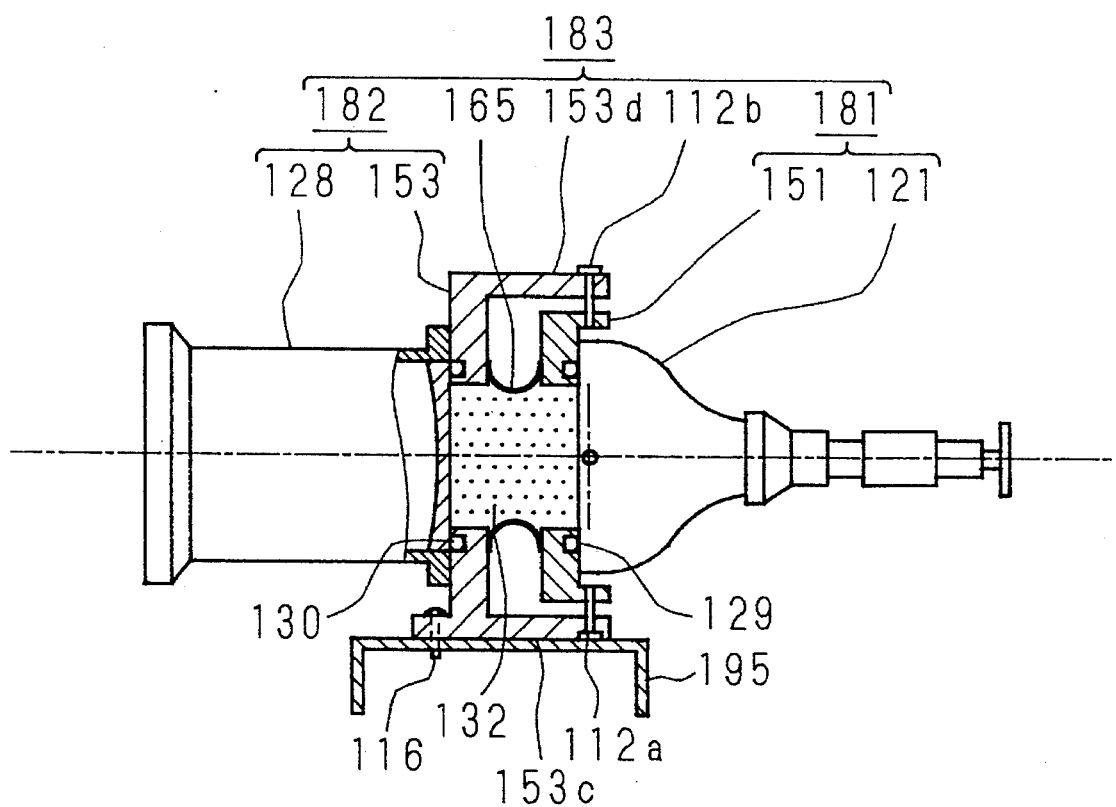
FIG. 26 is a side view including a section of the main portion of Embodiment 6.

FIG. 25 is a perspective view showing a projection unit of Embodiment 6 of the present apparatus, and FIG. 26 is a side view including a section of the main portion of the projection unit. A projection tube block 181 and a lens block 182 are connected in the watertight state by a flexible packing sheet 165 which is a molded product of rubber or the like. A suitable degree of slack is secured in the packing sheet 165 to maintain the watertight state, even when the angle of the blocks 181 and 182 is changed. A space 131 defined by the projection tube block 181, the lens block 182 and the packing sheet 165 is filled with a cooling liquid 132. A projection unit 183 is thus constructed.

A mounting face 153c is formed at the lower face of a lens frame 153, which is fixed to a unit base 195 by mounting screws 116. A lower first rotation shaft. 112a is set below the intersection K1. An upper first rotation shaft 112b is positioned at face 153d extended from the upper face of the lens frame 153 above the intersection K1. The first rotation shafts 112a and 112b cooperate to rotatably support a projection tube frame 151. The same components as those of FIG. 18 are designated by the same reference numerals, and the description is omitted.

Also in the embodiment, the projection tube 121 can be inclined to the projection lens 128 about the first rotation shafts 112, thereby accomplishing the same effects as those of Embodiment 3.

In the embodiment, the first rotation shafts 112a and 112b are set on the lens frame 153. Alternatively, the rotation shafts may be disposed on the projection tube frame 151, with the same effects attained.

Embodiment 7

Figure 27:
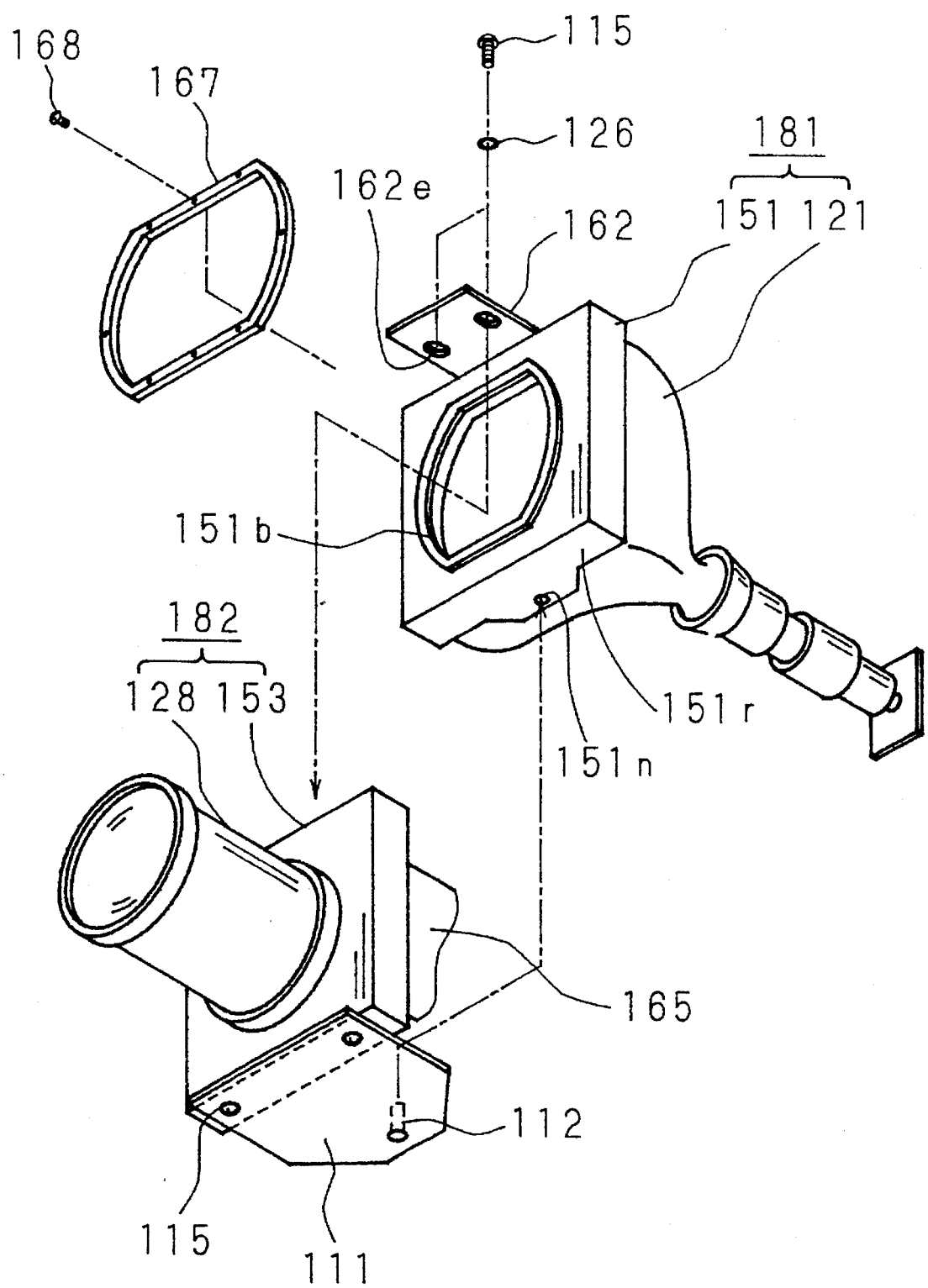
FIG. 27 is an exploded perspective view showing a projection unit of Embodiment 7 of the invention.
Figure 28:
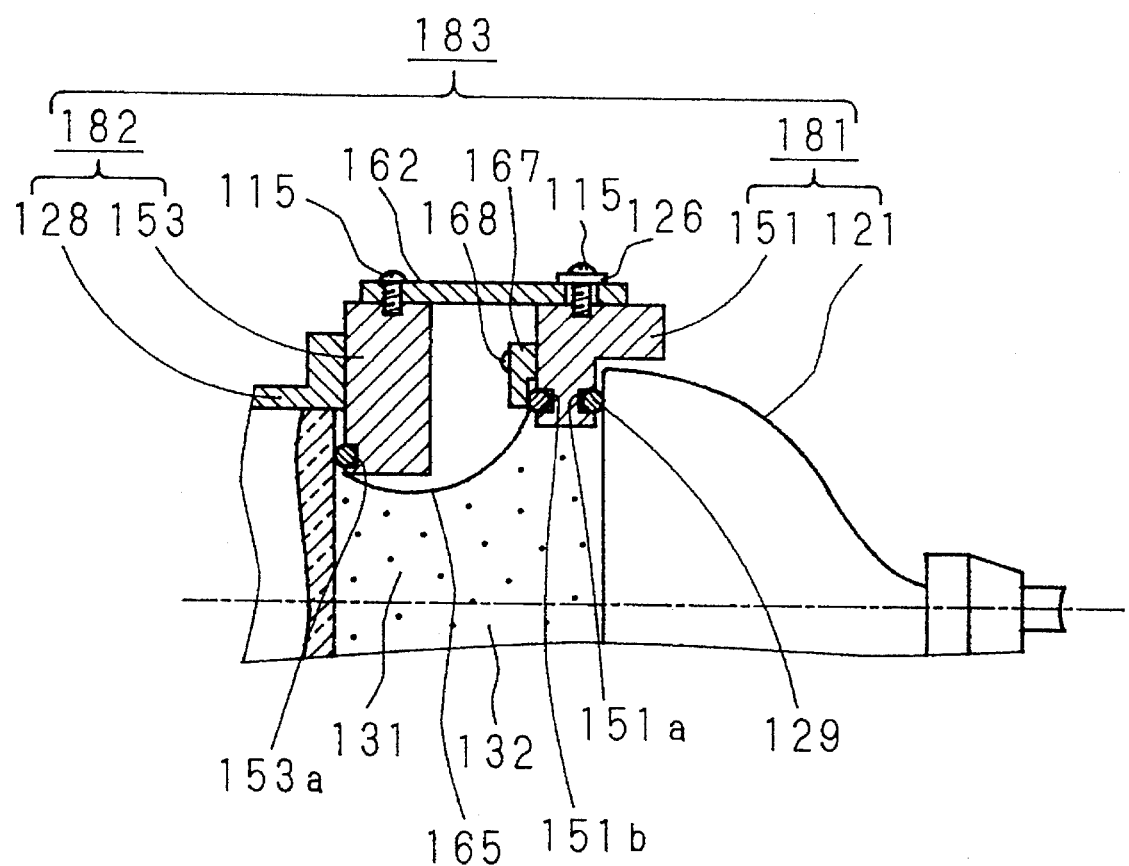
FIG. 28 is a side view including a section of the main portion of Embodiment 7.

FIG. 27 is an exploded perspective view showing a projection unit of Embodiment 7 of the present apparatus, and FIG. 28 is a side section view of the main portion of the projection unit. A lens frame 153 and a projection lens 128 are held in the watertight state via an edge portion formed at one end of a flexible packing sheet 165 of rubber or the like, thereby constituting a lens block 182. An edge portion formed at the other end of the flexible packing sheet 165 is fitted in an annular groove 151b formed at the peripheral edge at an opening of a projection tube frame 151 which peripheral edge is in the side of the projection lens 128. An annular plate 167 is attached to the projection tube frame 151 by screws 168. In this way, a space 131 defined by the lens block 182, a projection tube block 181, and the packing sheet 165 is kept watertight. The packing sheet 165 has a degree of slack to maintain the watertight state, even when the angle of the blocks 181 and 182 is changed. A space 131 defined by the projection tube block 181, the lens block 182 and the packing sheet 165 is filled with a cooling liquid 132. A projection unit 183 is constructed in the above-depicted manner.

A holder 111 with a first rotation shaft 112 is mounted at the lower face of the lens frame 153 by screws 115. The projection tube frame 151 has a shaft hole 151n which is rotatably meshed with the first rotation shaft 112, to be axially supported only at the lower portion of the frame. A lower face 151r of the projection tube frame 151 is contact with the holder 111 in a large area, and therefore the projection tube frame 151 is rotatable while maintaining its perpendicularity to the holder 111. After the projection tube 121 is rotated, each upper portion of the lens frame 153 and the projection tube frame 151 is fixed by screws 115 to a mounting plate 162 holding a single unit or all of the three projection units, whereby the frames are securely held. In order to allow the screws 115 to be fastened even when the projection tube frame 151 is rotated, mounting holes 162e of the mounting plate 162 are slotted, and the screws are fastened via washers 126. The same components as those of FIG. 24 are designated by the same reference numerals, and the description is omitted.

In the embodiment alike, the projection tube 121 can be inclined to the projection lens 128 about the first rotation shaft 112, so that the same effects as those of Embodiment 3 are achieved.

Embodiment 8

Figure 29:
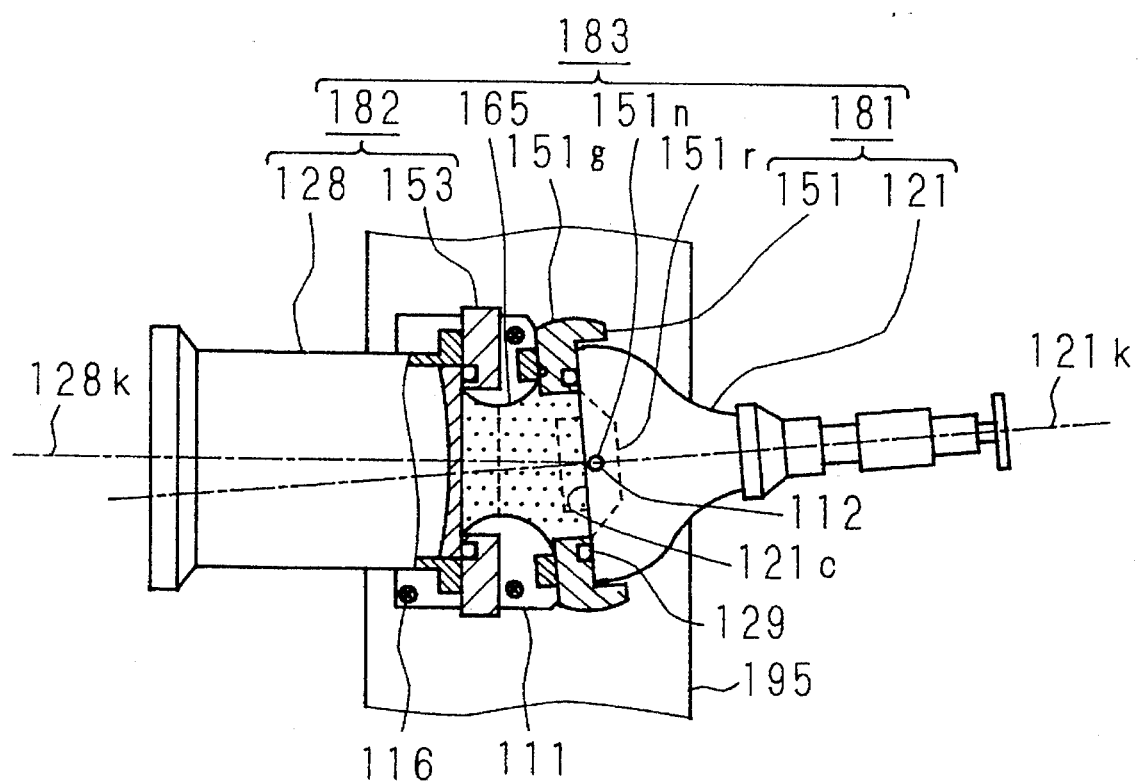
FIG. 29 is a plan view including a section of the main portion of a projection unit of Embodiment 8 of the invention.
Figure 30:
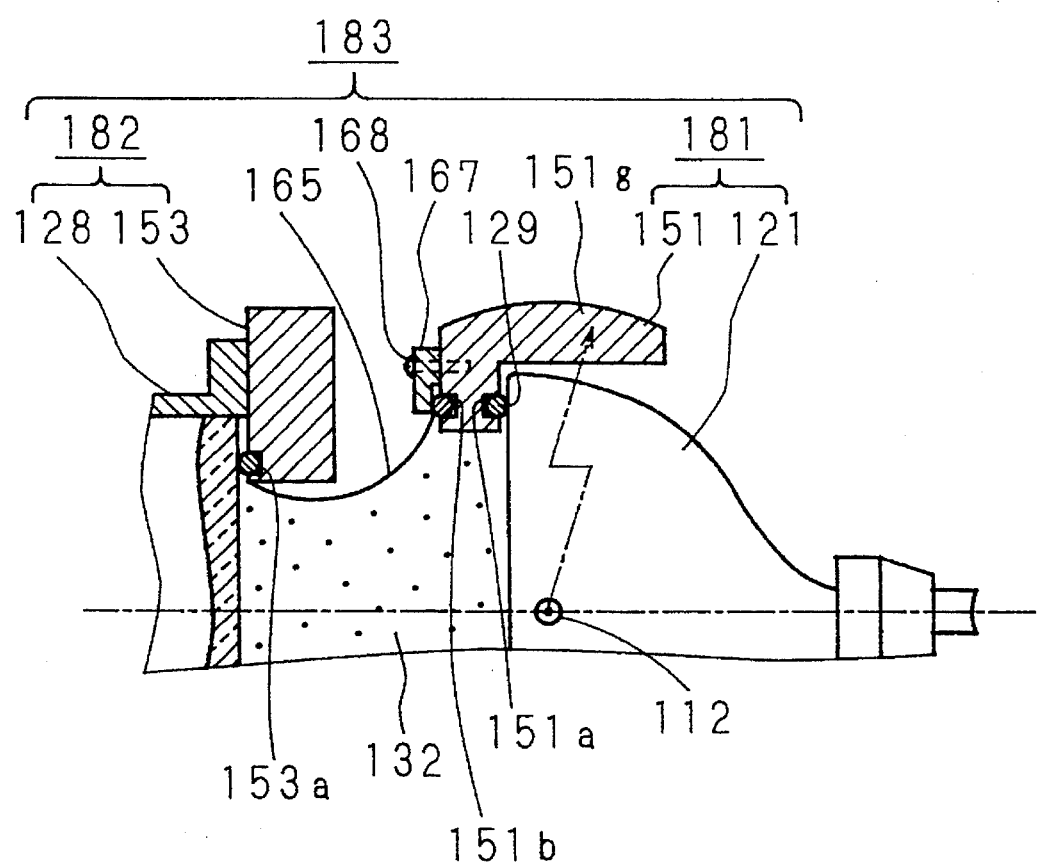
FIG. 30 is an enlarged plan view including a section of the main portion of Embodiment 8.

FIG. 29 is a plan view including a section of the main portion of a projection unit of Embodiment 8 of the present apparatus, and FIG. 30 is an enlarged section view of the main portion of the projection unit. A lens frame 153 is fixed at its lower portion to a unit base 195 via a holder 111 by screws 116. The holder 111 is provided with a first rotation shaft 112 which is rotatably fitted into a shaft hole 151n formed in a lower face 151r of a projection tube frame 151. An outer peripheral wall 151g in the rotating direction of the projection tube frame 151 is formed as a curved face having the curvature in the rotating direction. The same components as those of FIG. 28 are designated by the same reference numerals, and the description is omitted.

When the projector operates, since a display face 121c of the projection tube 121 is heated to high temperature, the heat is adapted to be transmitted via a cooling liquid 132 to the projection tube frame 151 to be dissipated outside. As the area of the outer wall of the projection tube frame 151 in contact with the outside air is increased, the heat is radiated more efficiency. If the outer wall is made large, however, an increased width is required in the rotation of the frame 151. Therefore, in order to reduce the lateral width required in the rotation of the projection tube frame 151, the outer peripheral wall 151g is curved into a circular arc centered on the first rotation shaft 112.

According to this configuration, the heat is radiated efficiently. Moreover, the projection tube 121 can be inclined to the projection lens 128 about the first rotation shaft 112, thereby attaining the same effects as those of Embodiment 3.

Embodiment 9

Figure 31:
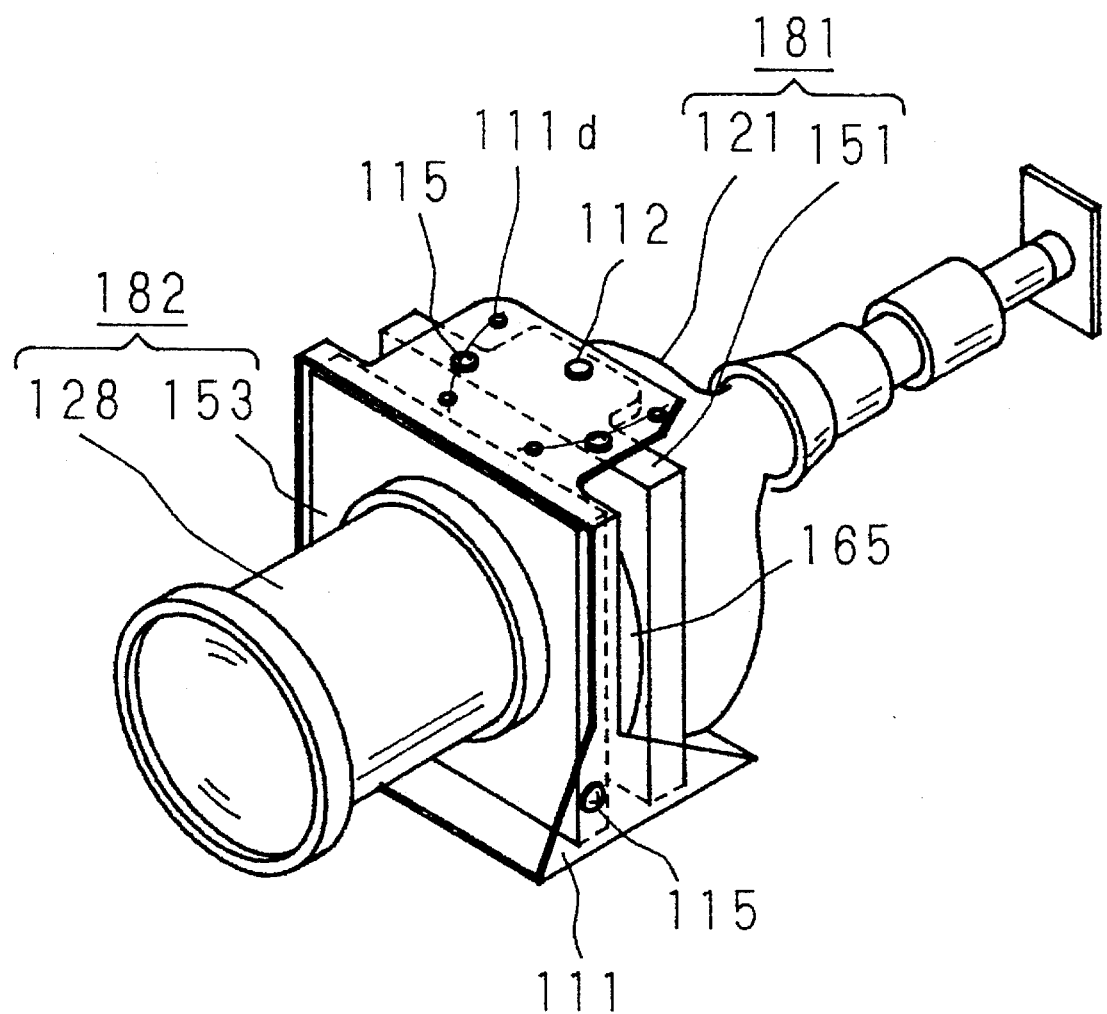
FIG. 31 is a perspective view showing a projection unit of Embodiment 9 of the invention.

FIG. 31 is a perspective view showing a projection unit of Embodiment 9 of the present apparatus. A lens holder 153 is fixed to a holder 111 by screws 115. A first rotation shaft 112 which supports a projection tube frame 151 in the rotatable fashion is disposed at a predetermined position of the holder 111. A plurality of mounting holes 111d for fixing the upper face of the projection tube frame 151 are formed at predetermined points on the circumference of the upper face of the holder 111 around the first rotation shaft 12. The same components as those of FIG. 18 or 24 are designated by the same reference numerals, and the description is omitted.

in order to change the screen size or the like of the projecting-type display apparatus, the projection tube 121 is inclined to the projection lens 128. In this case, the tilt angle is generally changed stepwise for each screen size. Therefore, when the projection tube frame 151 is rotated about the first rotation shaft 112 to be fitted in mounting holes 111d at a position corresponding to the tilt angle, the projection tube 121 is inclined.

The rotating angle of the frame is determined by the mounting holes 111d in the above example. However, the angle may be set by using a combination of a pin and holes, and the same effects are gained.

Embodiment 10

Figure 32:
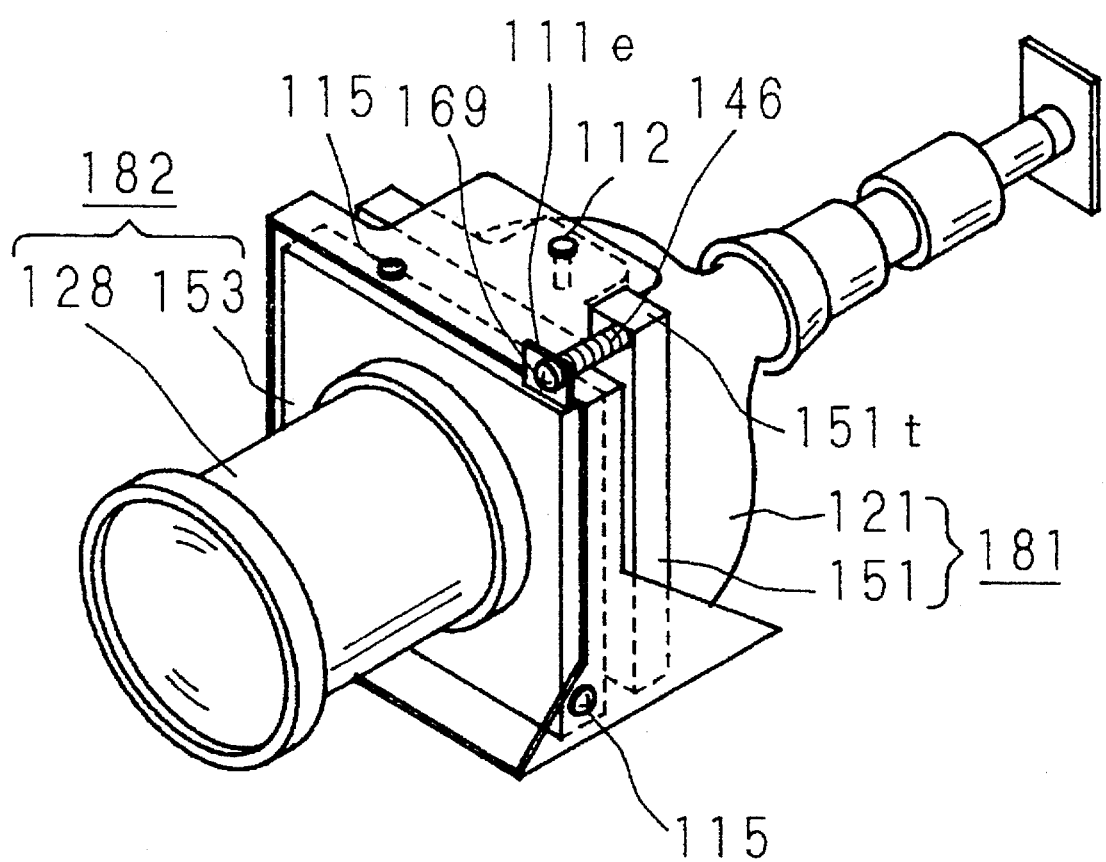
FIG. 32 is a perspective view showing a projection unit of Embodiment 10 of the invention.
Figure 33:
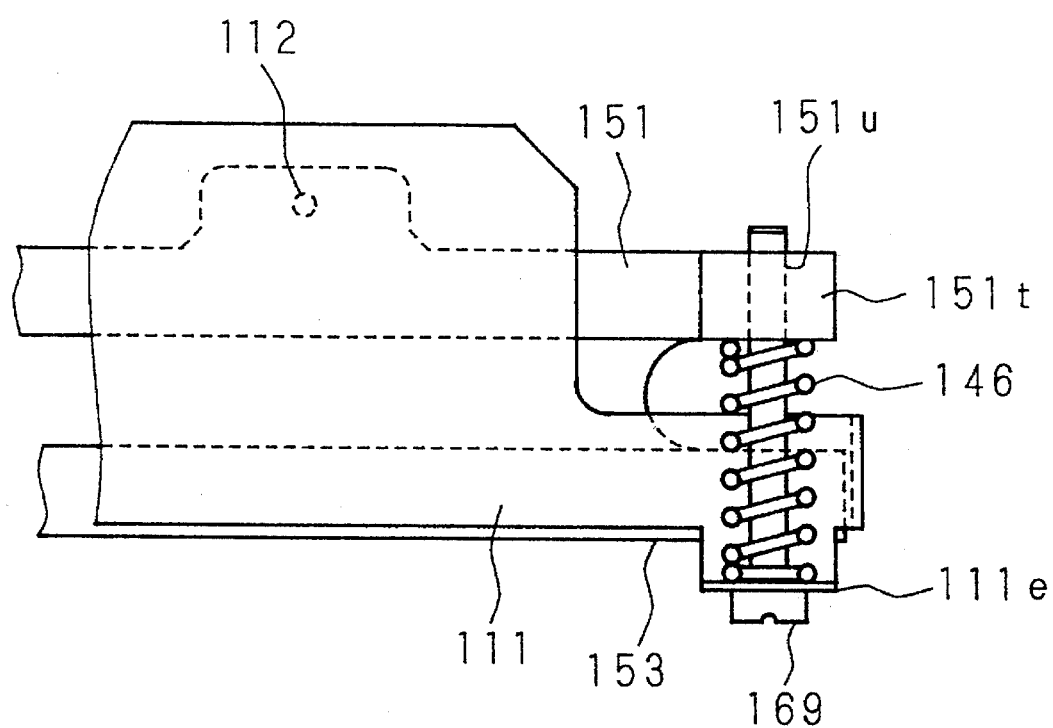
FIG. 33 is an enlarged view of the main portion of Embodiment 10.

FIG. 32 is a perspective view showing a projection unit of Embodiment 10 of the present apparatus, and FIG. 33 is an enlarged view of the main portion of the projection unit. A holder 111 fixes a lens frame 153 by means of screws, and rotatably supports a projection tube frame 151 via a first rotation shaft 112. A flange 111e is formed on the upper face of the holder 111. An adjusting screw 169 passing through the flange 111e to be screwed via a spring 146 into a threaded hole 151u of a projection or protrusion 151t at the upper face of the projection tube frame 151. The same components as those of FIGS. 12 and 18 are designated by the same reference numerals, and the description is omitted.

When the projection distance or the like of the projector is to be changed, a projection tube 121 is inclined to a projection lens 128. For this purpose, the adjusting screw 169 is rotated to change the distance between the lens frame 153 and the projection tube frame 151. Accordingly, the projection tube 121 can continuously be inclined to the projection lens 128 about the first rotation shaft 112. Since the spring 146 is arranged between the flange 111e of the holder 111 and the projection 151t of the projection tube frame 151, the distance between the projection tube frame 151 and the lens frame 153 is maintained in the preset state.

In the above example, the posture of the projection tube frame 151 and the lens frame 153 is maintained to be constant by the resilience of the spring 146. Alternatively, the projection tube frame 151 may be rotated by the adjusting screw 169 and the plurality of mounting holes formed on the holder 111 may be fixed by screws in a combination with Embodiment 9. The same effects are achieved also in the alternative arrangement.

Figure 34:
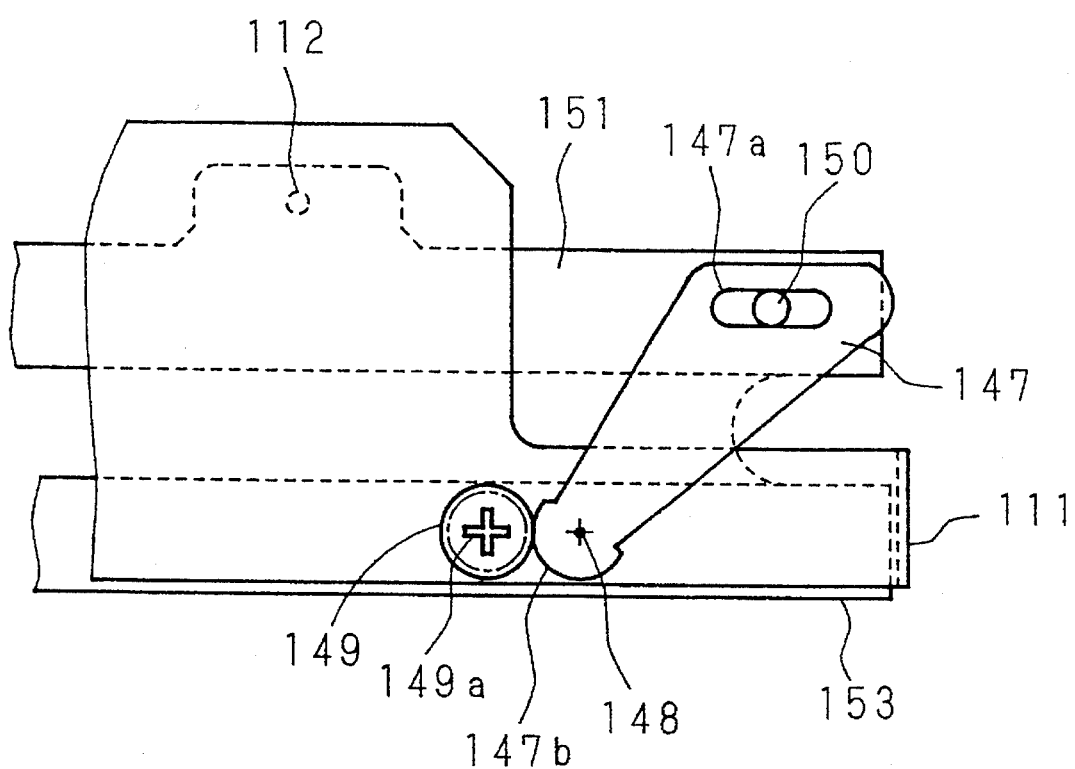
FIG. 34 is an enlarged view of the main portion of a projection unit of a modification of Embodiment 10.

FIG. 34 is an enlarged view of the main portion when the projection tube frame 151 is rotated in another method. A cam plate 147 having a cam groove 147a and a gear 147b is set on the holder 111 to be rotatable about a shaft 148. A gear 149 to be meshed with the gear 147b is also disposed on the holder 111. A crossed recess 149a is formed in the gear 149, so that the gear is rotatable by a tool such as a screw driver. On the other hand, a shaft 150 is pressed and inserted to the upper face of the projection tube frame 151 to be fitted into the cam groove 147a.

When the gear 149 is rotated by a screw driver, the cam plate 147 rotates about the shaft 148, and a shaft 150 slides and moves in the cam groove 147a. As a result, the distance between the shafts 148 and 150 is changed, allowing the projection tube frame 151 to rotate about the first rotation shaft 112.

Embodiment 11

Figure 35:
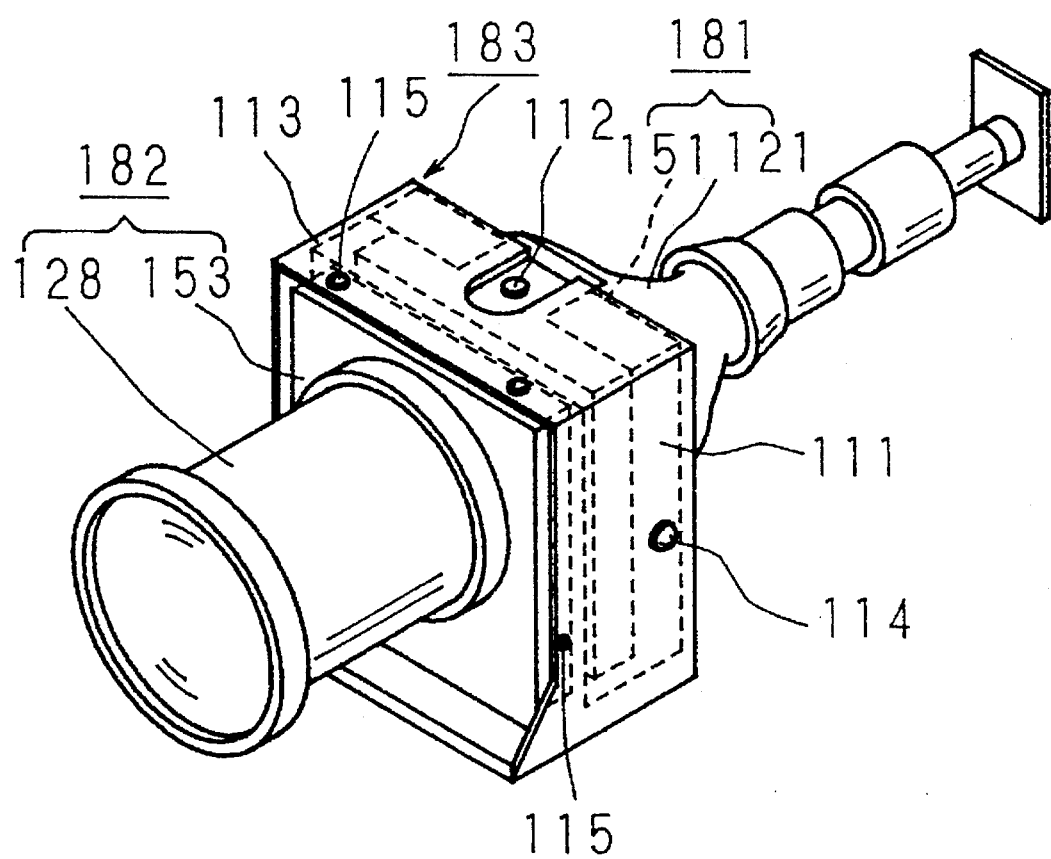
FIG. 35 is a perspective view showing a projection unit of Embodiment 11 of the invention.
Figure 36:
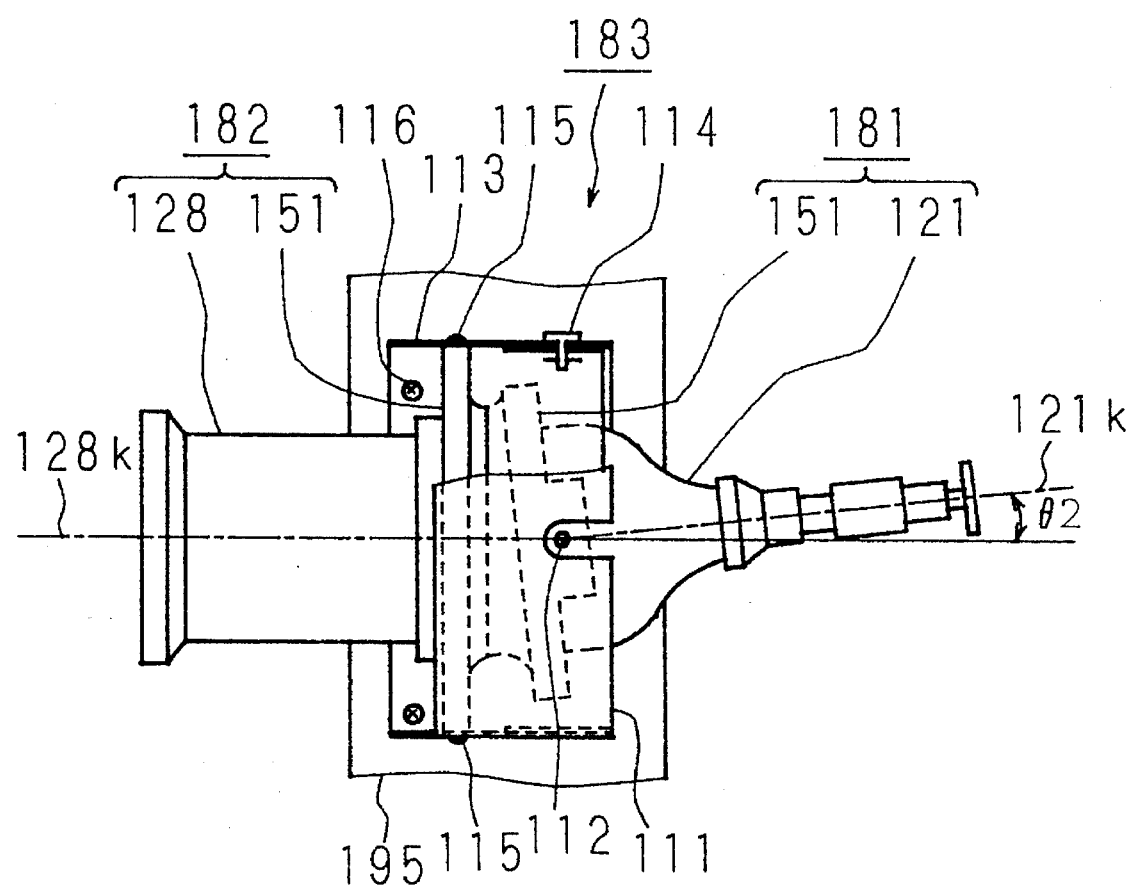
FIG. 36 is a plan view including a section of the main portion of Embodiment 11.

FIG. 35 is a perspective view showing a projection unit of Embodiment 11 of the present apparatus, and FIG. 36 is a plan view including a section of the main portion of the projection unit. A projection tube frame 151 having a projection tube 121 mounted thereto is rotatably supported on a frame-like holder 111 thereoutside by a first rotation shaft 112. The holder 111 is rotatably supported on a frame-like holder 113 disposed thereoutside by second rotation shafts 114 in such a manner as to be rotatable in a direction perpendicular to the rotating direction of the projection tube frame 151. A lens frame 153 is secured to the holder 113 by screws 115. The same components as those of FIGS. 18 and 28 are designated by the same reference numerals, and the description is omitted.

In order to bring the projected image in focus, three projection units 183 are adapted as to incline the side projection tubes 121 to the respective projection lenses 128 by a tilt angle θ2 in the horizontal direction. When the screen size is different, the tilt angle θ2 is naturally different. Each of the red, green, and blue projection units 183 consists of the projection tube frame 151 and the lens frame 153 in the same structure. Therefore, the projection tube frame 151 is rotated with respect to the holder 111 about the first rotation shaft 112 to satisfy the tilt angle θ.

When the vertical angle of the projection unit 183 is to be changed, the holder 111 is rotated with respect to the holder 113 about the second rotation shafts 114. As described above, according to Embodiment 11, the projection tube 121 can be inclined independently both in the horizontal and in the vertical directions, and therefore the projection tube 121 can be maintained in any inclined posture with respect to the projection lens 128.

Figure 37:
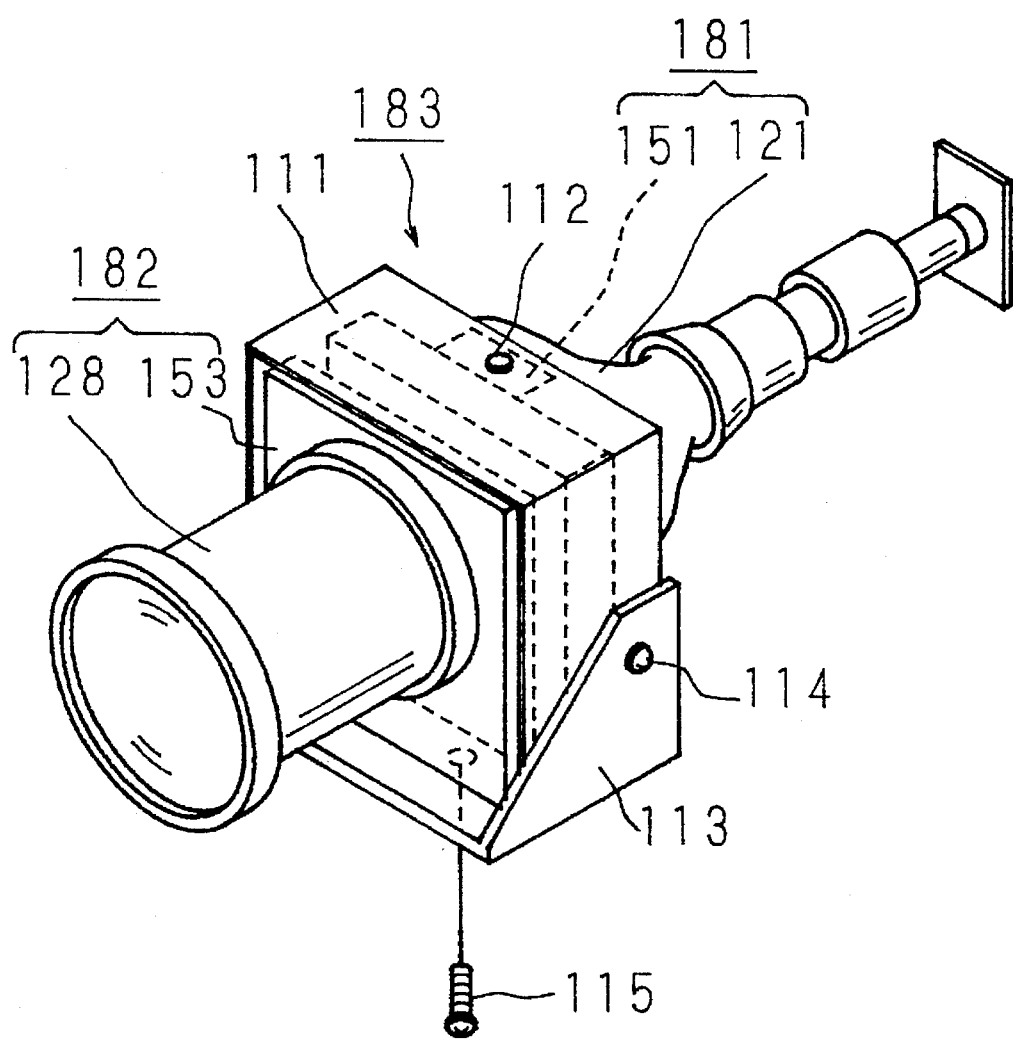
FIG. 37 is a perspective view showing a projection unit of a modification of Embodiment 11.

FIG. 37 is a perspective view showing a modification of Embodiment 11. In the figure, the holder 111 is formed of a frame-like body enclosing the projection tube frame 151, and axially supported by the first rotation shaft 112. The holder 113 is like a gate opened at the upper face thereof, axially supporting the holder 111 by means of the second rotation shafts 114. Even when holder 113 is formed in the above shape, namely, having the upper portion removed, the same effects are attained.

In the embodiment, the holder 111 is the base to rotate the projection tube frame in the horizontal direction and the holder 113 works to support the vertical rotation of the frame 151. The holders may be used vice versa.

Embodiment 12

Figure 38:
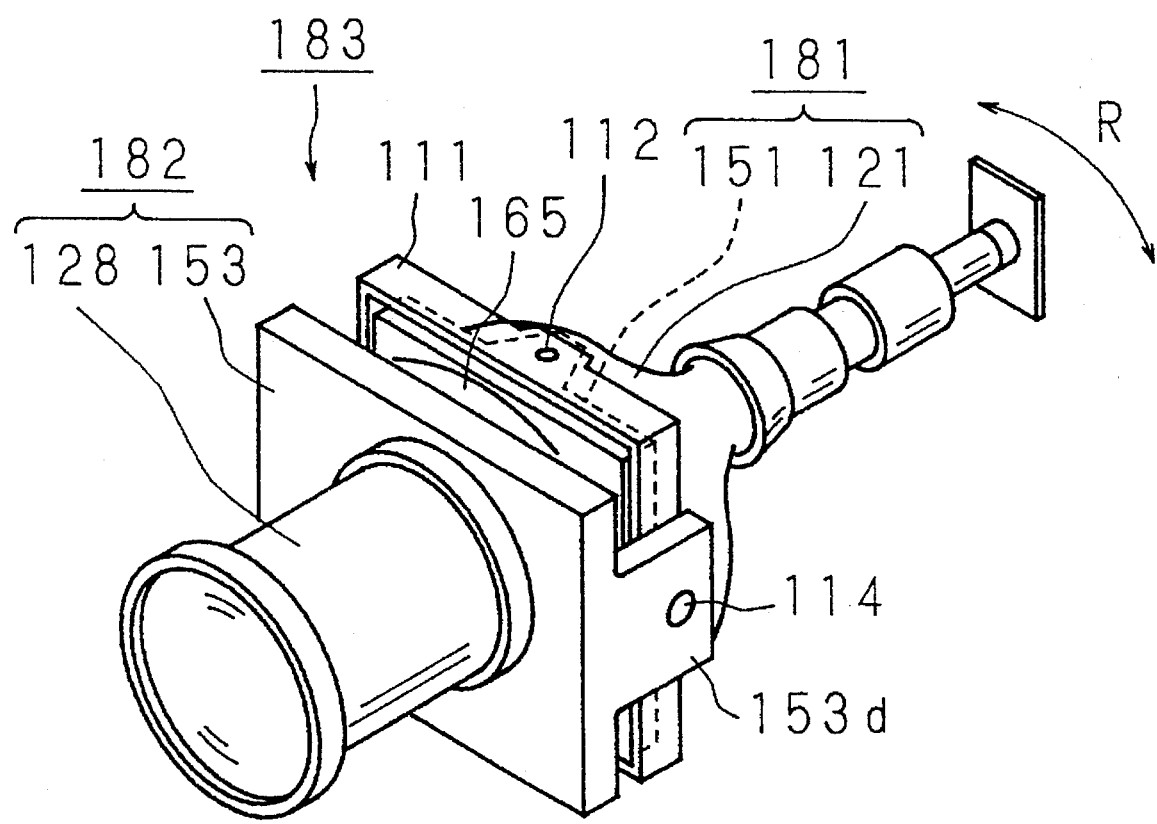
FIG. 38 is a perspective view showing a projection unit of Embodiment 12 of the invention.

FIG. 38 is a perspective view showing a projection unit of Embodiment 12 of the present apparatus. A projection tube frame 151 to which a projection tube 121 is attached is rotatably supported on a frame-like holder 111 disposed thereoutside by a first rotation shaft 112. At the same time, the holder 111 is rotatably supported directly to a lens frame 153 by second rotation shafts 114. In the projection unit, an extended face 153d of the lens frame 153 is formed perpendicularly to the rotation shaft 112, and the holder 111 is rotatably supported at a predetermined position of the extended face 153d by the second rotation shaft 114 so as to be rotatable in a direction perpendicular to the rotating direction R of the projection tube frame 151. The same components as those of FIGS. 18 and 35 are designated by the same reference numerals, and the description is omitted.

Also in the embodiment, the projection tube 121 can be inclined to the projection lens 128 about the first and second rotation shafts 112 and 114, and the same effects as those of Embodiment 11 are accomplished.

Embodiment 13

Figure 39:
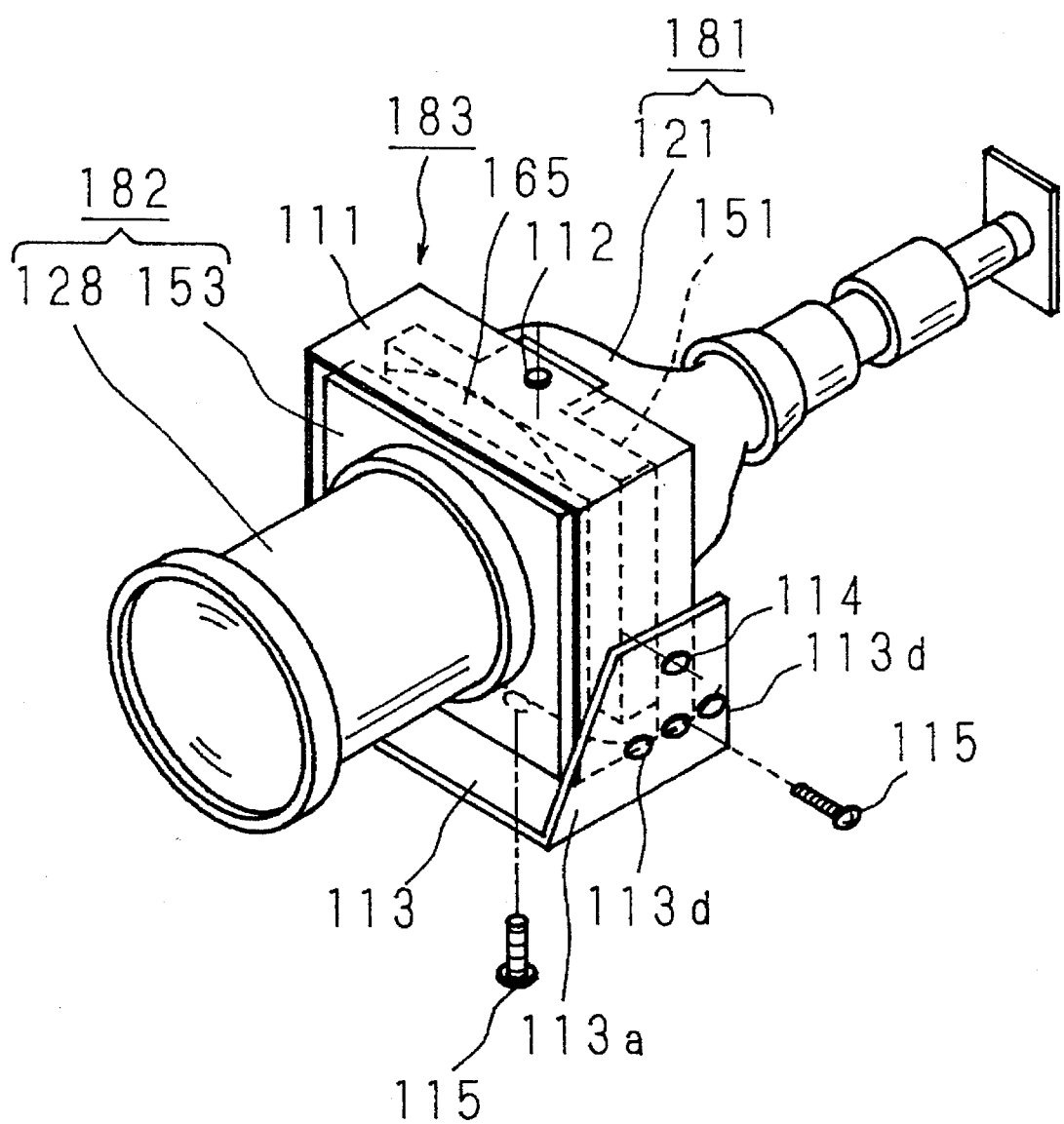
FIG. 39 is a perspective view showing a projection unit of Embodiment 13 of the invention.

FIG. 39 is a perspective view showing a projection unit of Embodiment 13 of the present apparatus. A projection tube frame 151 to which a projection tube 121 is attached is rotatably supported by a first rotation shaft 112 on a gate-like holder 111. The holder 111 is disposed outside the projection tube frame and is opened at the lower side. An inverted gate-like holder 113 which is opened at the upper side is provided outside the holder 111. The holder 111 is supported by second rotation shafts 114 running in the lateral direction of the projection unit so as to be rotatable in the vertical direction (or to change the tilt angle). A lens frame 153 having a projection lens 128 attached is fixed to the holder 113 by screws 115. On a side wall 113a of the holder 113 where the second rotation shaft 114 is disposed, a plurality of mounting holes 113d are formed at predetermined points on the circumference centered on the second rotation shaft 114. Similarly, a plurality of mounting holes 113d are formed also on a side wall opposed to the side wall 113a. The vertical angle can be changed by sending the screw 115 through one of the mounting holes 113d and thereby fixing the holder 111. The same components as those of FIGS. 18 and 35 are designated by the same reference numerals, and the description is omitted.

Next, the operation of the projection unit will be described.

When the projection tube 121 which is horizontally inclined a predetermined angle between the projection tube frame 151 and the holder 111 is to be vertically inclined, the holder 111 is rotated about the second rotation shafts 114. Since a plurality of mounting holes 113d at the side walls 113a of the holder 113 are formed to respectively correspond to the inclination angle, the projection tube 121 can be set at a predetermined inclining angle when the screw is inserted through the mounting hole 113d corresponding to the inclining angle, thereby fixing the holder 111.

Figure 40:
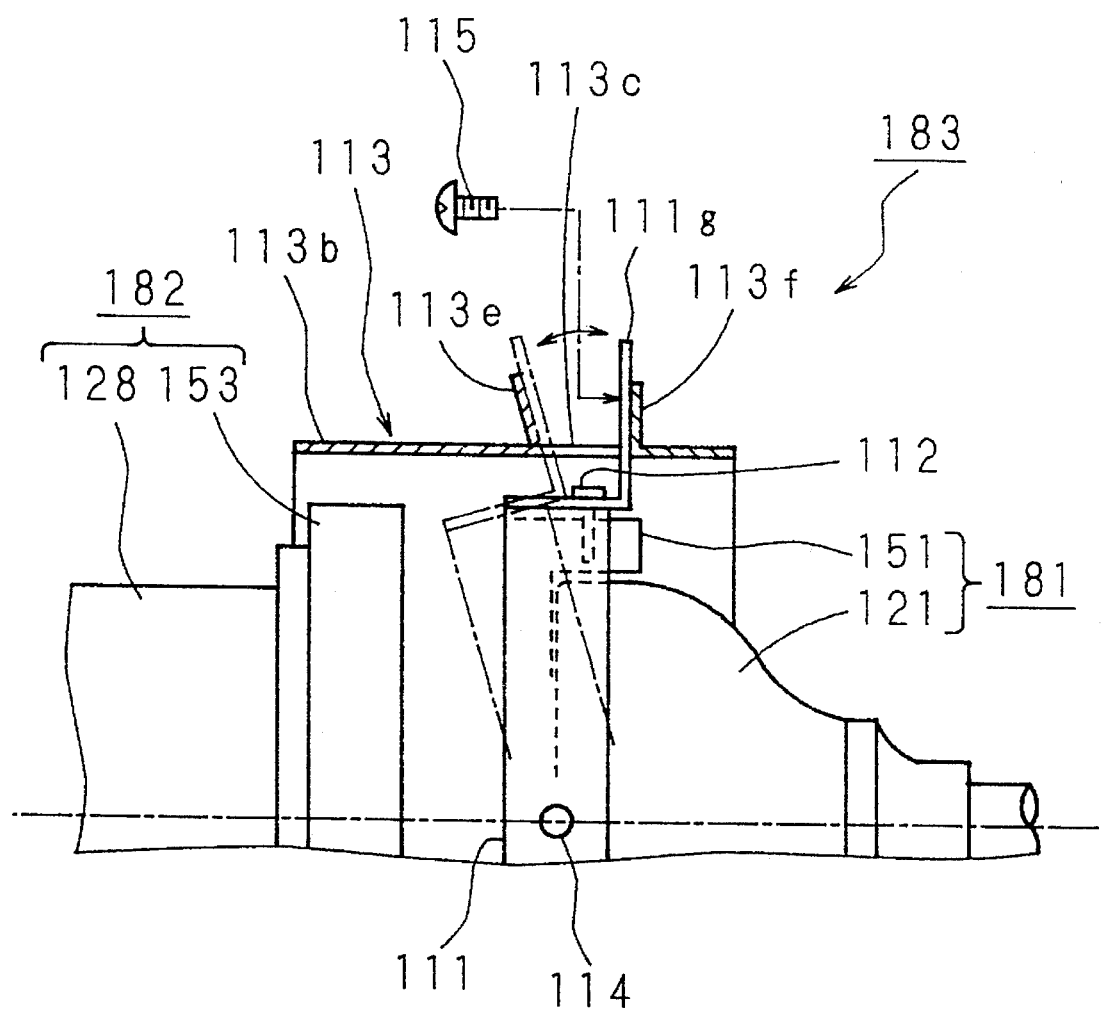
FIG. 40 is a side view including a section of the main portion of a projection unit of a modification of Embodiment 13.

FIG. 40 is a side section view of the main portion of a modification of Embodiment 13. In the embodiment, in order to maintain the vertical inclination of the holder 111, the holder 113 is provided with front and a rear contact faces. Specifically, the holder 113 having the holder 111 attached thereto is formed of a frame, and a hole 113c, and contact faces 113e and 113f protruding at predetermined angles are formed on the upper face 113b of the holder 113. On the other hand, a mounting face 111g is formed on the upper face of the holder 111 to which the projection tube frame 151 is attached. The mounting face 111g is inserted into the hole 113c and then fixed to either of the contact faces 113e and 113f by a screw 115, thereby maintaining the inclination of the holder 111. As described above, also when the contact portion to set the vertical inclination is formed on the upper face 113b of the holder 113, the same effects are attained.

In Embodiment 13 above, the vertical inclination is changed stepwise. This method may be applied to the horizontal inclination. The embodiment may be combined with Embodiment 9 so that the holder 111 be inclined both in the vertical and the horizontal directions.

Embodiment 14

Figure 41:
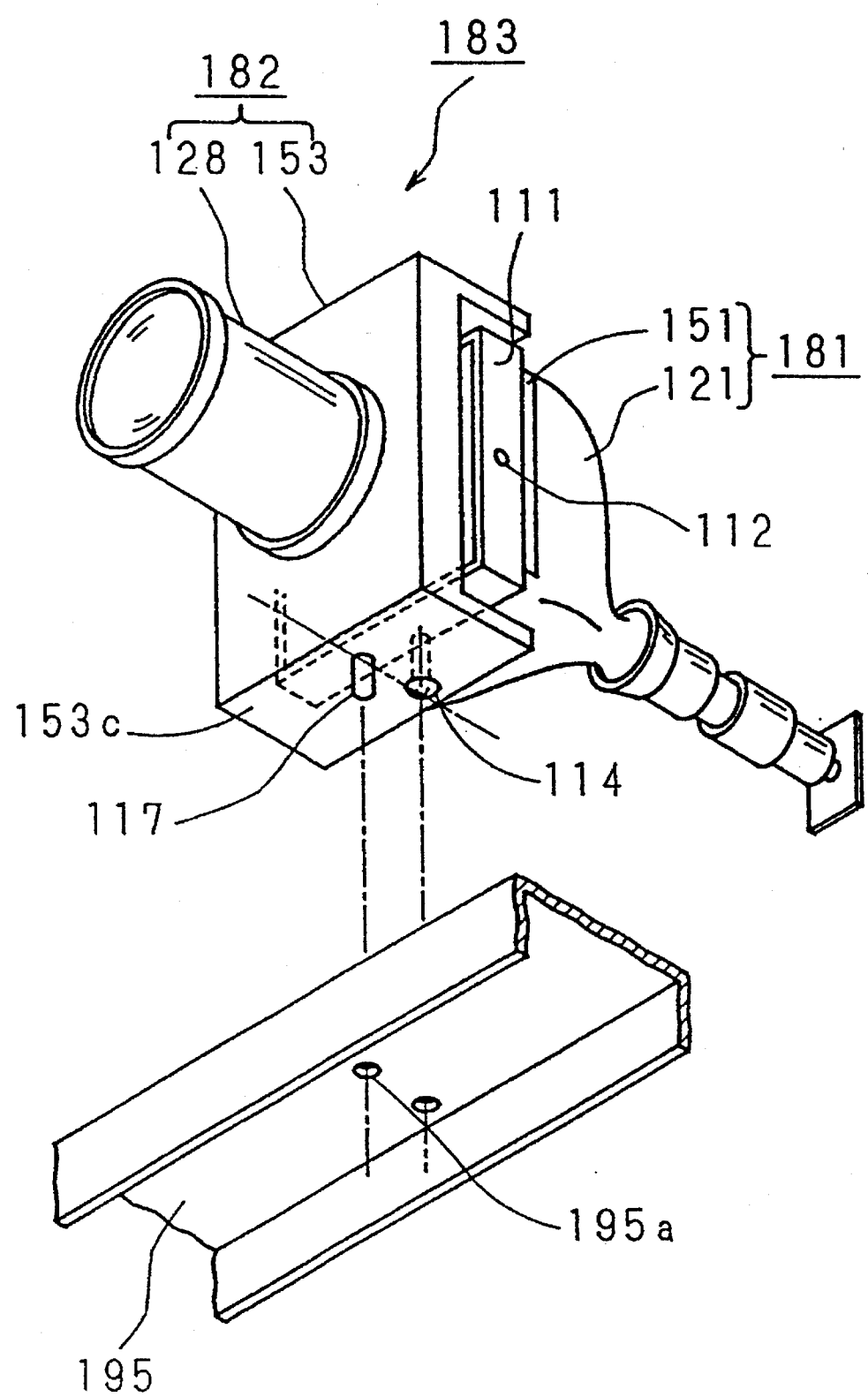
FIG. 41 is an exploded perspective view showing a projection unit of Embodiment 14 of the invention.
Figure 42:
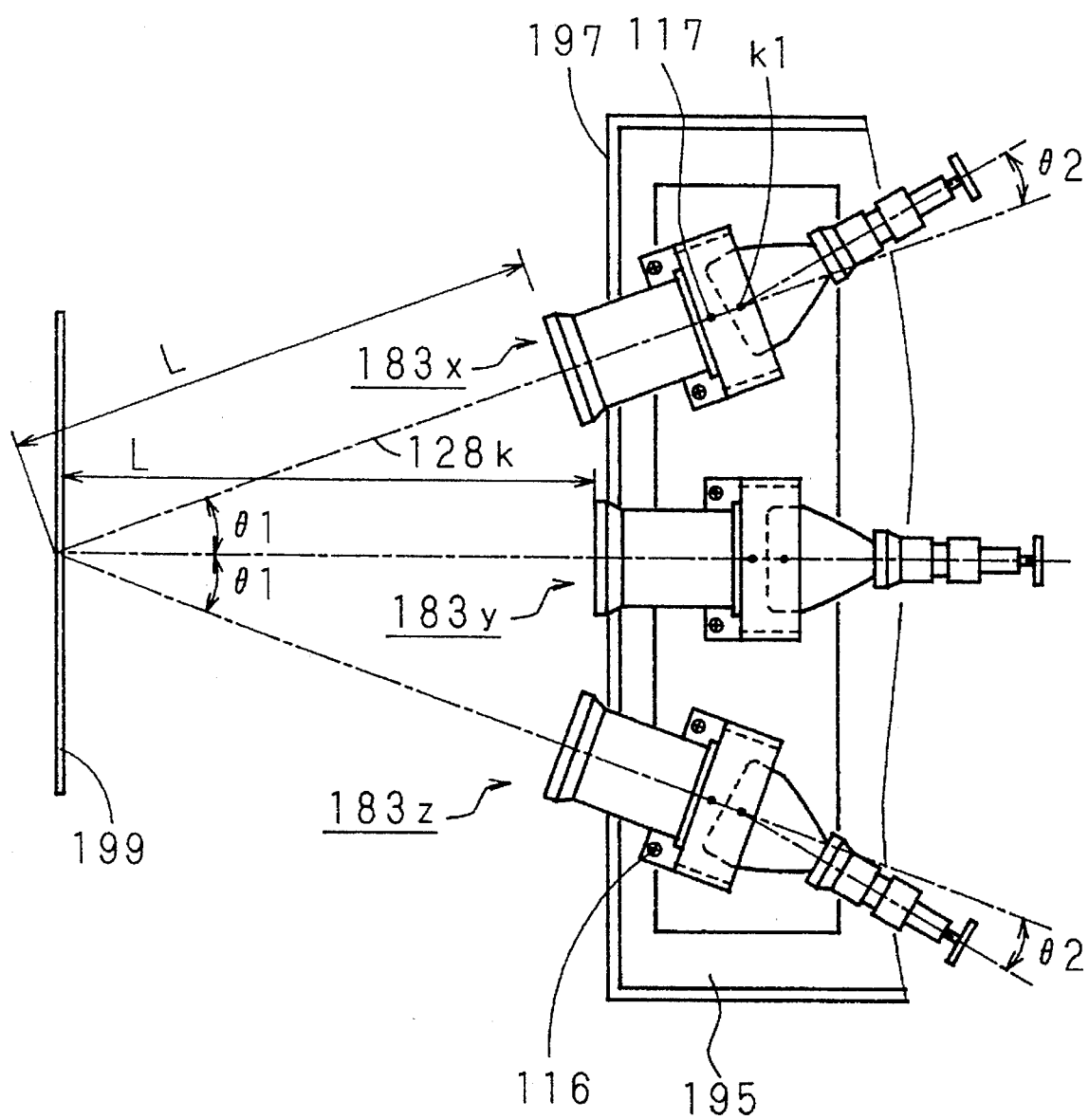
FIG. 42 is a diagrammatic plan view showing a projecting-type display apparatus of Embodiment 14 in which three projection units are used.

FIG. 41 is an exploded perspective view showing a projection unit of Embodiment 14 of the present apparatus, and FIG. 42 is a plan view when three projection units are set on a unit base. A projection tube frame 151 to which a projection tube 121 is attached is rotatably supported on a holder 111 arranged outside the projection tube frame by a first rotation shaft 112. A lens frame 153 is set outside the holder 111. The lens frame 153 and the holder 111 are rotatably supported directly by second rotation shafts 114, thereby constituting a projection unit 183. On a mounting face 153c of the lens frame 153 is provided a third rotation shaft 117 which is fitted into a shaft hole 195a formed at a predetermined position of the unit base 195. The same components as those of FIGS. 18 and 35 are designated by the same reference numerals, and the description is omitted.

Next, the operation will be described. When the projection distance L of the projector is changed, the angle θ1 (field angle) of an optical axis 128k of the three projection units 183 with respect to a screen 199 is changed. This is solved by rotating the side projection units 183x and 183z on the unit base 195. In this case, when each of the projection units is rotated about the third rotation shaft 117 at the mounting face 153c of the lens frame 153, the projection unit is rotatable while keeping the projection distance L to the screen 199 equal to that of the other unit. After the field angle θ1 is changed in the above way, the lens frame 153 is fastened to the unit base 195 by mounting screws 116. With respect to the inclination of the projection lens 128 and the projection tube 121 subsequent to the change of the projection distance, the projection tube 121 can be inclined to the projection lens 128 about the first and second rotation shafts 112 and 114, and the same effects as those of Embodiment 11 are attained.

Embodiment 15

Figure 43:
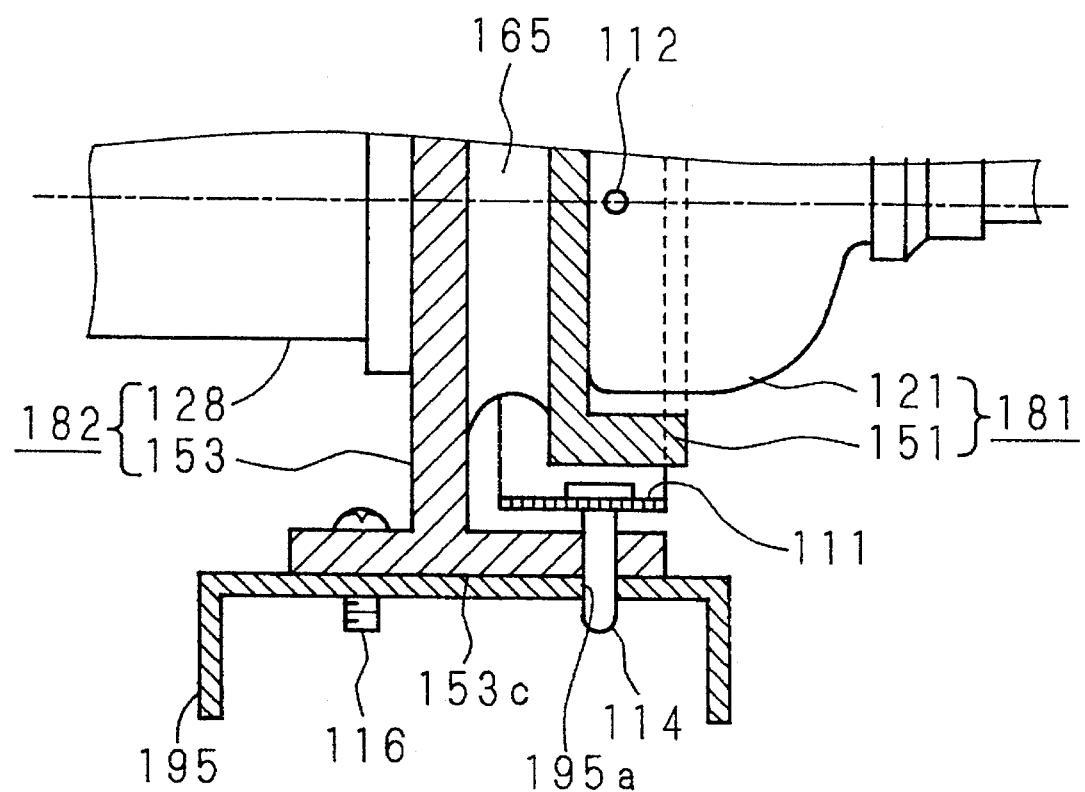
FIG. 43 is a side view including a section of the main portion of a projection unit of Embodiment 15 of the invention.

FIG. 43 is a side section view of the main portion of a projection unit of Embodiment 15 of the present apparatus. A projection tube frame 151 with a projection tube 121 is rotatably supported on a holder 111 outside the projection tube frame by a first rotation shaft 112. A lens frame 153 is set outside the holder 111. The lens frame 153 and the holder 111 are rotatably supported directly by a second rotation shaft 114, thereby constituting the projection unit 183. The second rotation shaft 114 is positioned at the center of the rotation of the mounting angle of three projection units 183, and therefore the front end of the second rotation shaft 114 is directly fitted into a shaft hole 195a of a unit base 195. The same components as those of FIGS. 18 and 41 are designated by the same reference numerals, and the description is omitted.

Also in the embodiment, the projection tube 121 can be rotated with respect to the projection lens 128 about the first and second rotation shafts 112 and 114, and the field angle can be changed by rotating the projection unit 183 about the third rotation shaft 117, whereby the same effects as those of Embodiments 3 and 14 are attained.

Embodiment 16

Figure 44:
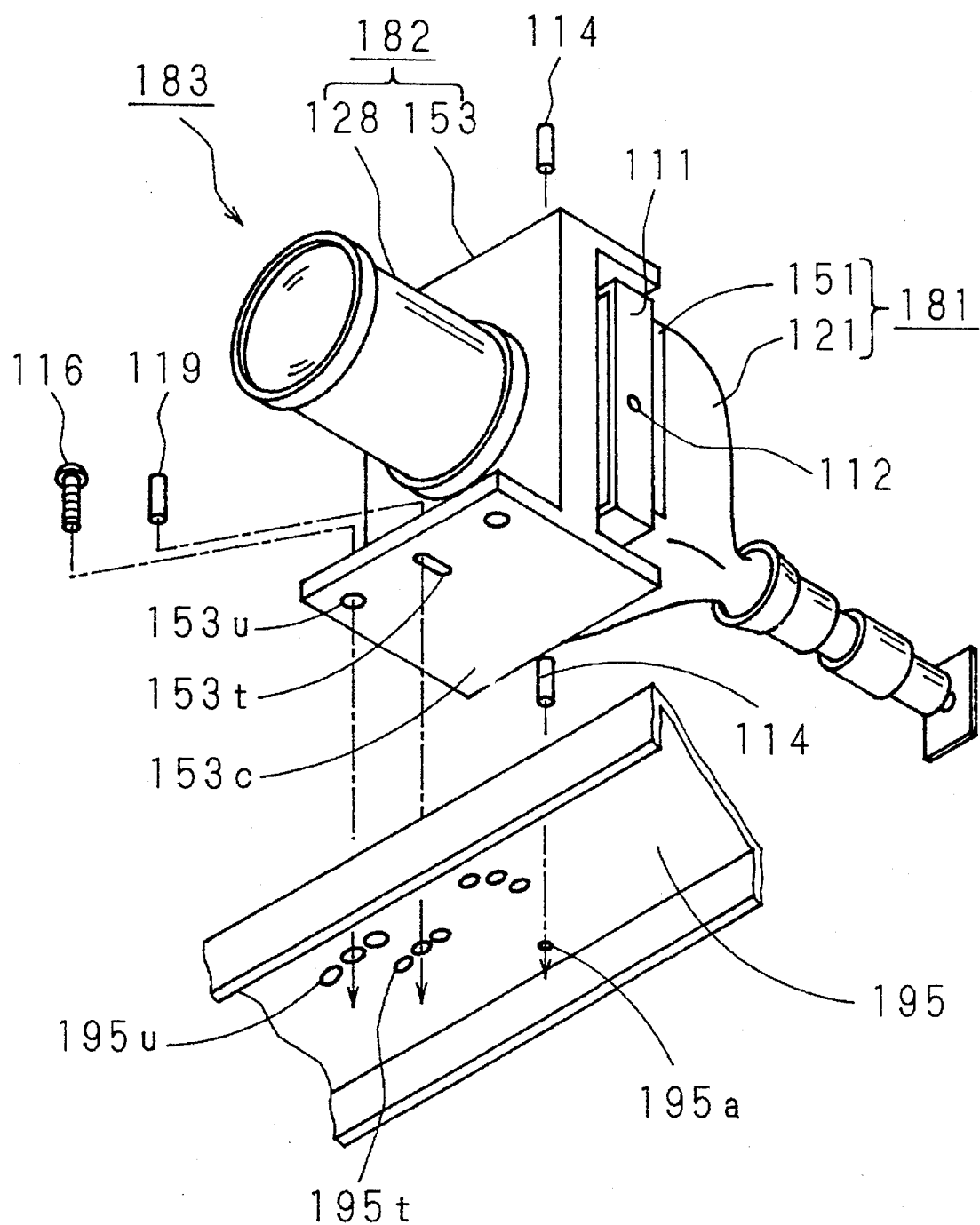
FIG. 44 is an exploded perspective view showing a projection unit of Embodiment 16 of the invention.

FIG. 44 is an exploded perspective view showing a projection unit of Embodiment 16 of the present apparatus. A projection tube frame 151 to which a projection tube 121 is attached is rotatably supported on a holder 111 arranged outside the projection tube frame by a first rotation shaft 112. A lens frame 153 is disposed outside the holder 111. The lens frame 153 and the holder 111 are rotatably supported directly by a second rotation shaft. 114, thereby constituting a projection unit 183. The second rotation shaft 114 rotatably supporting the lens frame 153 and the holder 111 projects from a mounting face 153c of the lens frame 153, and functions also as a rotation shaft when the field angle is changed. A positioning hole 153t and a mounting hole 153u are formed at predetermined positions of the mounting face 153c.

On a unit base 195, there are formed a shaft hole 195a to be fitted with the second rotation shaft 114, and a plurality of positioning holes 195t, and threaded portions 195u. The positioning holes 195t and the threaded portions 195u are aligned a predetermined intervals on the circumference around the shaft hole 195a. The same components as those of FIGS. 18, 35 and 41 are designated by the same reference numerals, and the description is omitted.

Next, the operation of the unit will be described. When the field angle is to be changed, the projection unit 183 is rotated on the unit base 195 at the fulcrum of the second rotation shaft 114. At this time, the rotating angle is determined by passing a positioning pin 119 through the positioning hole 153t of the lens frame 153, and the positioning hole 195t of the unit base 195. The positioning holes 195t of the unit base 195 are arranged to represent a locus like stairs so that the rotating angle is set at a predetermined value corresponding to the projection distance. After the rotating angle is determined, a mounting screw 116 is passed through the mounting hole 153u and subsequently one of the threaded portions 195u corresponding to the rotating angle, thereby fixing the projection unit 183.

Embodiment 17

Figure 45:
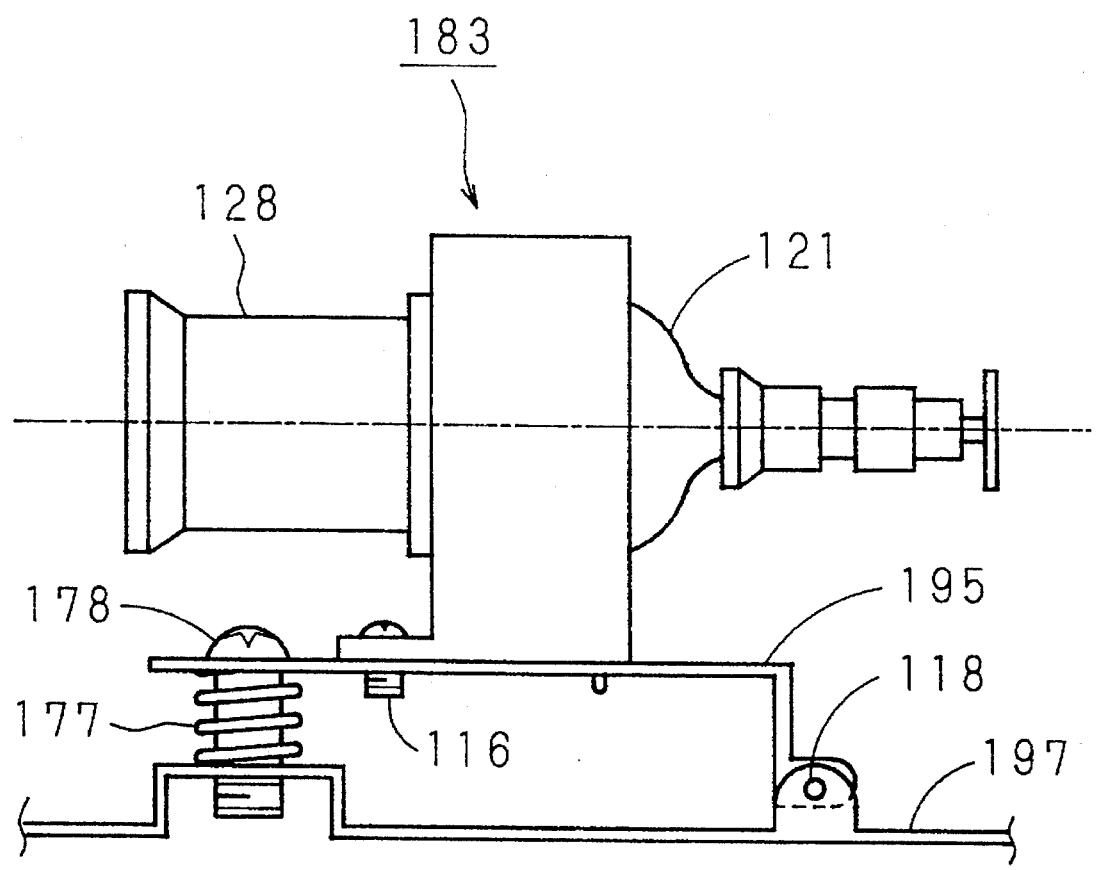
FIG. 45 is a side view showing a projection unit of Embodiment 17 of the invention.

FIG. 45 is a side view showing a projection unit of Embodiment 17 of the present apparatus. Three, i.e., red, green, and blue projection units 183 each comprising a projection lens 128 and a projection tube 121 inclined a predetermined angle are mounted to a unit base 195 by mounting screws 116. The unit base 195 is secured to an outer case 197 by a fourth rotation shaft 118 at the bottom thereof at the side of the projection tube 121 in the rotatable manner in the vertical direction. On the other hand, the unit base 195 at the side of the projection lens 128 is fastened via a spring 177 to the outer case 197 by an adjusting screw 178. The same components as those of FIGS. 18, 35 and 41 are designated by the same reference numerals, and the description is omitted.

Figure 46:
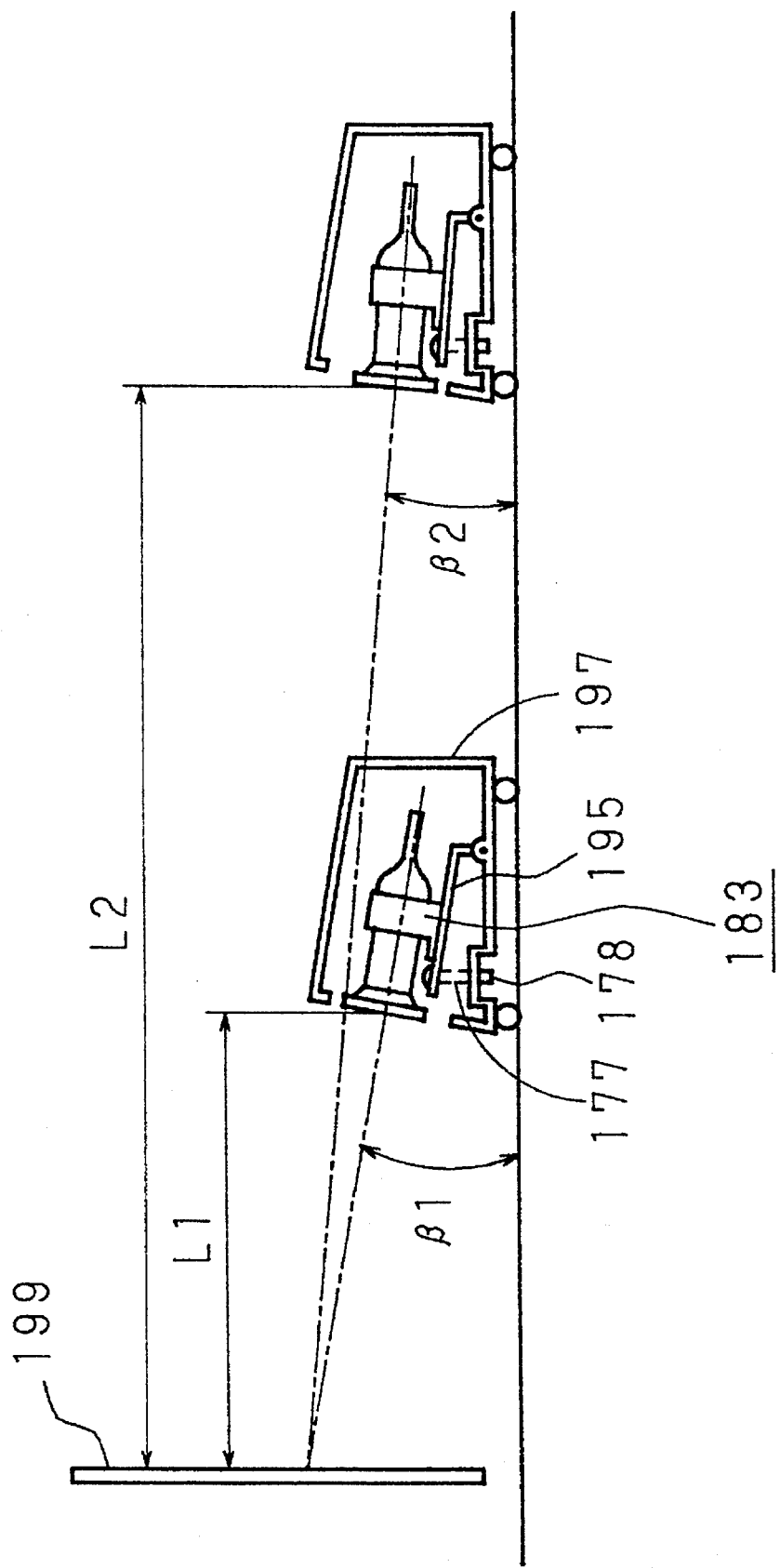
FIG. 46 is a view illustrating the relationship between the projection distance and the vertical angle of a projector according to Embodiment 17.

Next, the operation of the projection unit will be described. FIG. 46 is a diagram showing the relationship between the projection distance L and the vertical angle β. Supposing that the vertical angle is β1 when the projection distance is L1, the vertical angle should be changed to β2 to increase the projection distance to L2 through the rearward movement of the projector. Therefore, the adjusting screw 178 is rotated to turn the unit base 195 at the fulcrum of the fourth rotation shaft 118. Since the unit base 195 is held at an arbitrary angle by the spring 177 interposed between the adjusting screw 178 and the outer case 197, the three projection units 183 mounted to the unit base 195 can be set simultaneously to the predetermined vertical angle β.

Figure 47:
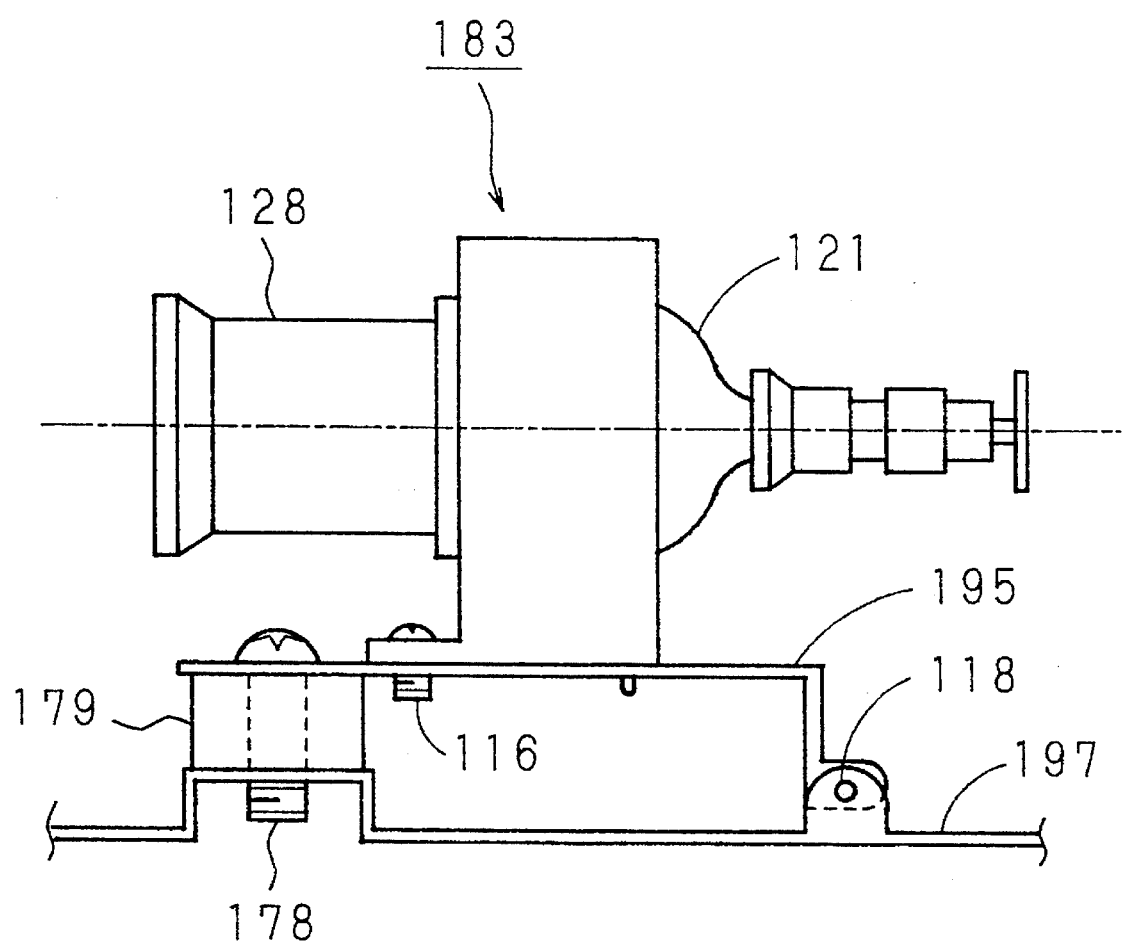
FIG. 47 is a side view of a projection unit of a modification of Embodiment 17.

FIG. 47 is a side view showing a modification of Embodiment 17. In the figure, the unit base 195 at the side of the projection tube 121 is attached to the outer case 197 by the fourth rotation shaft 118 in the rotatable manner in the vertical direction, and the unit base 195 at the side of the projection lens 128 is fixed via a spacer 179 to the outer case 197 by the adjusting screw 178. Therefore, the vertical angle β can be changed by replacing the spacer 179 with another one of a different thickness. In this way, also when the vertical angle β is adjusted by the replacement of the spacer 179, the same effects are realized.

Embodiment 18

Figure 48:
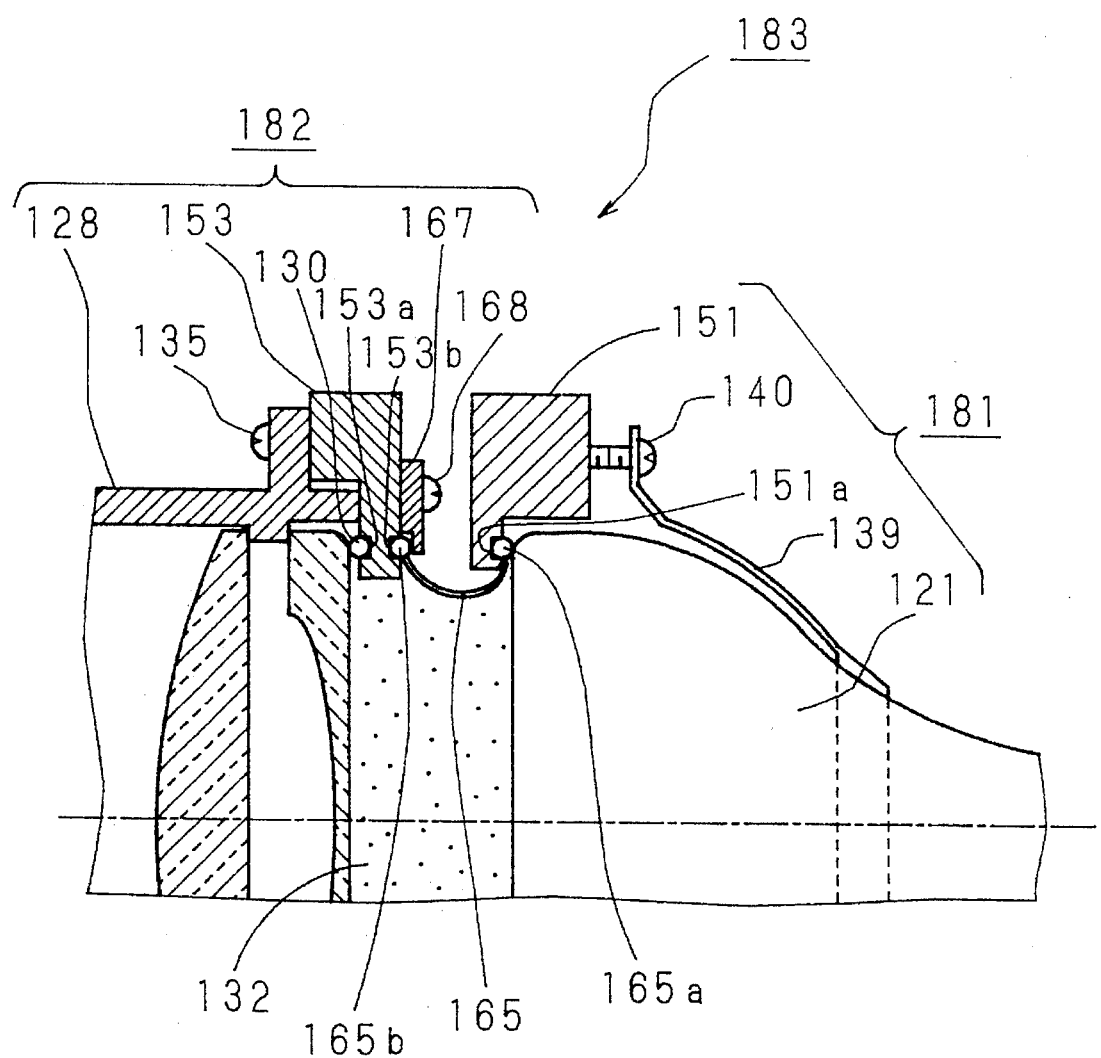
FIG. 48 is a section view showing the main portion in the structure for maintaining a projection unit of Embodiment 18 of the invention in the watertight state.

In the structure of Embodiment 18, a cooling liquid 132 is filled in the watertight state in a projection unit 183 wherein the angle of a projection lens 128 and a projection tube 121 is optionally changeable. FIG. 48 is a section view of the main portion of the projection unit 183. In the figure, a lens packing 130 is fitted in an annular groove 153a formed at the peripheral edge of an opening of a lens frame 153 at the side of the projection lens 128. The projection lens 128 is connected via the lens packing 130 to the lens frame 153 in the watertight state when the screws 135 are fastened. These components constitute a lens block 182.

Meanwhile, an annular groove 151a is formed at the peripheral edge of an opening of a projection tube frame 151 at the side of the projection tube 121. Among projection or protrusions 165a and 165b formed at both ends of a packing sheet 165 molded of rubber or the like, the projection 165a positioned in the annular groove 151a of the projection tube frame 151. The projection tube 121 is clamped to the projection tube frame 151 by a band 139, and screws 140. Accordingly, the projection tube 121 is held by the projection tube frame 151 in the watertight state. A projection tube block 181 is constituted as above.

The projection 165b at the other end of the packing sheet 165 is disposed in an annular groove 153b formed at the peripheral edge of an opening of the lens frame 153 at the side of the projection tube 121. An annular plate 167 is fixed by screws 168 to the lens frame 153, whereby the lens frame 153, and the projection tube frame 151 are connected to each other in the watertight state. A cooling liquid 132 is filled into a space formed as described above. The projection unit 183 is constructed in the above fashion. The packing sheet 165 is disposed with slack of a suitable degree so that the angle of both blocks can be changed.

Embodiment 19

Figure 49:
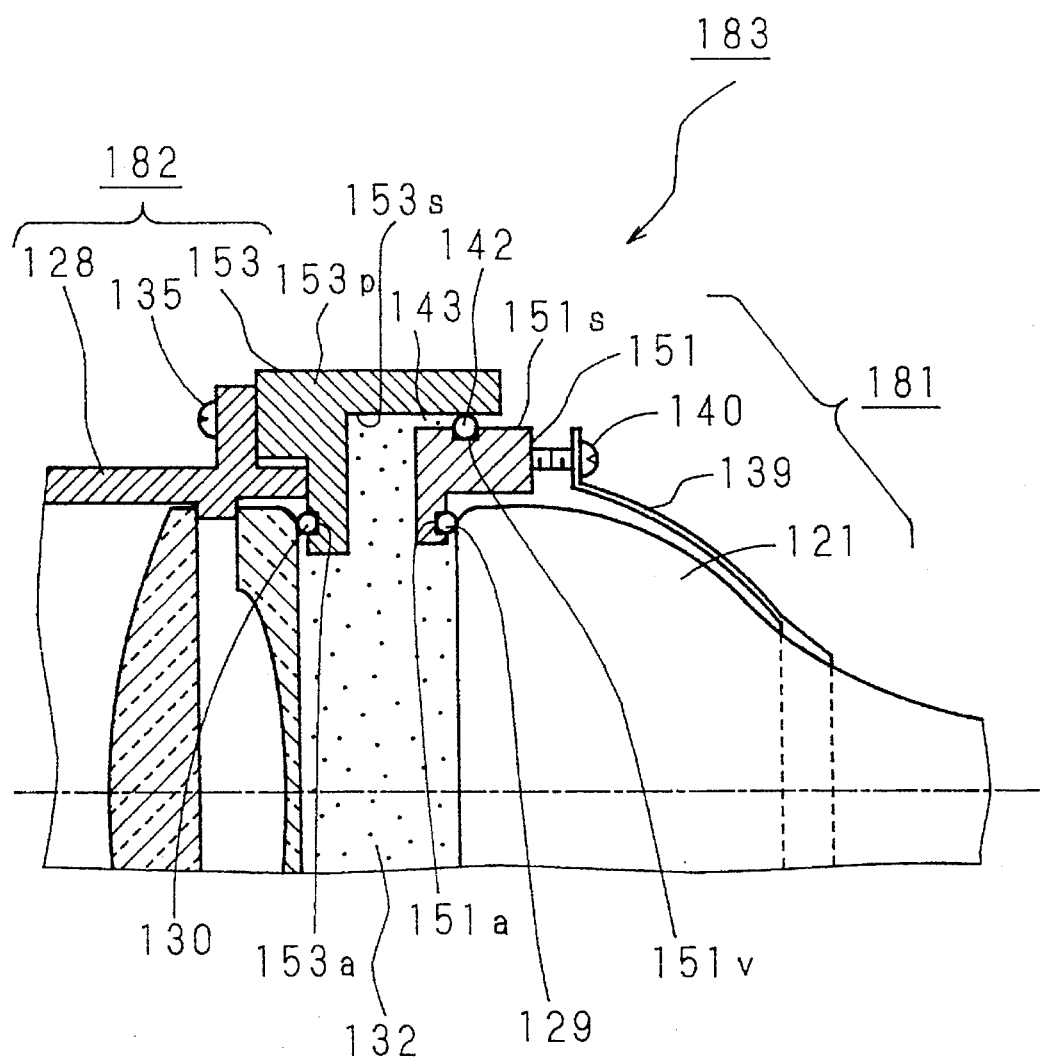
FIG. 49 is a section view showing the main portion in another structure for maintaining a projection unit of Embodiment 19 of the invention in the watertight state.

FIG. 49 is a section view of the main portion of a projection unit in Embodiment 19 which is maintained in the watertight state. In the figure, a projection tube 121 is set on a projection tube frame 151 via a projection tube packing 129. The projection tube 121 is clamped to the projection tube frame 151 by a band 139, and screws 140, so that the projection tube 121 is held by the projection tube frame 151 in the watertight state. These components constitute a projection tube block 181.

On the other hand, a projection lens 128 and the lens frame 153 are coupled in the watertight state by clamping the projection lens 128 to the lens frame 153 via a lens packing 130 by means of screws 135. A lens block 182 consists of these components. An O-ring 142 is installed in a circular groove 151v in an outer peripheral face 151s of the projection tube frame so as to maintain the watertight state between the outer peripheral face 151s and an inner wall face 153s of a round pipe portion 153p of the lens frame 153. The O-ring 142 has a compression allowance to hold the watertight state even when the projection tube frame 151 is rotated and a gap 143 is enlarged or reduced.

In the case where the position of the O-ring 142 is matched with an optical reference for the inclination of the projection tube 121, the gap 143 changes less in the vicinity of the O-ring 142. Therefore, a sufficient compression allowance is secured for the O-ring 142 which is accordingly made use of as the center of the projection tube 121.

Embodiment 20

Figure 50:
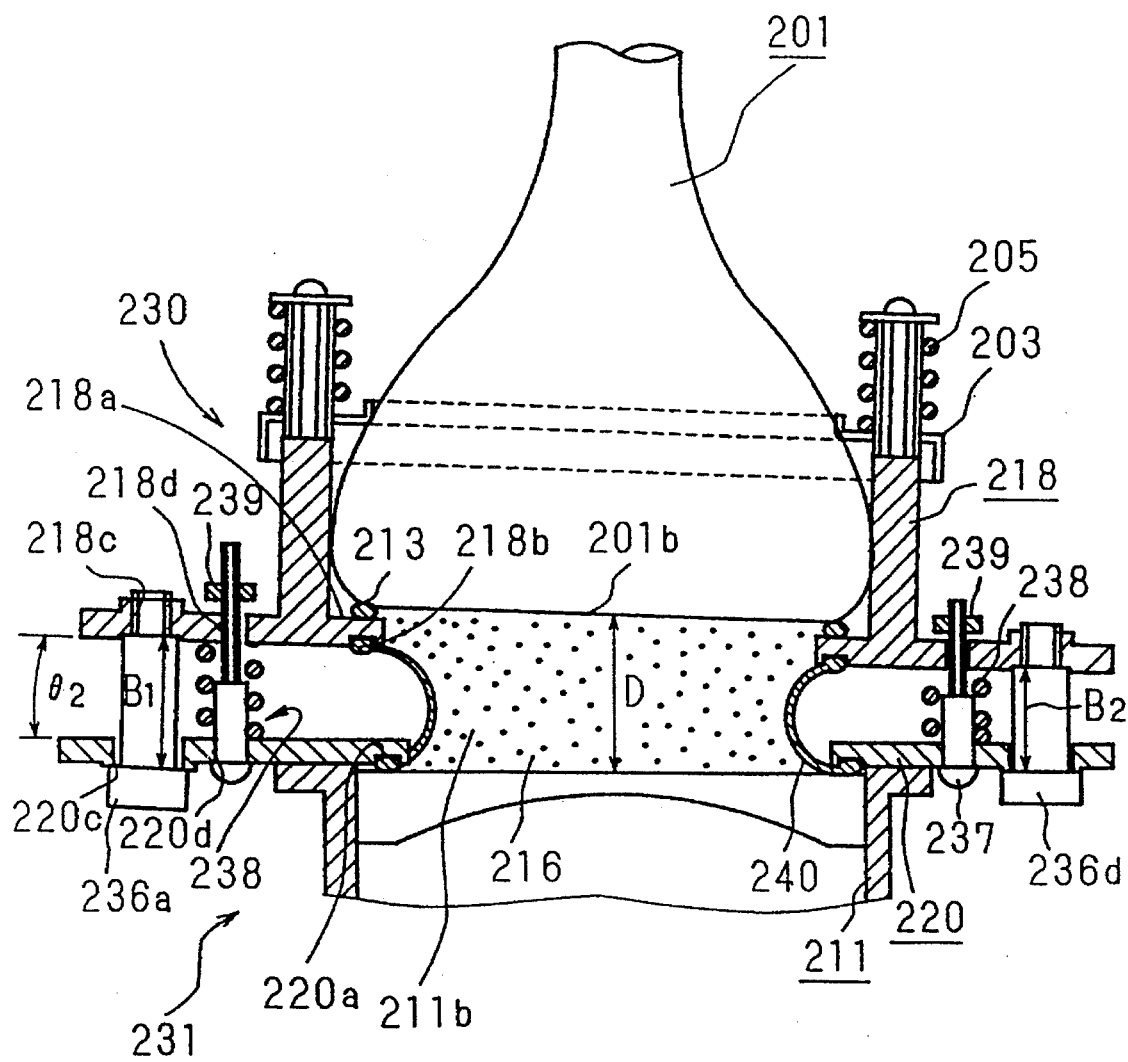
FIG. 50 is a section view showing a projection unit of Embodiment 20 of the invention.
Figure 51:
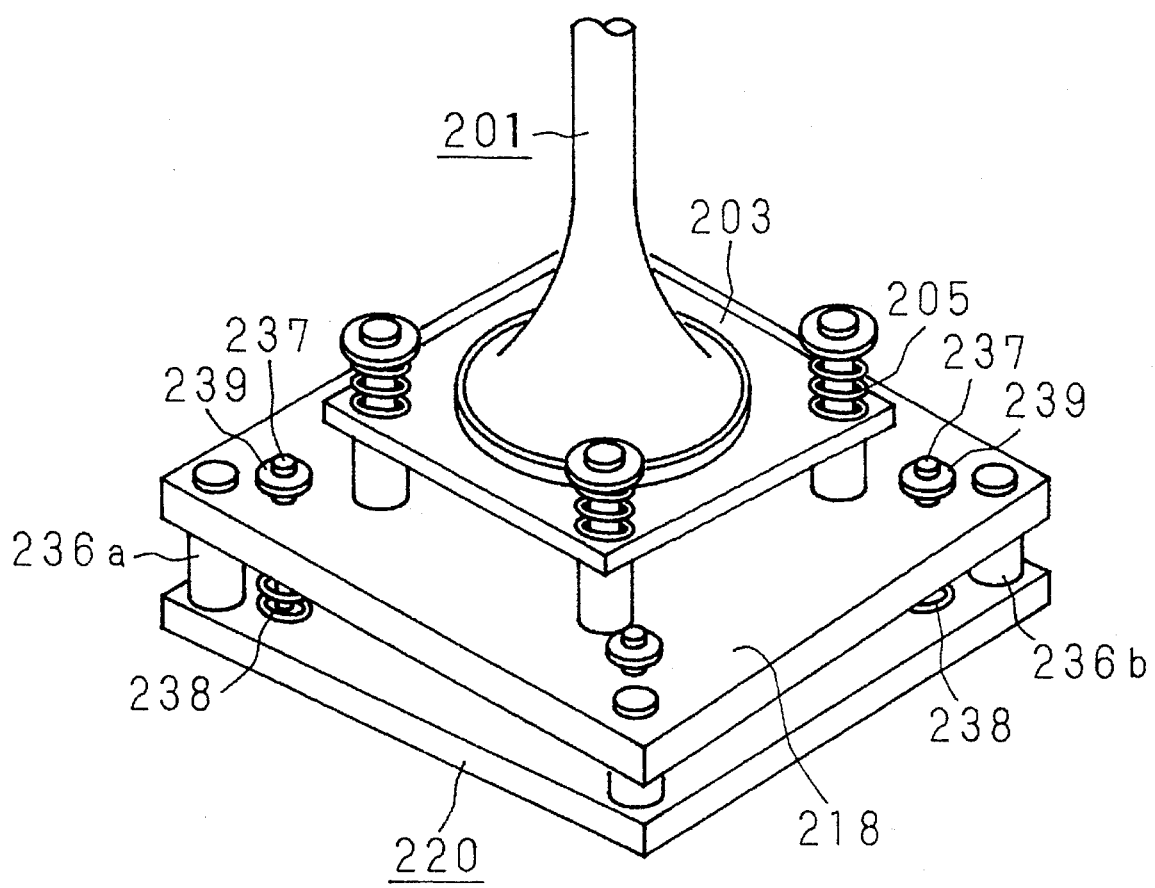
FIG. 51 is a perspective view of the projection unit shown in FIG. 50.

FIG. 50 is a section view showing a projection unit of Embodiment 20 of the present apparatus, and FIG. 51 is a perspective view of the projection unit. In the figures, 201 indicates a projection tube such as a CRT, and 230 shows a projection tube block made of a material such as diecast aluminum with excellent heat conduction properties. A projection tube packing 213 is intervened between a display face 201b of the projection tube 201 and a projection tube mounting face 218a of a projection tube frame 218. The projection tube 201 is uniformly pressed against the projection tube frame 218 by a pressing plate 203, and connected to the frame in the watertight state. A projection tube block 230 is constructed as above.

A reference numeral 211 is a projection lens, and 220 is a lens frame. An annular groove 220a is formed in the lens frame 220. An edge portion of a packing sheet 240 is held between the annular groove 220a and the projection lens 211, whereby the projection lens 211 and the lens frame 220 are connected to each other in the watertight state. A lens block 231 is thus obtained. An annular groove 218b is notched in the projection tube frame 218 at the side of the projection lens 211. An edge portion of the other end of the packing sheet 240 is inserted into the annular groove 218b.

The projection tube frame 218 and the lens frame 220 are connected to each other in the following manner: threaded holes 218c are formed at four points on the periphery of the projection tube frame 218, and bolt holes 220c are formed at four points respectively opposed to the threaded holes 218c in the pheripheral of the lens frame 220. Confronting support holes 218d and 220d are formed inside the holes 218c and 220c. Stepped bolts 236a, 236b . . . of having predetermined lengths $B_1$, $B_2$ . . . are inserted into the support holes from below the lens frame 220, and screwed into the bolt threaded holes 218c to be fixed thereto. Compression springs 238 are interposed between the projection tube frame 218 and the lens frame 220, and supporting shafts 237 are introduced through the support holes 220d and 218d. Retaining rings 239 are provided at the front end of the supporting shafts 237 in order to prevent the shafts from slipping off.

When the length of the stepped bolts 236a, 236b . . . is adequately selected, the angle of the projection tube frame 218 and the lens frame 220, and the distance therebetween can be set as required. A coding liquid 216 is filled between the projection tube 201 and the projection lens 211 maintained in the watertight state.

Next, the operation will be discussed. In a projector of this kind, the screen size, the projection distance, and the projection angle vary depending on conditions of the installation site. Therefore, the tilt angle θ2, which is the relative angle between the projection tube 201 and the projection lens 211, should be changed three-dimensionally. In the embodiment, stepped bolts 236a, 236b . . . having different lengths $B_1$, $B_2$ . . . are prepared, and selected depending on conditions of the location, whereby the distance D between the projection tube 201 and projection lens 211 and the tilt angle θ2 can be set corresponding to the projection distance and the projection angle. Therefore, the distance D between the projection tube 201 and projection lens 211 and the tilt angle θ2 which conform to the conditions of the installation site can easily be set simply by changing the kind of the stepped bolts 236a, 236b . . . inserted from the side of the projection lens 211.

Embodiment 21

Figure 52:
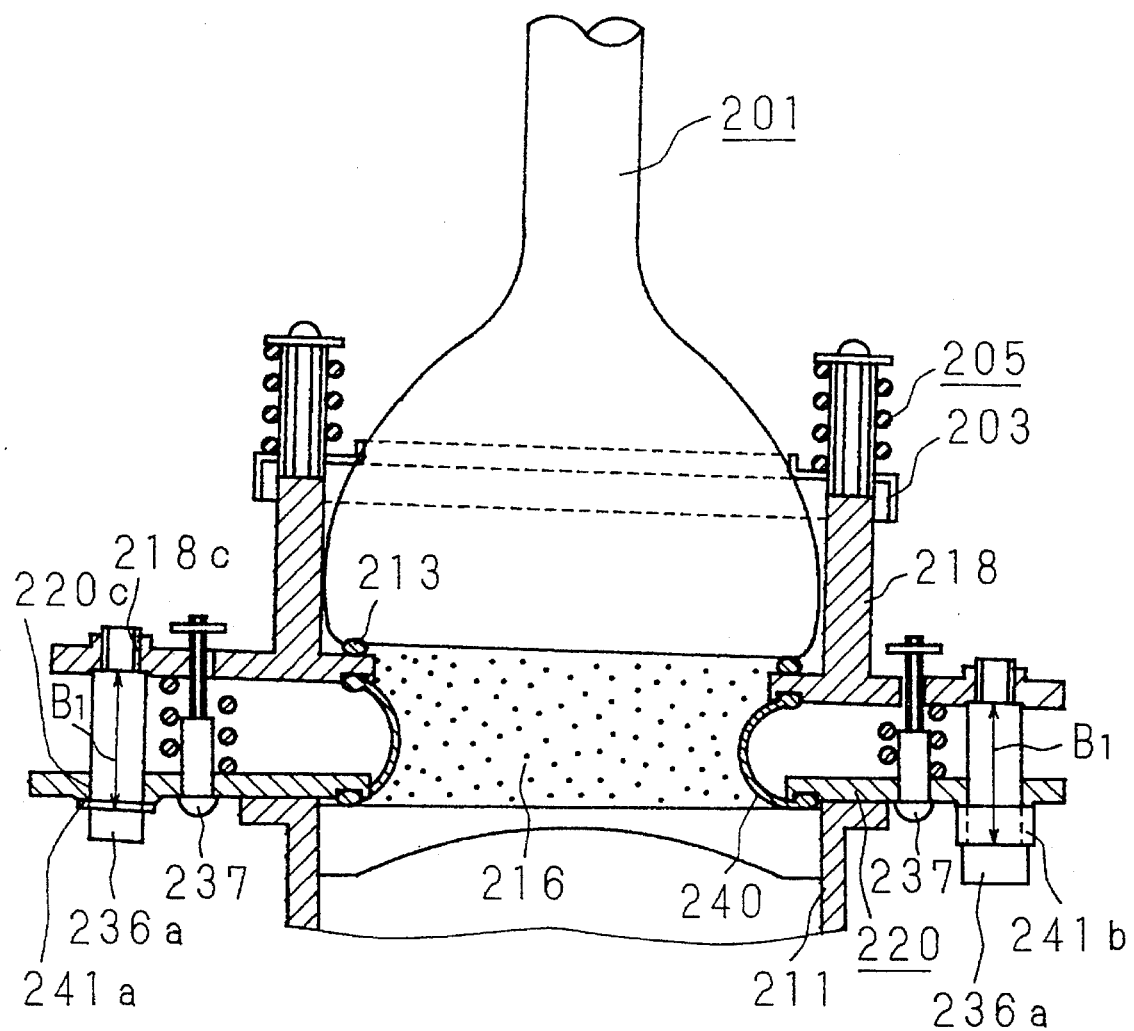
FIG. 52 is a section view showing a projection unit of Embodiment 21 of the invention.

FIG. 52 is a section view showing a modification of Embodiment 20. In the embodiment, stepped bolts 236a of a predetermined length $B_1$, and washers 241a, 241b . . . of different thicknesses are used together. A single kind of the stepped bolts 236a of the length $B_1$ is applicative to a plurality of distances D by selectively using the washers 241a, 241b . . . .

Embodiment 22

Figure 53:
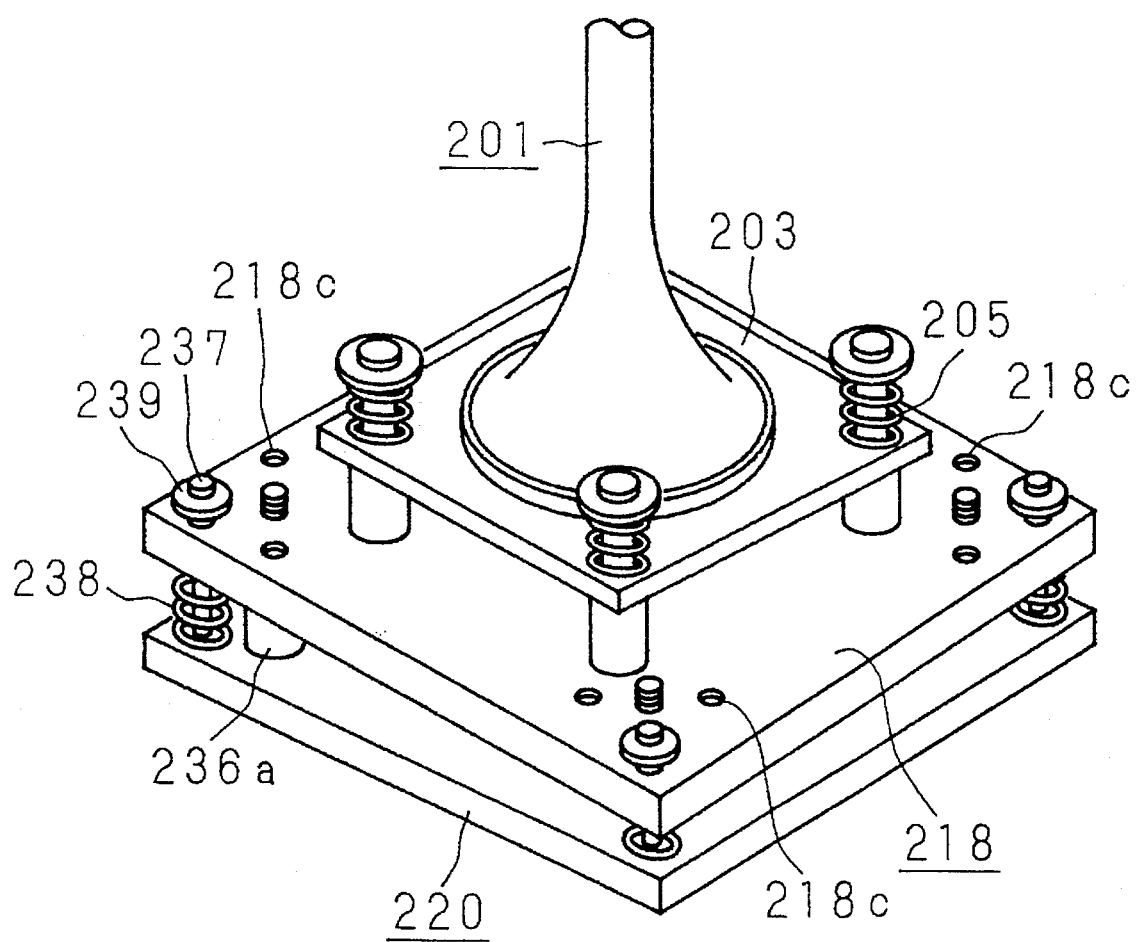
FIG. 53 is a perspective view showing a projection unit of Embodiment 22 of the invention.
Figure 54:
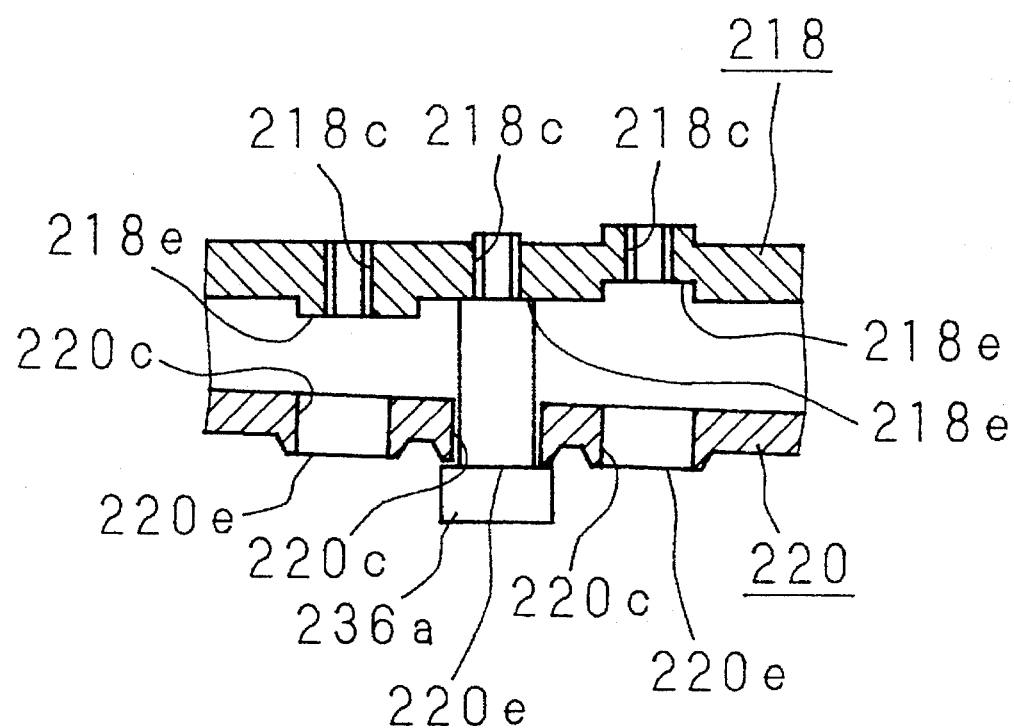
FIG. 54 is a section view of the main portion of the projection unit shown in FIG. 53.

FIG. 53 is a perspective view showing a projection unit of Embodiment 22 of the present apparatus, and FIG. 54 is a section view of the main portion of the projection unit. In Embodiment 20, the distance L and the tilt angle θ2 of the lens frame 220 and the projection tube frame 218 are changed by selecting the stepped bolts 236a, 236b . . . of different lengths. In the embodiment, one kind of bolts, for example, stepped bolts 236a are employed. At each of three or four positions of the projection tube frame 218 and the lens frame 220 where the bolts are mounted, a plurality of bolt seats 218e and 220e are provided which are numbered. Which of the bolt seats is used is determined corresponding to the projection distance and the projection angle. The bolt seats 218e and 220e are arranged so as to assume the height and angle to set the satisfactory distance D between the projection tube 201 and projection lens 211 and the tilt angle θ2. For example, the projection unit is designed so that, when the stepped bolt 236a is inserted to the center of three bolt seats as shown in FIG. 54, the tilt angle θ2 corresponding to the screen size of 90 to 110 inches is set. The same components as those of FIG. 50 are denoted by the same reference numerals, and their description is omitted.

According to the embodiment, in the case where the screen size is to be changed from 100 inches to 70 inches after the installation of the projector, the stepped bolts 236a are separated from the lens surface, and inserted into the bolt seats left next to the separated bolts.

Embodiment 23

Figure 55:
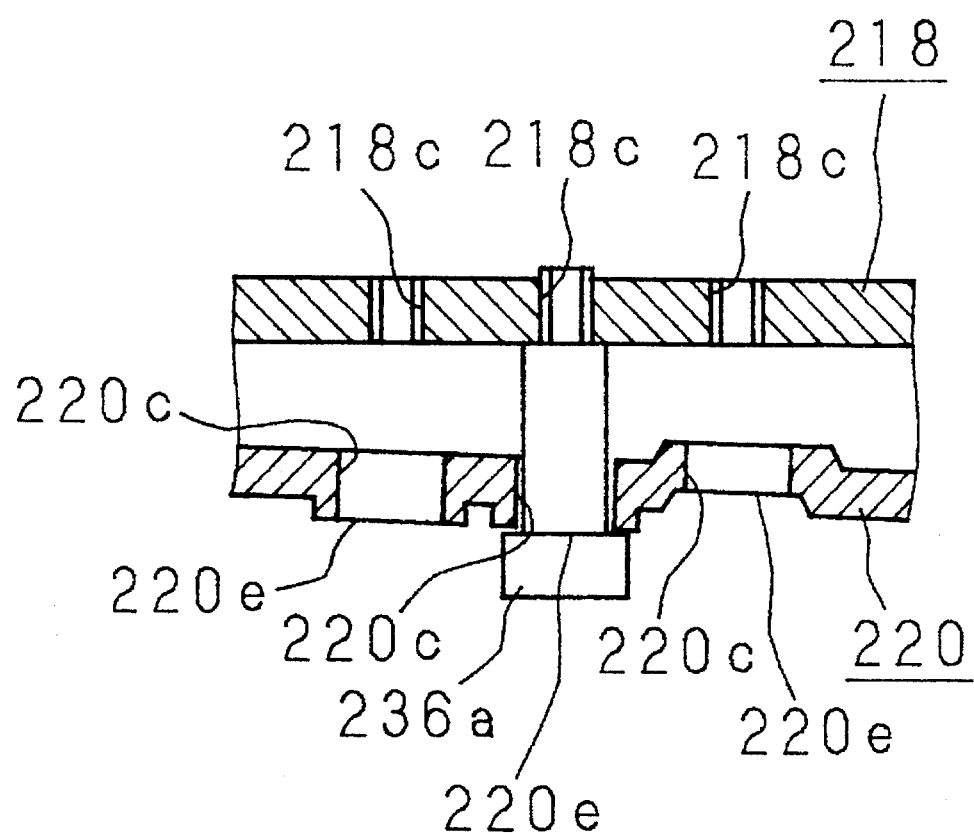
FIG. 55 is a section view showing a projection unit of Embodiment 23 of the invention.

The projection unit of Embodiment 22 is so adapted as to set the distance D between the projection tube 201 and projection lens 211 by the height of the bolt seats 218e of the projection tube frame 218. In contrast, according to the embodiment, the distance D between the projection tube 201 and projection lens 211 is setby changing the heights of bolt seats 220e at the lens frame 220 as shown in FIG. 55. Also in the embodiment, the same effects are achieved.

Embodiment 24

Figure 56:
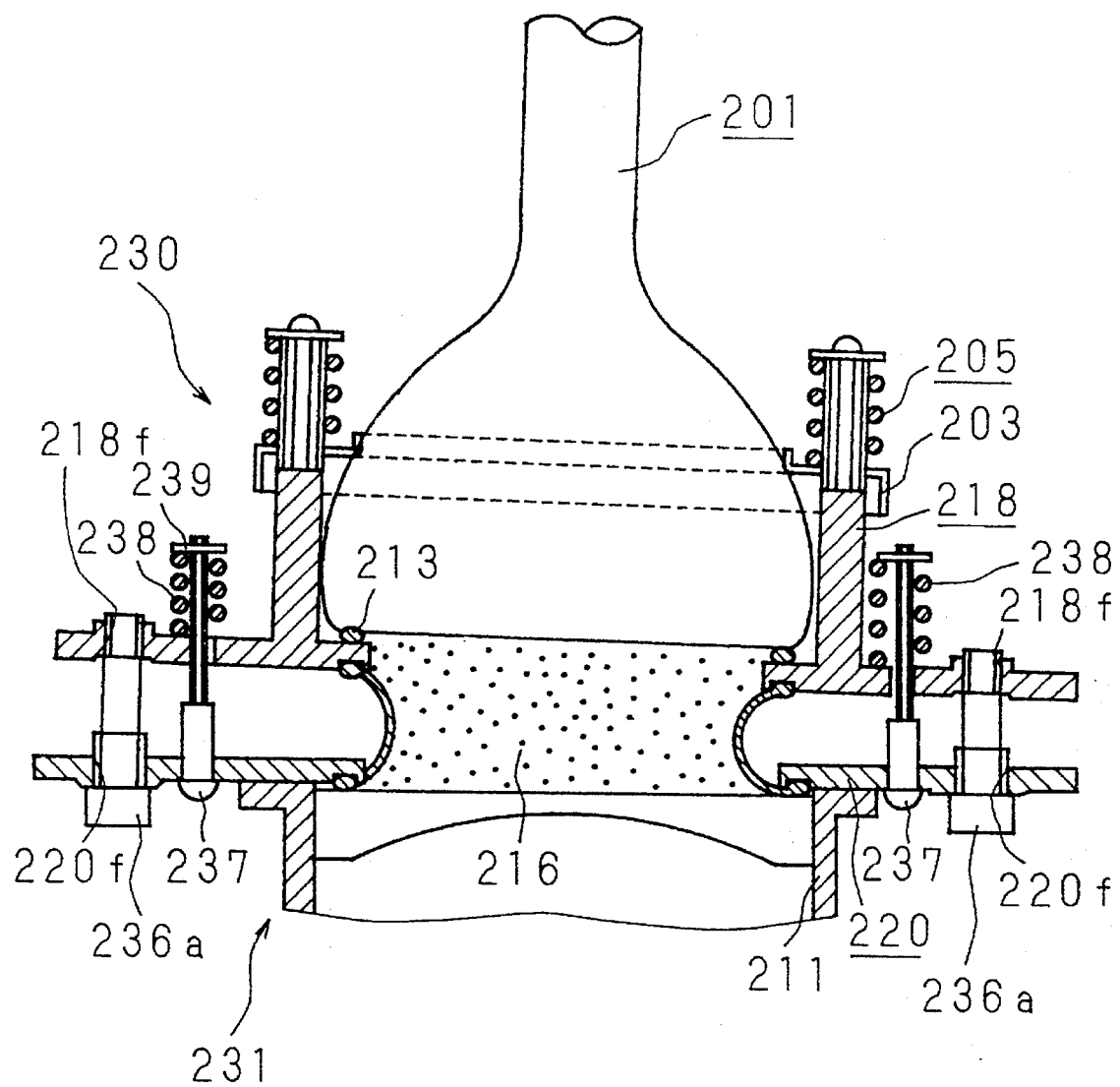
FIG. 56 is a section view showing a projection unit of Embodiment 24 of the invention.

In Embodiments 20 to 23, in order to movably support the projection tube block 230 and the lens block 231, the compression springs 238 for the supporting shafts 237 are interposed between the frames 218 and 220, thereby expanding the gap between the frames 218 and 220. In the embodiment, as is apparent in FIG. 56, the compression springs 238 are placed outside the frames so as to exert the pressing force in a direction to reduce the gap between the frames 218 and 220.

In the embodiment, threaded holes 220f for bolts are formed in the lens frame 220, with bolt holes 218f formed in the projection tube frame 218. The projection tube frame 218 is pressed upward by stepped bolts 236a and 236b each having a threaded portion at the front end thereof. The same effects are achieved in Embodiment 24 as well.

Embodiment 25

Figure 57:
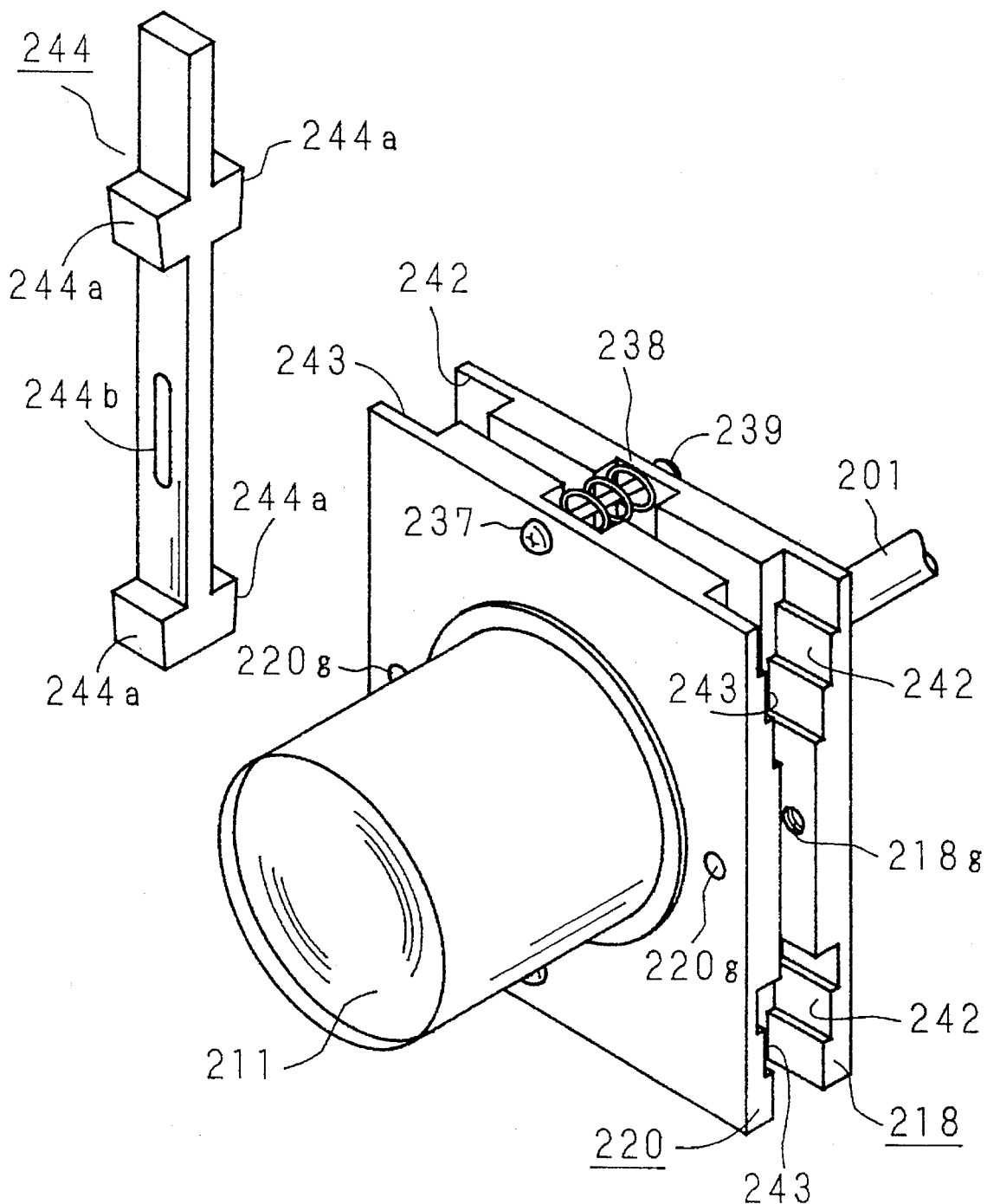
FIG. 57 is an exploded perspective view illustrating the structure of a projection unit of Embodiment 25 of the invention.
Figure 58:
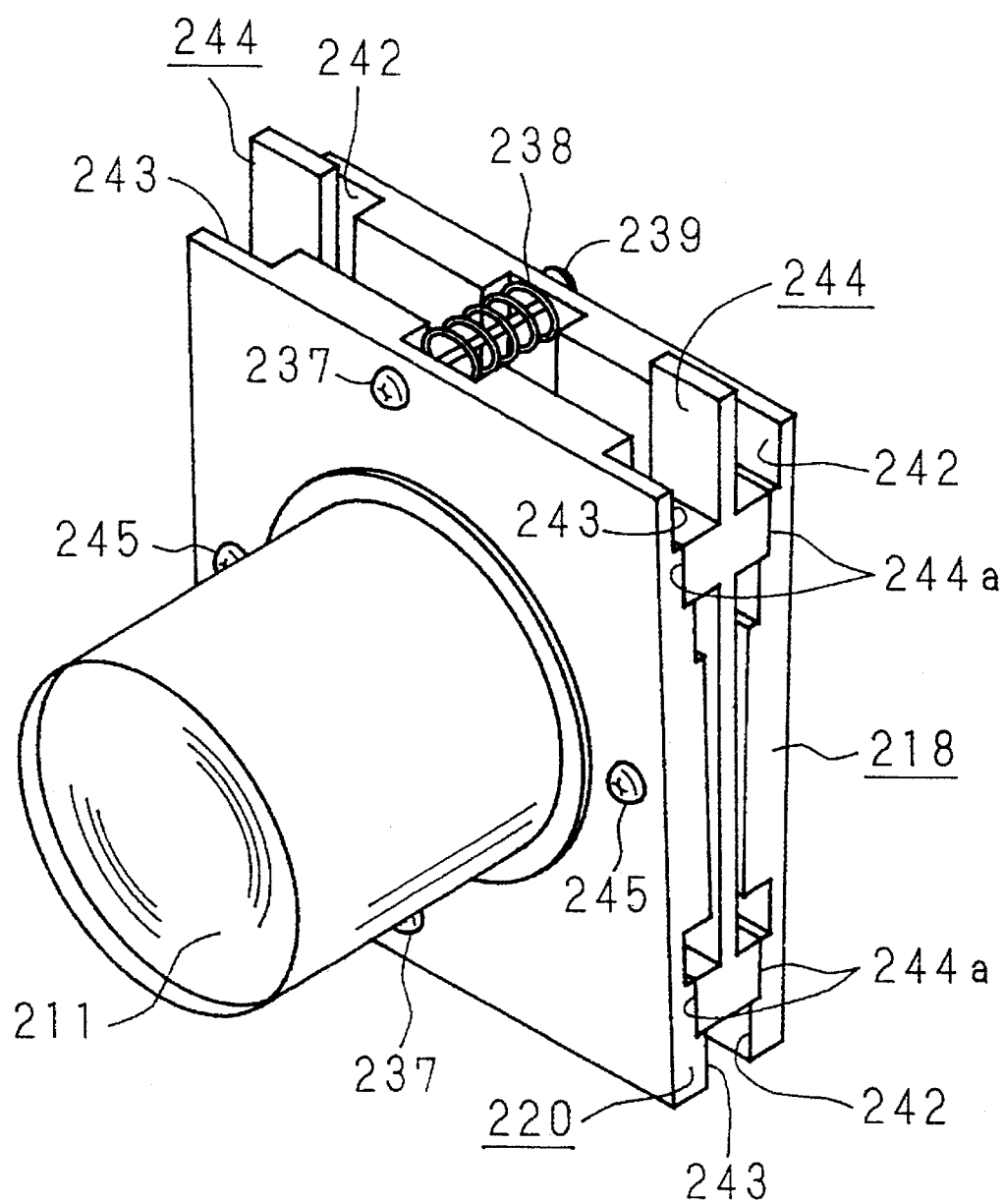
FIG. 58 is a perspective view showing the assembled state of the projection unit shown in FIG. 57.
Figure 59:
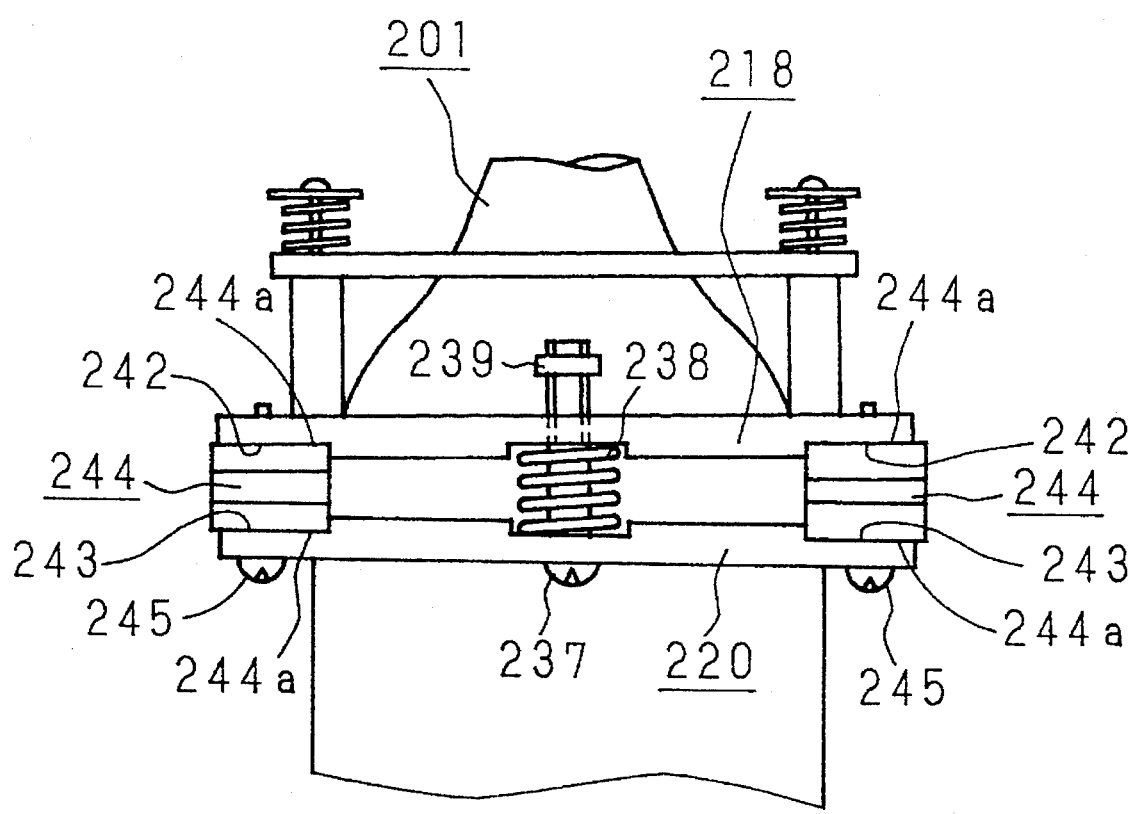
FIG. 59 is a view of the projection unit shown in FIG. 58 as seen from the above.

FIG. 57 is an exploded perspective view showing the main portion of a projection unit of Embodiment 25 of the present apparatus, FIG. 58 is a perspective view of the projection unit in the assembled state, and FIG. 59 is a plan view of FIG. 58. As shown in FIG. 57, stepped seats 242 and 243 are formed at four corners of a projection tube frame 218, a lens frame 220 respectively. A spacer 244 has four seat faces 244a, so that the spacer is held between the confronting seats 242 and 243 at two corners. A screw 245 penetrates a through hole 220g formed in the lens frame 220 and a long hole 244b of the spacer 244, to be screwed into a threaded hole 218g in the projection tube frame 218, whereby the spacer 244 is tightly secured to the frame 218. Supporting shaft 237 for movably supporting the blocks 230 and 231 is guided through the lens frame 220 and further through a compression spring 238 between the frames 218 and 220 and the projection tube frame 218. A retaining ring 239 is attached to the front end of the supporting shaft 237. The other same components as those of FIG. 50 are designated by the same reference numerals, and their description is omitted.

The operation will now be described. The tilt angle θ2 is set corresponding to the presumed projection distance and the projection angle. The heights and angle of the stepped seats 242 and 243 are preliminarily adjusted to obtain the tilt angle θ2. When the preset screen size or projection distance is to be changed during or after the installation of the projector, as the screw 245 is loosened, the compression spring 238 works to increase the clearance between the frames 218 and 220. This enables the spacer 244 to be shifted to arbitrary seats 242 and 243, so that the projection distance is changed. When the screw 245 is loosened, although the clearance between the frames 218 and 220 is apt to increase, the retaining ring 239 prevents the clearance from being increased excessively.

Embodiment 26

Figure 60:
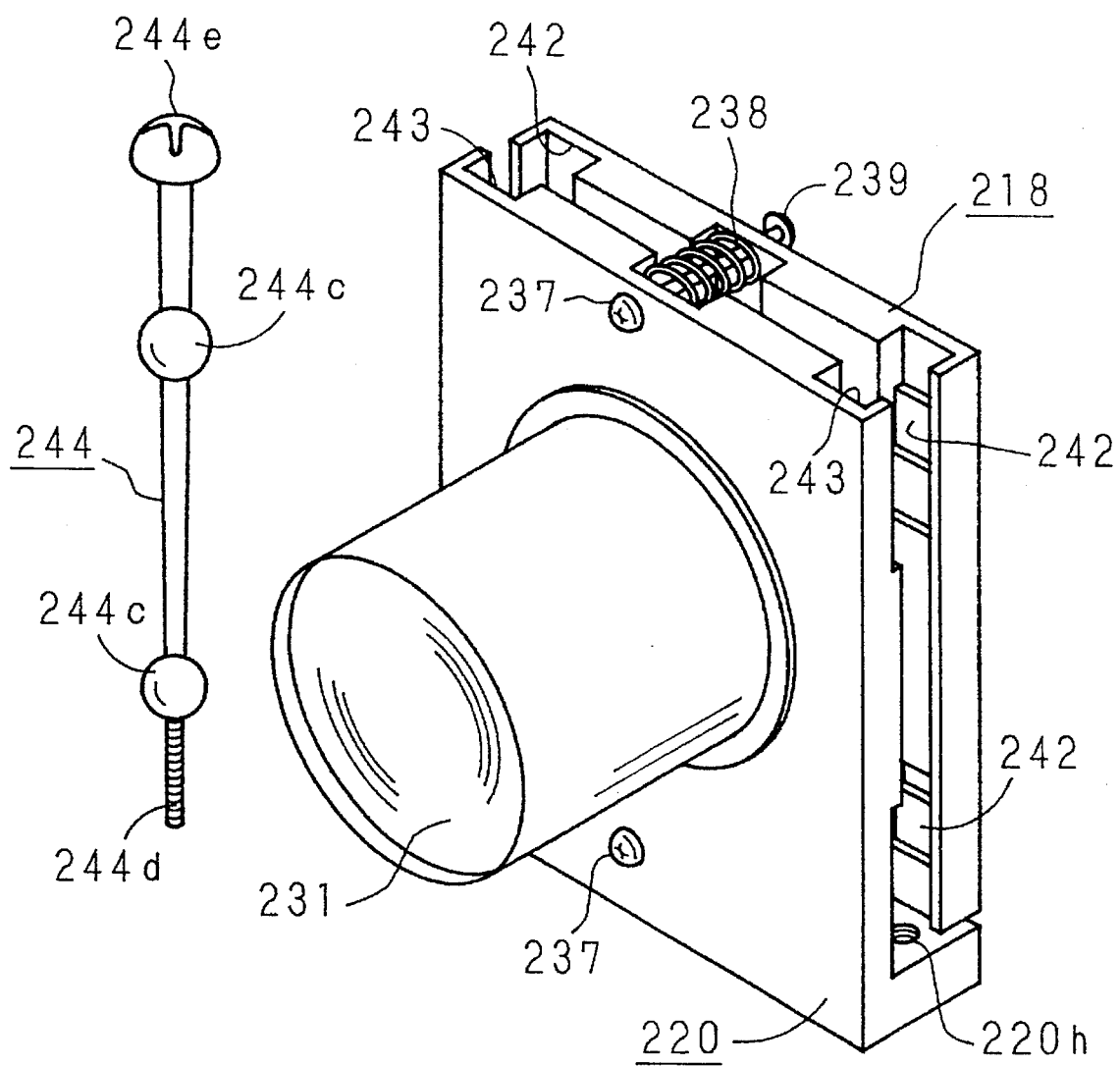
FIG. 60 is an exploded perspective view illustrating the structure of a projection unit of Embodiment 26 of the invention.
Figure 61:
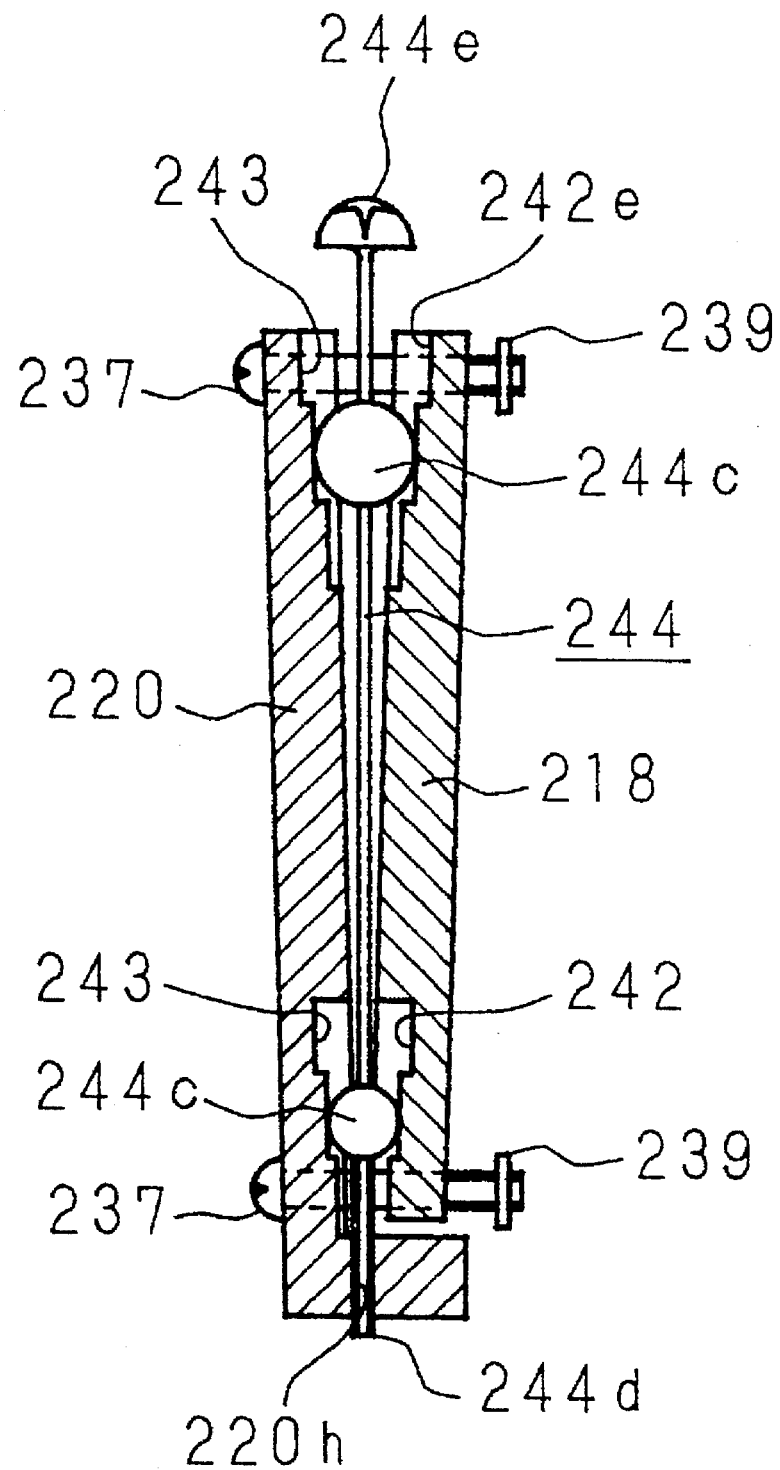
FIG. 61 is a section view showing the assembled state of the projection unit shown in FIG. 60.

FIG. 60 is an exploded perspective view showing a projection unit of Embodiment 26 of the present apparatus, and FIG. 61 is a section view of the projection unit in the assembled state. As is clearly shown in FIG. 60, stepped seats 242 are formed at four corners of a projection tube frame 218, and similar stepped seats 243 are formed at four corners of a lens frame 220. A spacer 244 includes two spherical portions 244c which guide the spacer in between the confronting seats 242 and 243 at two of the four corners. A threaded portion 244d is provided at the front end of the spacer 244, and a screw head portion 244e is formed at the other end of the spacer 244. When the spacer 244 is to be installed into the lens frame 220, the threaded portion 244d of the spacer 244 is screwed into a threaded portion 220h formed at the lower end of the lens frame 220, so that the spherical portions 244c are held between the stepped seats 242 and 243. A fastening screw 237 is passed through the lens frame 220 and a compression spring 238 interposed between the frames 218 and 220, and then fixedly screwed into a threaded portion in the projection tube frame 218. A retaining ring 239 is attached to the threaded portion of the frame 218. The same components as those of FIG. 57 are designated by the same reference numerals, and the description is omitted.

Next, the operation will be discussed. The tilt angle θ2 is set corresponding to the presumed projection distance and the projection angle. The height of the stepped seats 242 and 243 is so set as to realize the tilt angle θ2. When the preset screen size, projection angle, and projection distance are to be changed during or after the installation of the projector, the screw 237 is loosened and the compression spring 238 expands the clearance between the frames 218 and 220. In this state, the screw head portion 244e of the spacer 244 is rotated to move the spherical portions 244c to arbitrary seats 242 and 243, whereby the tilt angle θ2 is changed so as to correspond to the projection distance with ease.

Embodiment 27

Figure 62:
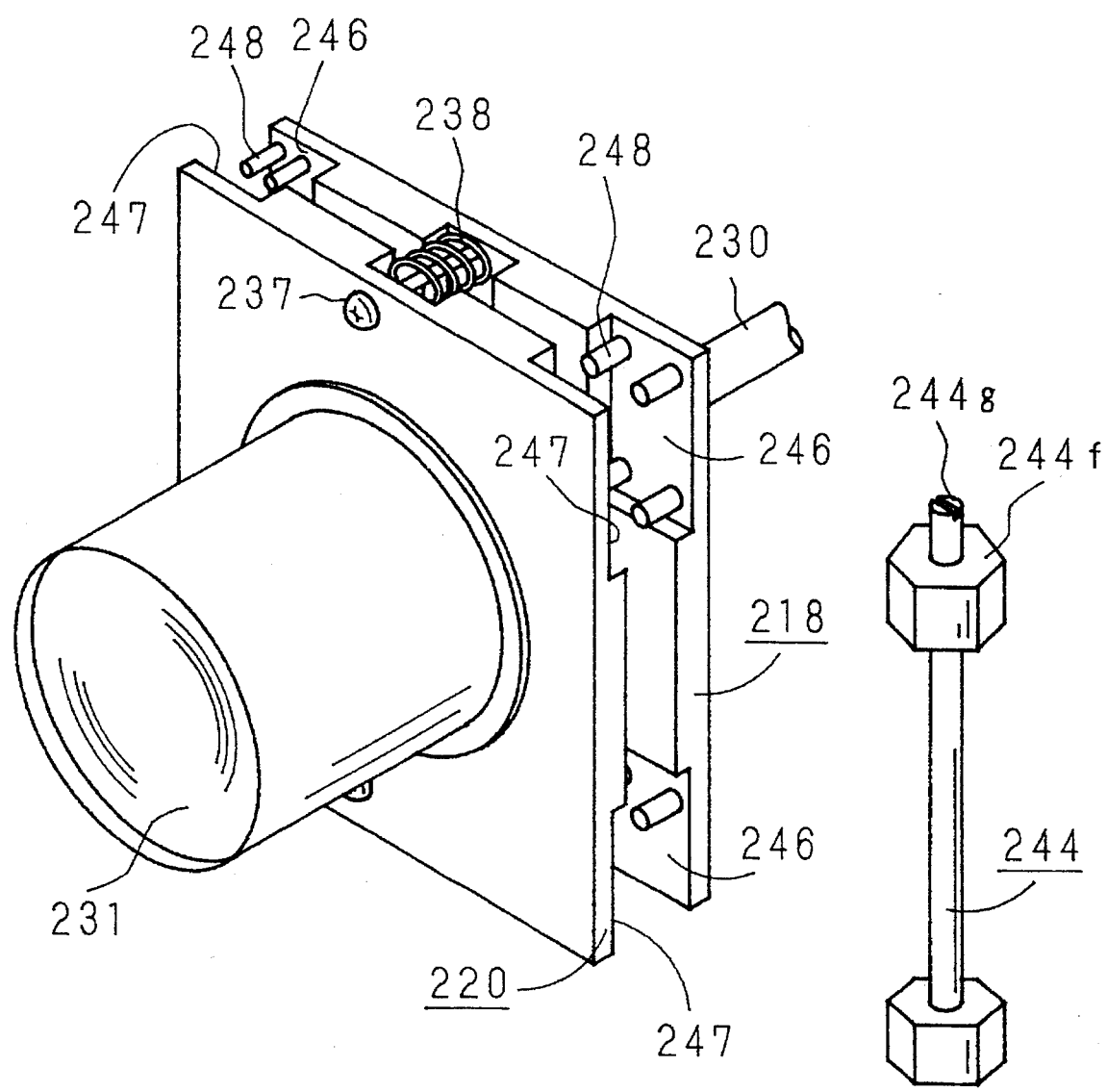
FIG. 62 is an exploded perspective view illustrating the structure of a projection unit of Embodiment 27 of the invention.
Figure 63:
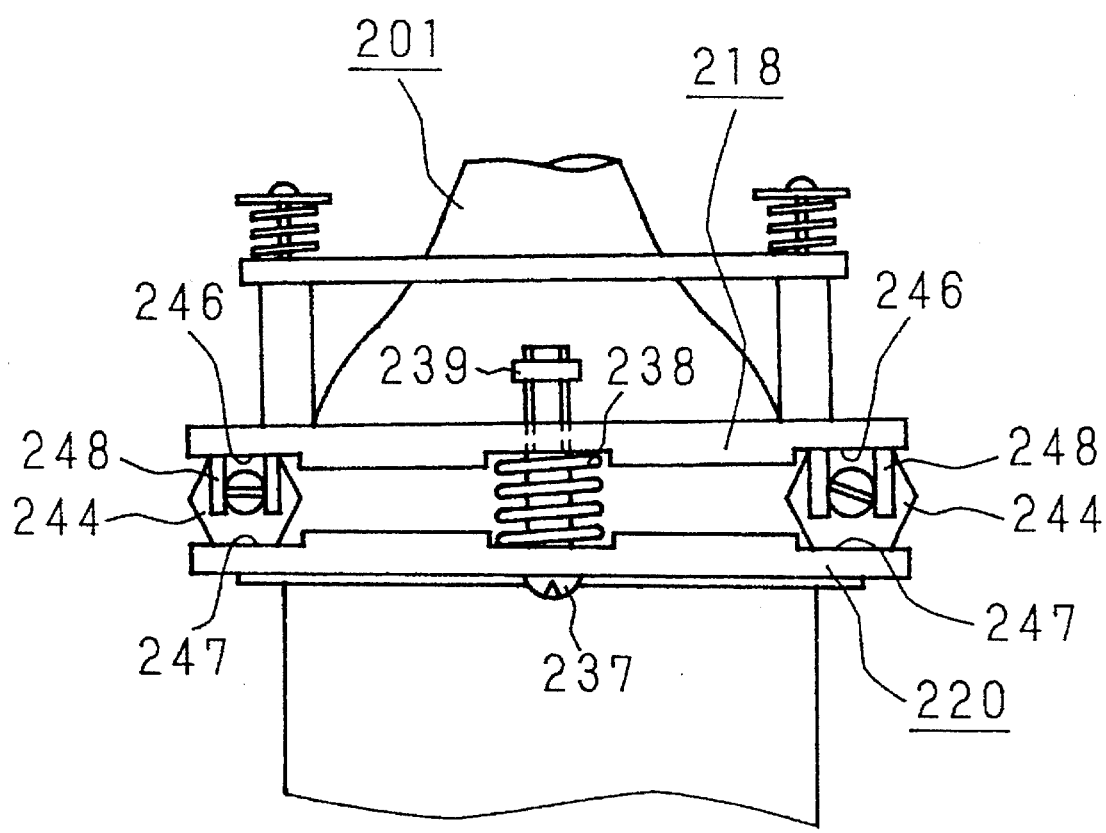
FIG. 63 is a section view showing the assembled state of the projection unit shown in FIG. 62.

FIG. 62 is an exploded perspective view showing a projection unit of Embodiment 27 of the present apparatus, and FIG. 63 is a section view of the assembled projection unit. As shown in FIG. 62, seats 246 and 247 are formed respectively at four corners of a projection tube frame 218 and a lens frame 220. A spacer 244 has two hexagonal dicelike portions 244f allowing the spacer 244 to be held between two of four sets of the opposite seats 246 and 247. The spacer 244 can be rotated by a tool owing to a slit 244g at the upper end face thereof. Guides 248 are formed in the projection tube frame 218 to prevent the displacement of the spacer 244. A fastening screw 237 is passed through the lens frame 220 and a compression spring 238 interposed between the frames 218 and 220, and then fixedly screwed into a threaded portion formed in the projection tube frame 218. A retaining ring 239 is fitted at the front end of the threaded portion. The same components as those of FIG. 57 are represented by the same reference numerals, and the description is omitted.

Next, the operation will be discussed. The tilt angle θ2 is set corresponding to the presumed projection distance and the projection angle. The length between the opposite edges of the dice-like portions 244f of the spacer 244, and the heights of the seats 246 and 247 at the four corners of the frames 218 and 220 are set beforehand. When the preset screen size, projection angle, and projection distance are to be changed during or after the installation of the projector, the screw 237 is loosened, whereby the compression spring 238 acts to increase the clearance between the frames 218 and 220. In this state, the slit 244g at the head of the spacer 244 is rotated to satisfy the length between the opposite edges of the dice-like portions 244f fit for the conditions. Accordingly, the tilt angle θ2 is changed and the proportion unit is set in the state in conformity with the projection distance.

Embodiment 28

Figure 64:
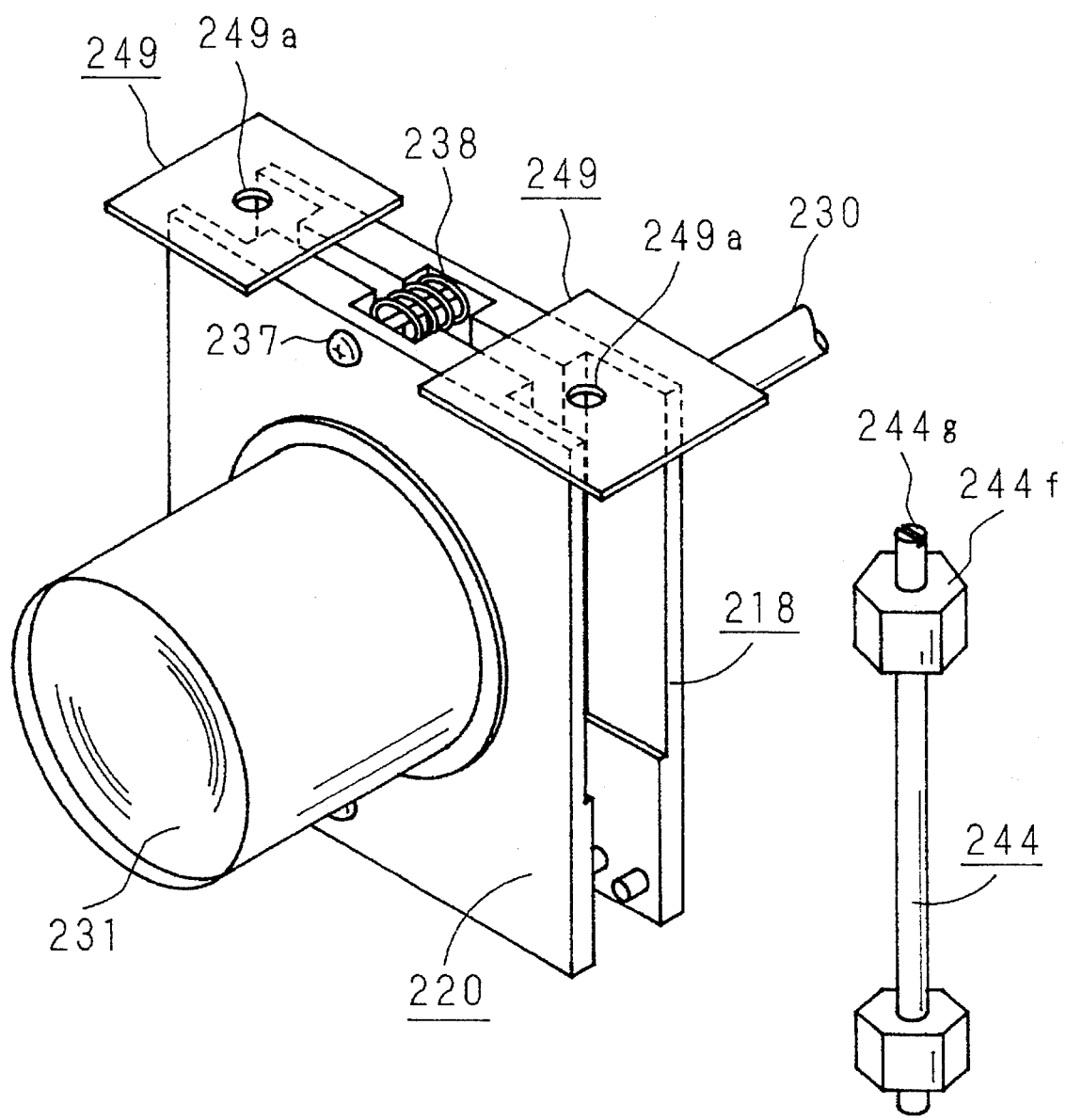
FIG. 64 is an exploded perspective view illustrating the structure of a projection unit of Embodiment 28 of the invention as a modification of Embodiment 27.
Figure 65:
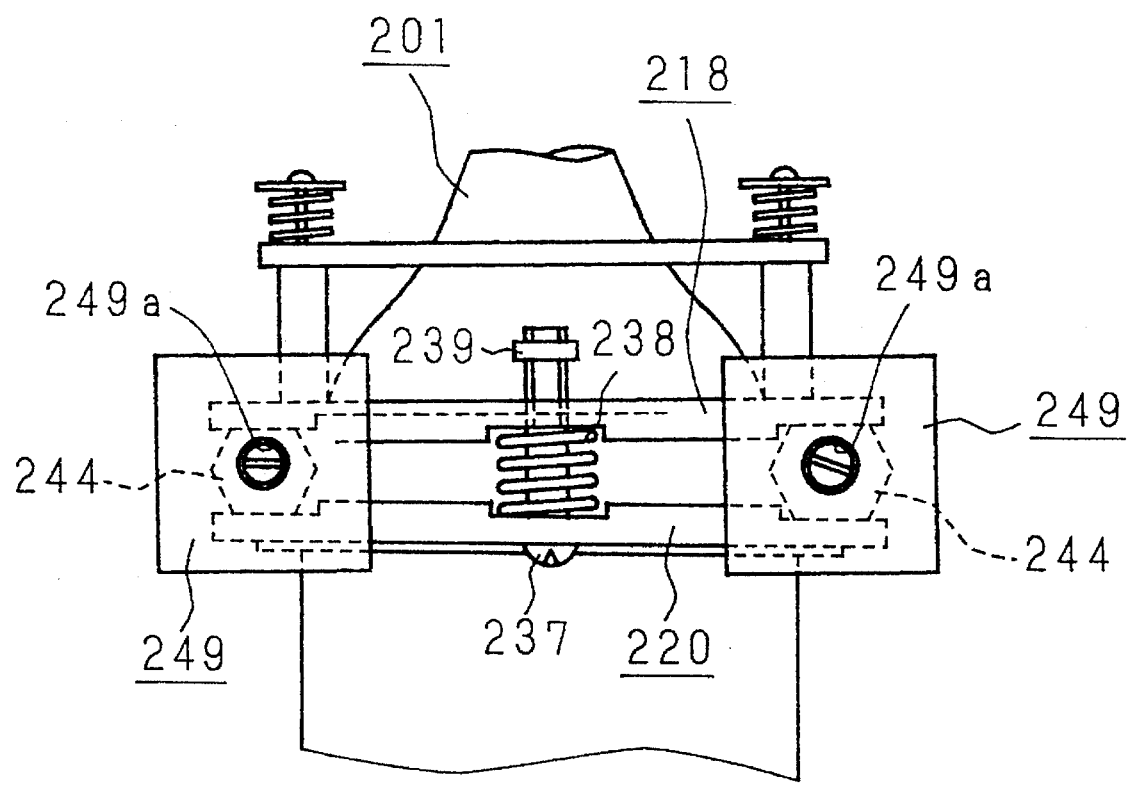
FIG. 65 is a top view showing the assembled state of the projection unit shown in FIG. 64.

FIG. 64 is an exploded perspective view showing a modification of Embodiment 27, and FIG. 65 is a top view of the modified unit in the assembled state. Guide plates 249 for preventing the spacer 244 from being displaced are placed over the frames 218 and 220. The spacer 244 is restricted by a guide hole 249a formed in the guide plate 249.

Figure 66:
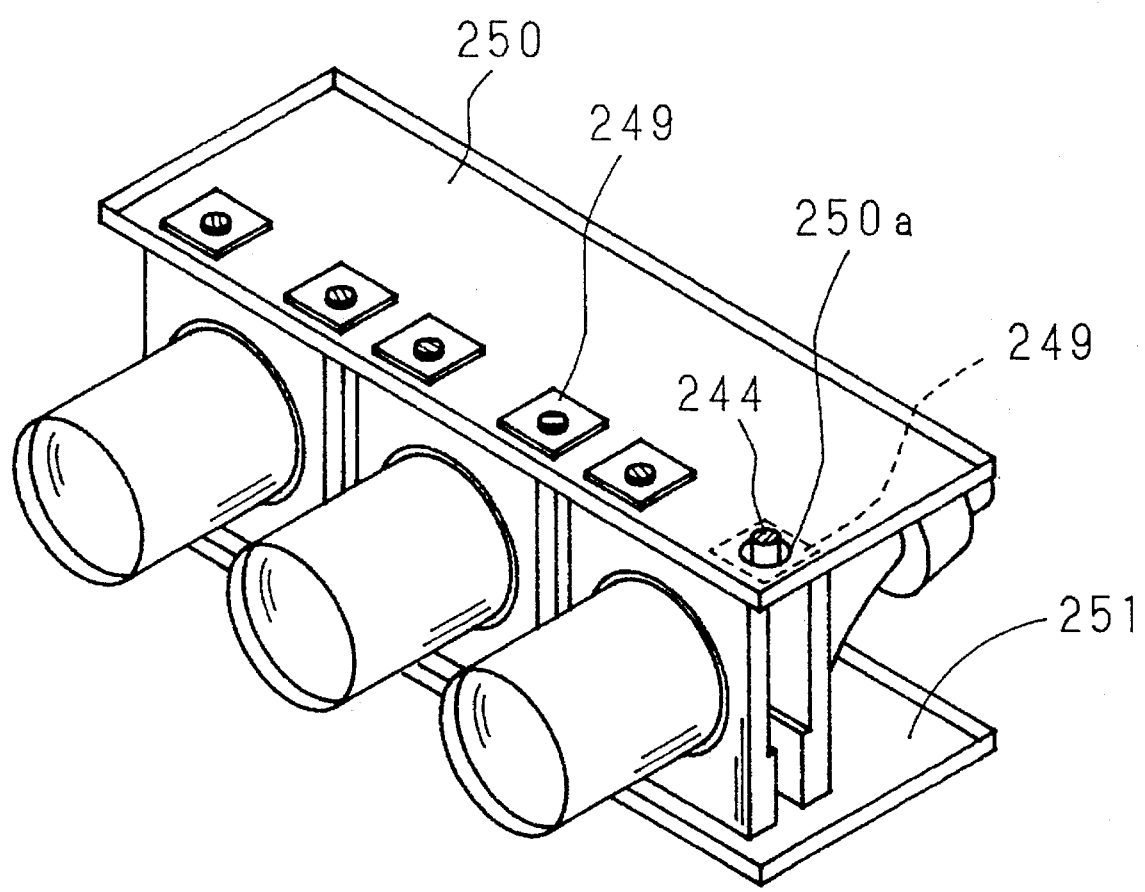
FIG. 66 is a perspective view showing the assembled state of three projection units of Embodiment 28.

FIG. 66 is a perspective view showing the assembled state of three projection units. Each guide plate 249 is fixed to a top plate 250 which is a structured member of a main body of the projector. The lower ends of the frames 218 and 220 are fixed to a bottom plate 251. An escape hole 250a is opened at the top plate 250. The spacer 244 projects out from the escape hole to be restricted by the guide plate 249. In order to facilitate the understanding. FIG. 66 illustrates the state with the right guide plate 249 removed.

In the spacer 244 shown in Embodiment 27, since the dice-like portions 244f are formed into hexagonal prisms, only three different of values are available for the tilt angle θ2. Therefore, the guide plates 249 are employed as in FIGS. 64–66 so as to exchange the spacer 244 with ease. When the spacer 244 is to be replaced, the guide plates 249 are detached, the spacer 244 is pulled out through the escape hole 250a in the top plate 250, and another spacer 244 is then installed.

Embodiment 29

Figure 67:
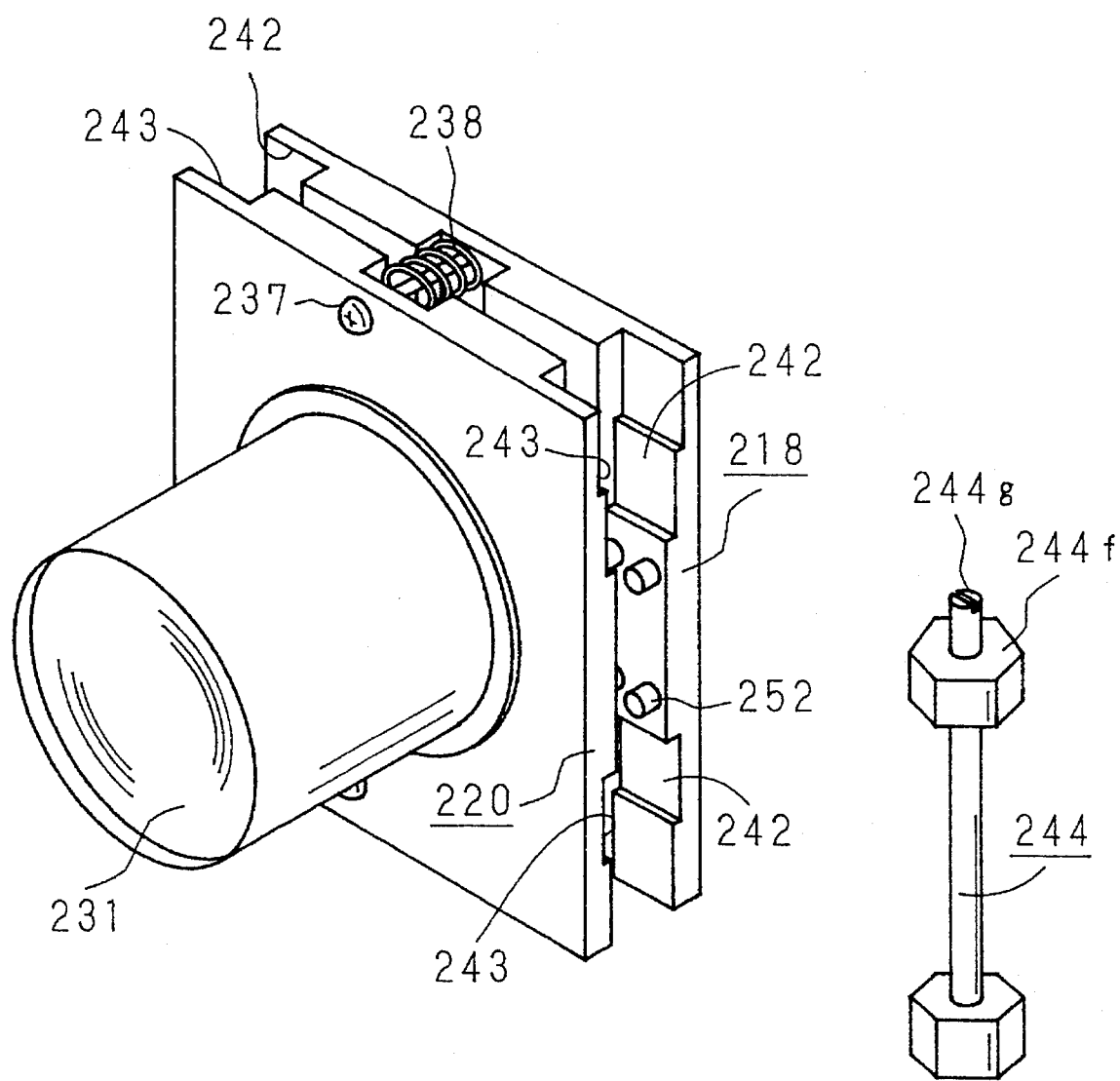
FIG. 67 is an exploded perspective view illustrating the structure of a projection unit of Embodiment 29 of the invention.
Figure 68:
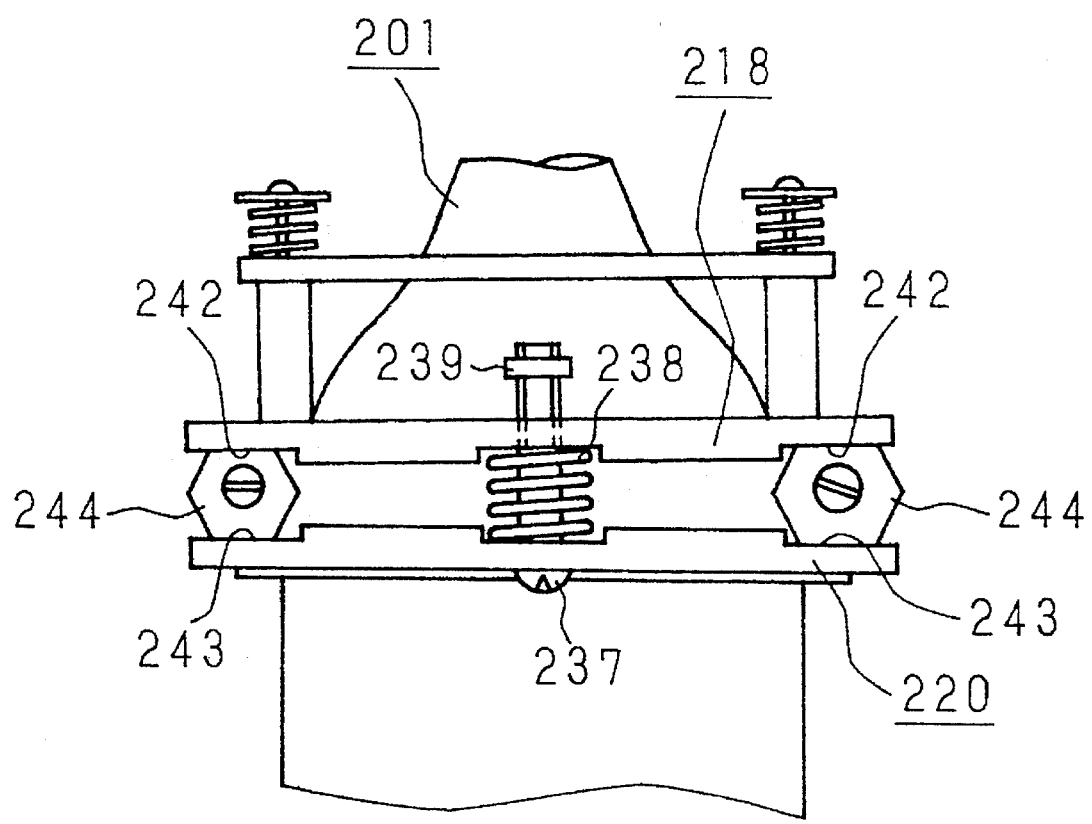
FIG. 68 is a section view showing the assembled state of the projection unit shown in FIG. 67.

FIG. 67 is an exploded perspective view showing a seats from which the bolts have been removed projection unit of Embodiment 29 of the present apparatus, and FIG. 68 is a section view of the assembled projection unit. As indicated in FIG. 67, stepped seats 242 and 243 are formed at four corners of a projection tube frame 218, and a lens frame 220 respectively. A spacer 244 has two hexagonal dice-like portions 244f. The spacer 244 is accordingly held between two pairs of the opposite seats 242 and 243. A slit 244g of the spacer 244, guides 252 of the projection tube frame 218, a fastening screw 237, a compression spring 288, etc. are in the same constitution as those of Embodiment 27. The seats 242 and 243 for the spacer are formed in the frames 218 and 220 like stairs and therefore the spacer 444 is vertically movable. The other same components as those of FIG. 62 are designated by the same reference numerals, and description thereof is omitted.

Next, the operation will be described. As discussed in Embodiment 27, the tilt angle θ2 is set in accordance with required conditions by the length of the opposite edges of the dice-like portions 244f of the spacer 244, and the height of the seats 246 and 247 at four corners of the frames 218 and 220. In the embodiment, the spacer 244 is made movable vertically along the stepped seats 242 and 243, and can be reset at different sets of seats. Accordingly, the tilt angle θ2 may be set among various values. Specifically, in the embodiment, the dice-like portions 244f are hexagonal prisms, realizing three values of the tilt angle θ2. If the spacer 244 is moved to the next step of seats, another three values of tilt angle can be set at the step. As a result, six values of tilt angle θ2 are available with one pair of spacers 244 in the embodiment.

Embodiment 30

Figure 69:
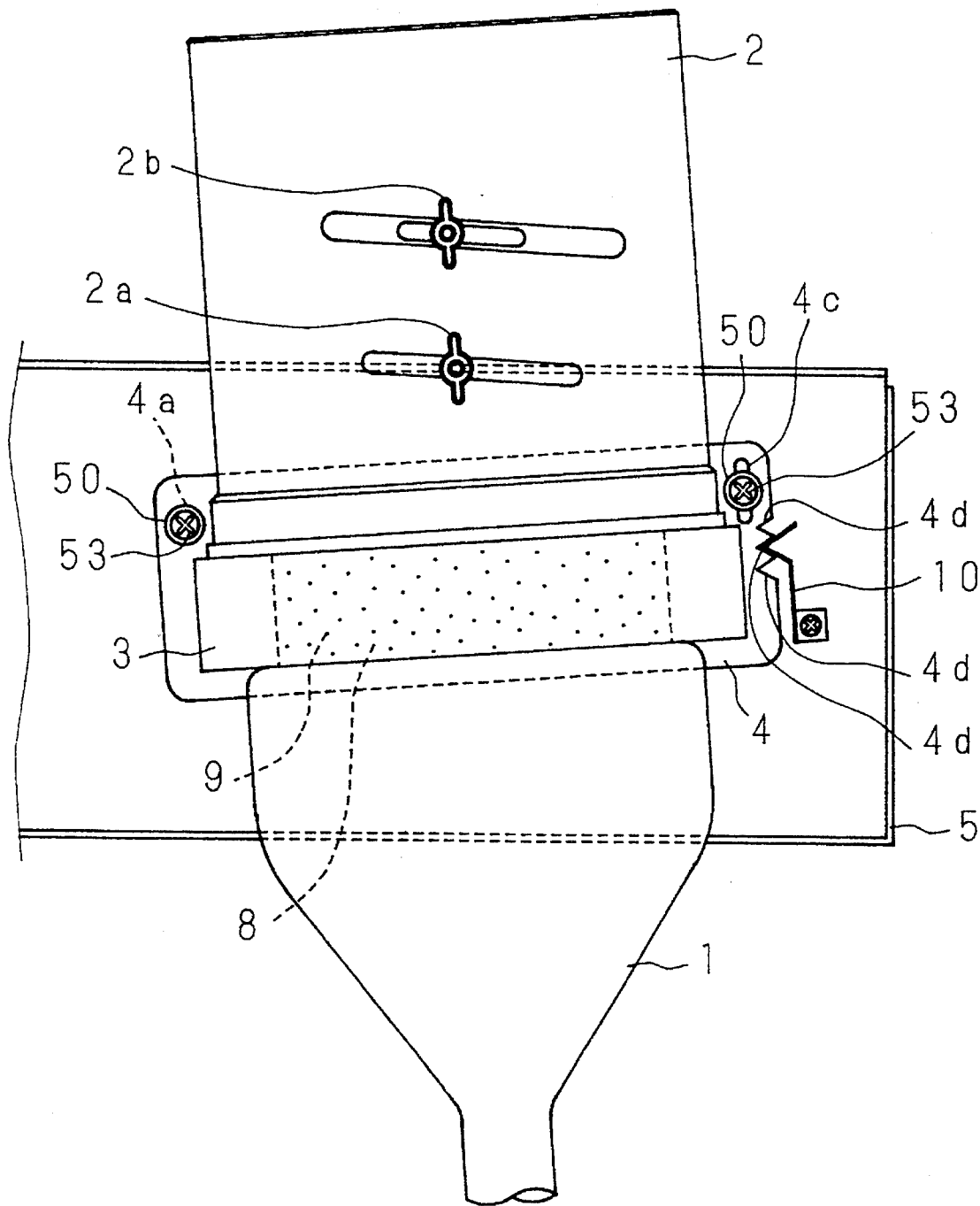
FIG. 69 is a plan view showing a projection unit of Embodiment 30 of the invention.
Figure 70:
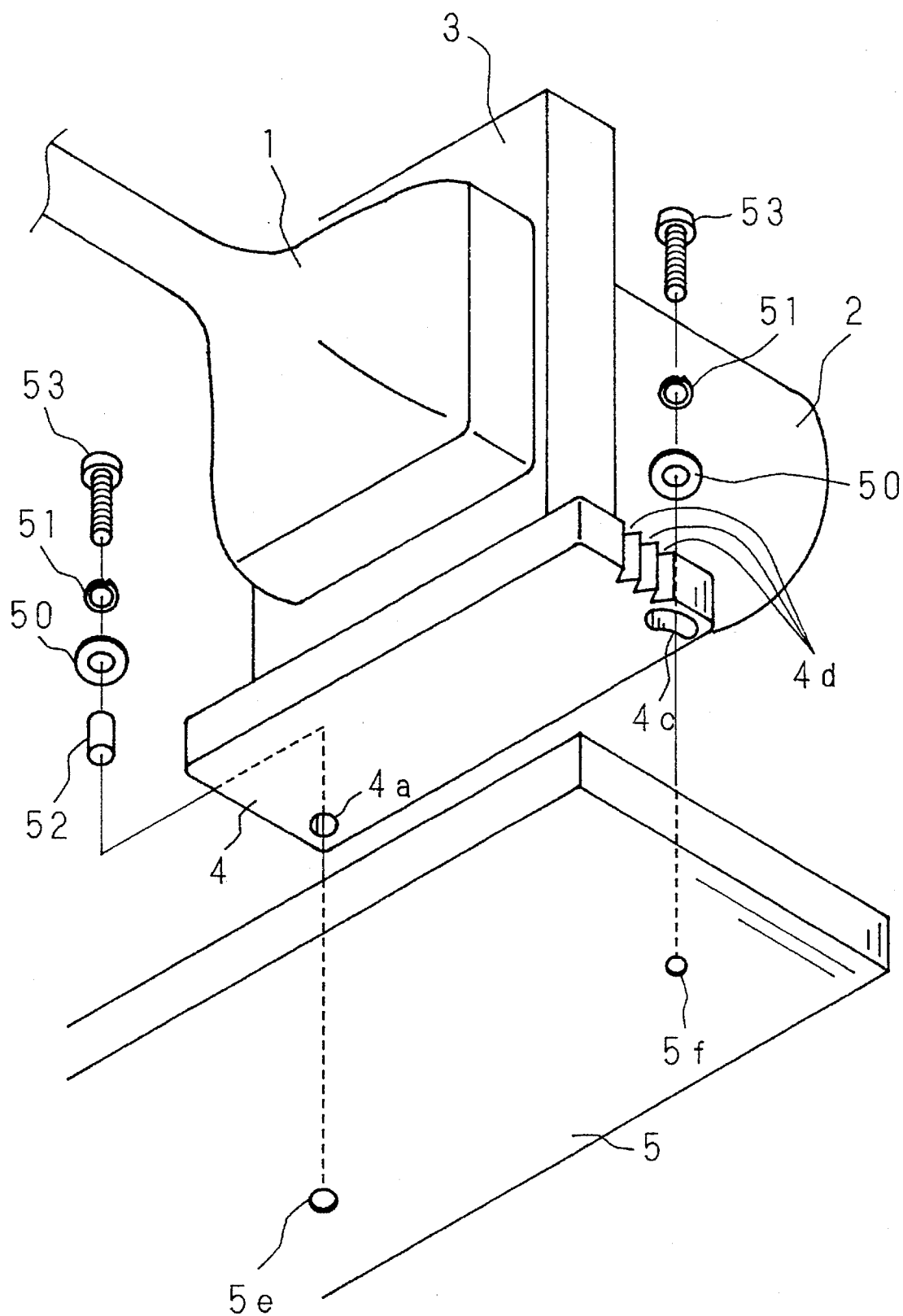
FIG. 70 is an exploded perspective view showing a state of the projection unit in FIG. 69 seen from rear and below.

FIG. 69 is a plan view showing a projection unit (red projection unit) of Embodiment 30 of the present apparatus, and FIG. 70 is an exploded perspective view of the projection unit. In the figures, a projection tube 1 such as a CRT or the like functions as image forming means, and a projection lens 2 has in a barrel a plurality of lenses (not shown) for magnifying and projecting an image formed by the projection tube 1. Screws 2a and 2b are arranged on the upper face of the barrel of the projection lens 2. The screw 2a adjusts the position of the projection lens 2 corresponding to the size of a screen which is not shown and to which magnified image is projected. The screw 2b adjusts the focal length. The projection tube 1 and the projection lens 2 are securely bonded at both sides of a rectangular hollow frame 3 in the liquid-tight state. A space 8 formed between a face portion 1a of the projection tube 1 and the projection lens 2 is filled with a cooling liquid 9. A rectangular frame base 4 in a predetermined thickness is bonded by an adhesive to the bottom of the frame 3. A shaft hole 4a, and an arcuate long hole 4c centered on the shaft hole 4a are respectively formed at two corners of a longer side of the frame base 4. On the other hand, a unit base 5 holding three projection units (only one unit is shown) is a flat box without a lid. A hole 5e is based at a predetermined position of the unit base 5, and a mounting screw 53 is screwed via a washer 50 into the shaft hole 4a of the frame base 4 and the hole 5e, Another hole 5f is formed at a predetermined position of the unit base 5 corresponding to the long hole 4c of the frame base 4. A different mounting screw 53 is fitted via a washer 50 into the long hole 4c of the frame base 4 and the hole 5f. According to this configuration, the frame base 4 is rotatable with respect to the unit base 5 about the shaft hole 4a within the range of the long hole 4c. Three V-notches 4d are formed at predetermined positions of a shorter side of the frame base 4 at the side of the long hole 4c. In the vicinity of this shorter side, a leaf spring 10 having a V-shaped end is screwed at the other end thereof to the unit base 5. The V-shaped end of the leaf spring is one of the V-notches 4d, thereby pressing the frame base 4.

In the thus-configured projecting-type display apparatus, the field angle θ1 can be set by selecting one of the V-notches 4d to be meshed with the V-shaped end of the leaf spring 10. Unlike the prior art, the projection tube 1 and the projection lens 2 are not disturbed during the adjusting work, thereby ensuring safety in the work.

The positions and number of the V-notches 4d may suitably be selected. In the blue projection unit, the angle of the frame base 4 is set with respect to the unit base 5 inversely. The V-notches 4d are formed at the left side of the frame base 4 in a plan view, and the leaf spring 10 is mounted outside the V-notches. The blue projection unit is rotatable in the above state. In the green projection unit, at the center of the apparatus, the frame base 4 has no V-notches 4d, nor the leaf spring 10. The green projection unit is mounted in such a manner that the optical axis of the unit is substantially perpendicular to the direction of longer sides of the unit base 5.

Alternatively, a large number of the V-notches may be formed, and the projection unit may be so configured as to be the unit base 5 in the opposite direction, thereby sharing the projection unit for red and blue colors.

Embodiment 31

Figure 71:
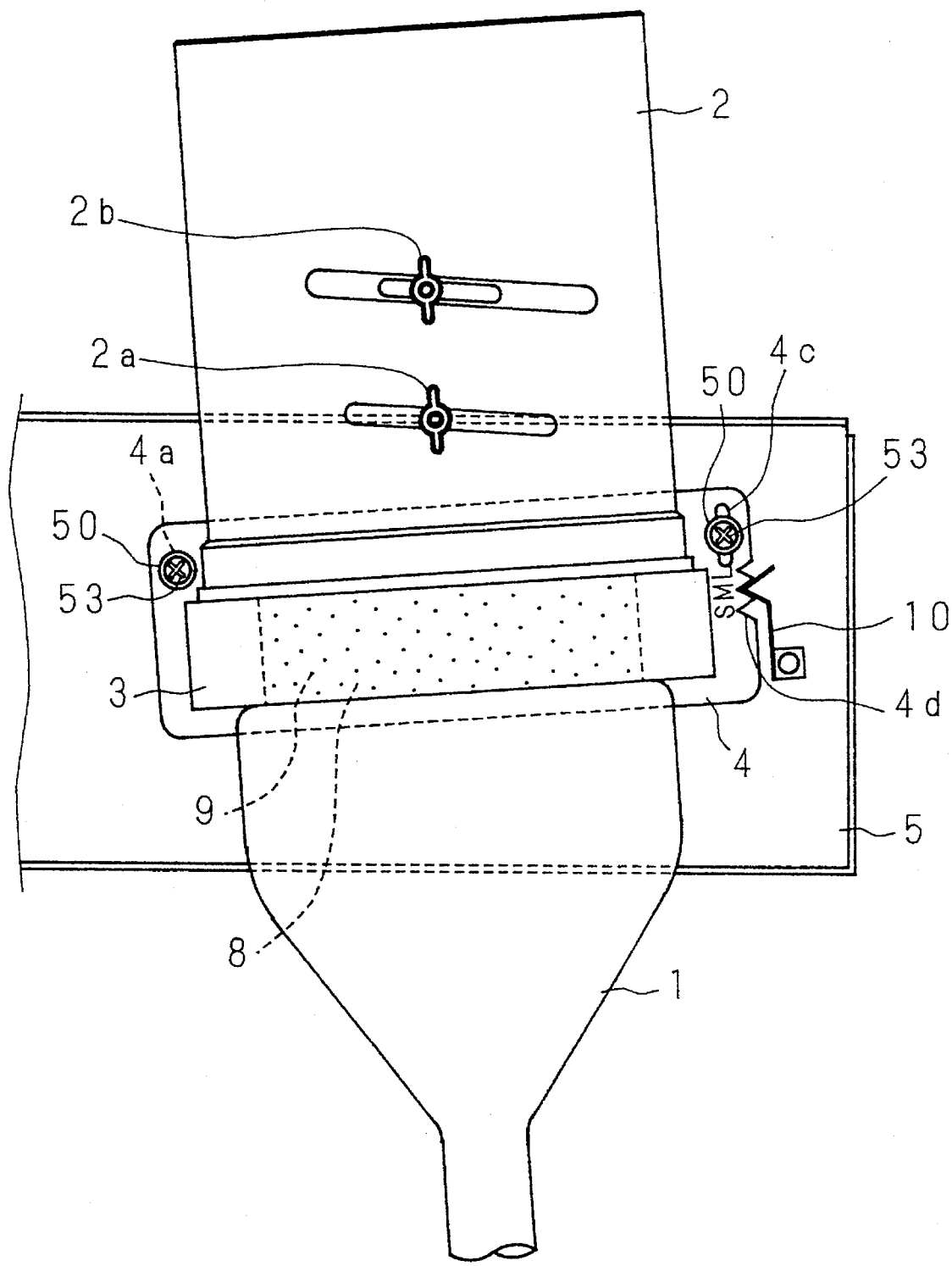
FIG. 71 is a plan view showing a projection unit of Embodiment 31 of the invention.

FIG. 71 is a plan view showing a projection unit of Embodiment 31 of the present apparatus. Marks S, M, and L respectively corresponding to the field angle θ1 are indicated in the vicinity of the three V-notches 4d of FIG. 69. The same components as those of FIG. 69 are designated by the same reference numerals, and the description is omitted. According to this configuration, the selected field angle θ1 can easily be confirmed.

Embodiment 32

Figure 72:
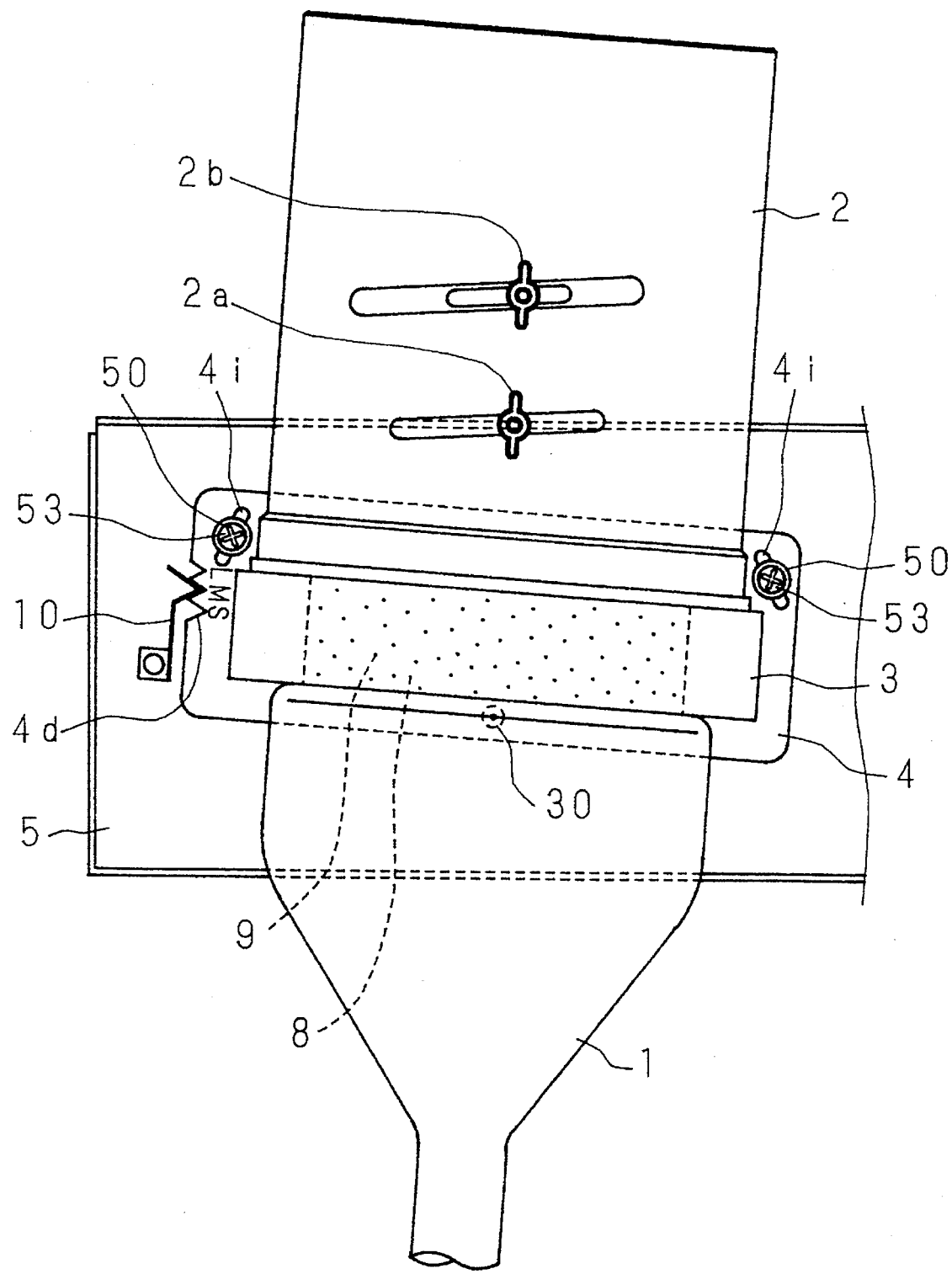
FIG. 72 is a plan view showing a projection unit of Embodiment 32 of the invention.
Figure 73:
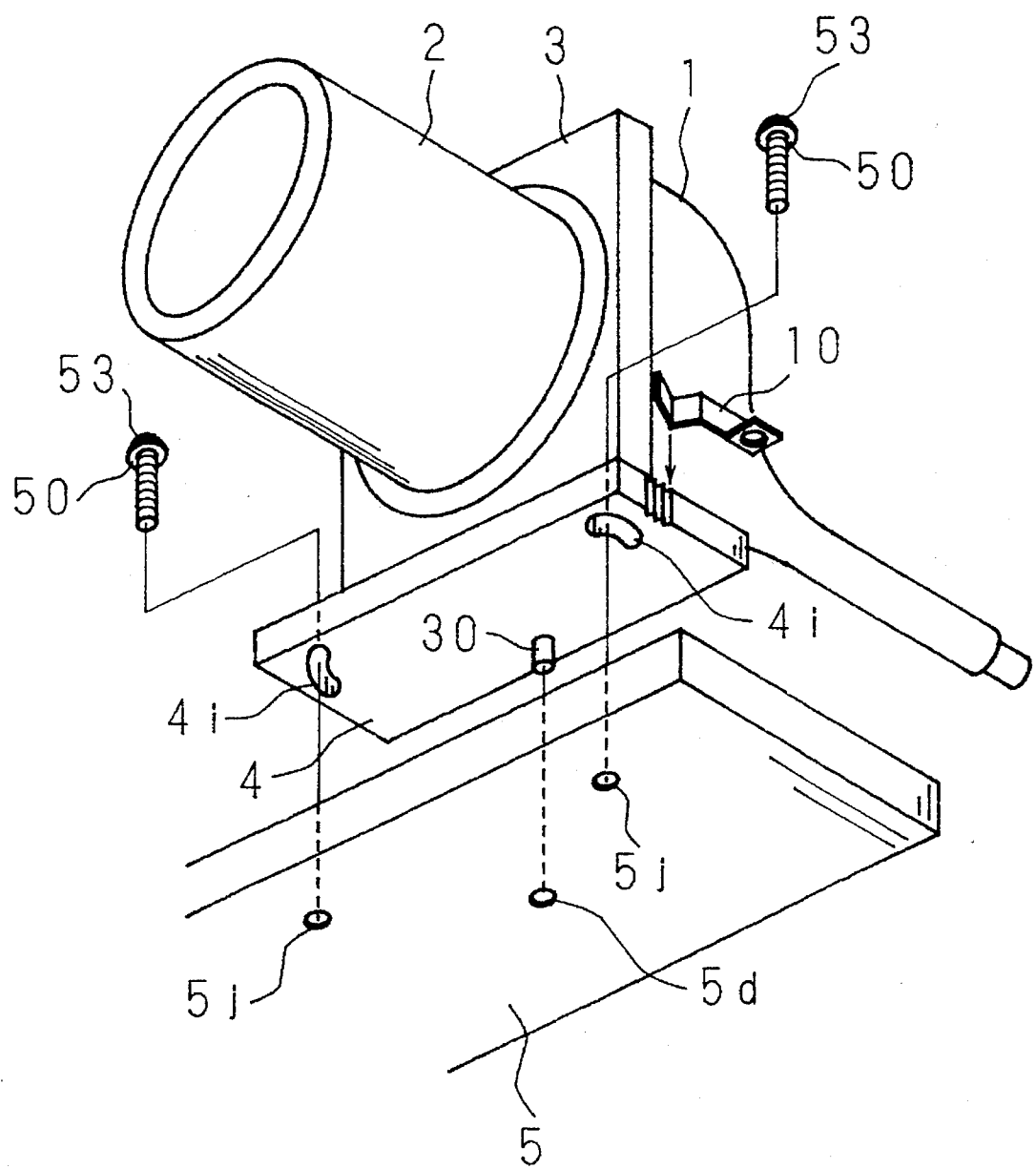
FIG. 73 is an exploded perspective view of the projection unit in FIG. 72 seen from front and below.

FIG. 72 is a plan view showing a projection unit (blue projection unit) of Embodiment 32 of the present apparatus, and FIG. 73 is an exploded perspective view of the projection unit seen from front (the side of a projection lens 2) and below. A pin 30 extends downward at the lower face of a Frame base 4 at a position corresponding to the central point of an image formed oil the projection tube 1 in the scanning direction. The pin 30 is rotatably inserted into a hole 5d formed in a unit base 5.

At the first side of the base 5d, symmetric to each other to the hole 5d and the same distance separated fro the hole 5d. Arcuate long holes 4i centering the pin 30 and having a predetermined length are formed at in the frame so as to correspond to the holes 5j when the frame base 4 is rotated about the pin 30 by a predetermined angle. Mounting screws 53 are screwed via washers 50 into the long holes 4i and holes 5j. The same components as those of FIG. 69 are designated by the same reference numerals, and their description is omitted.

In the embodiment, when the frame base 4 is rotated about the pin 30 to guide the V-shaped end of the leaf spring 10 into an adequate V-notch 4d, the field angle θ1 can easily be changed.

Embodiment 33

Figure 74:
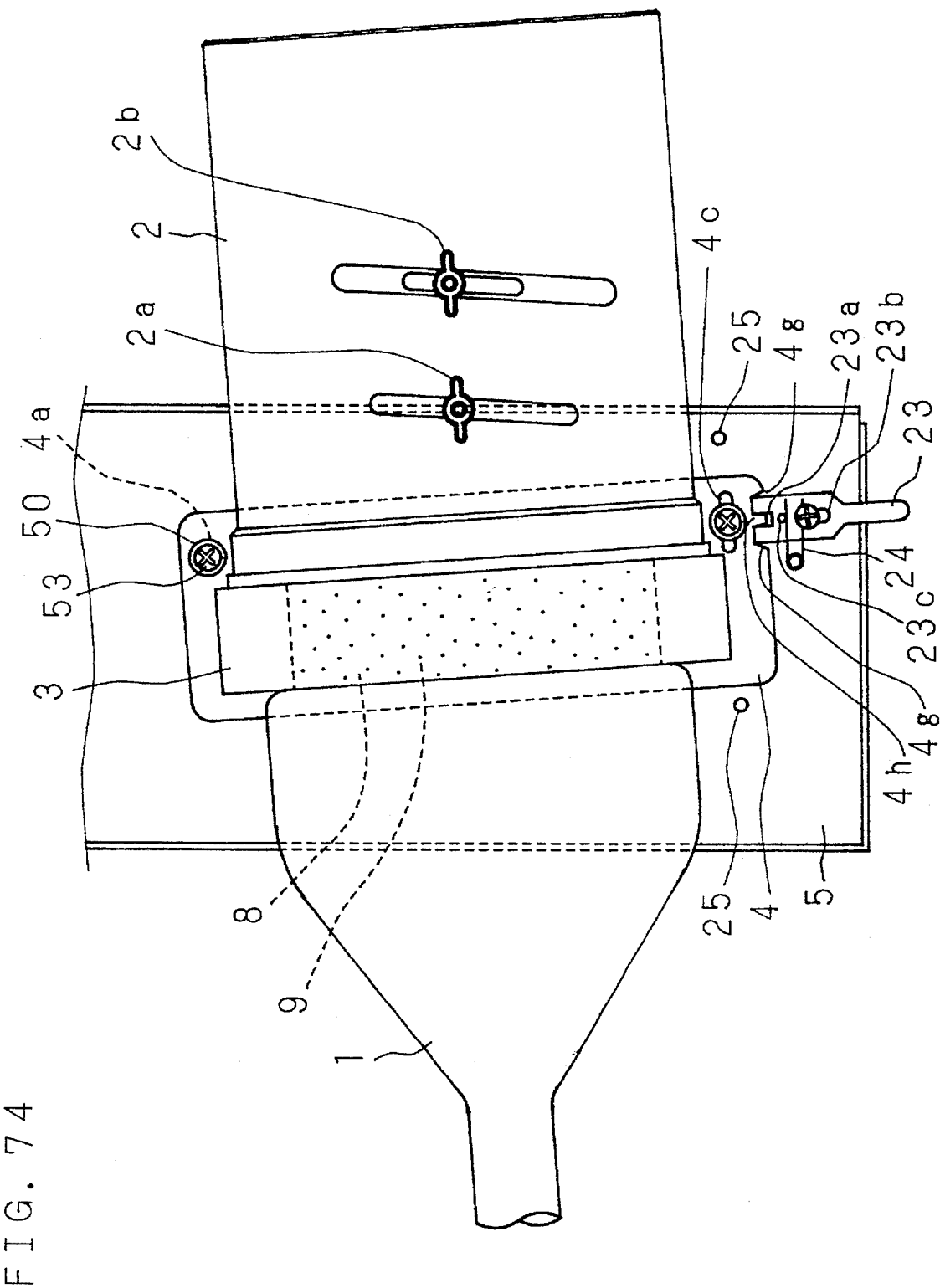
FIG. 74 is a plan view showing a projection unit of Embodiment 33 of the invention.

FIG. 74 is a plan view showing a projections unit (red projection unit) of Embodiment 33 of the present apparatus. In a frame base 4, notched portions 4g tapered at the outer sides thereof are formed on a shorter side close to a long hole 4c in a manner to define a projection or protrusion 4h therebetween.

A lever 23 has a recessed portion 23a formed at one end thereof, with the other end shaped like a rod. A long hole 23b in the longitudinal direction of the lever is formed at the central portion of the lever, and a pin 23c is disposed between the long hole 23b and the recessed portion 23a. The lever 23 is fastened to the unit base 5 by a screw passing through the long hole 23b, while the projection 4h is engaged with the recessed portion 23a. A torsion coil spring 24 having a twisted portion fixed to the unit base 5 is meshed with the screw the pin 23c, so that the lever 23 is pressed against the frame base 4 by the resilient force of the torsion coil spring 24. Positioning pins 25 are provided in the unit base 5 at the front and rear sides of the frame base 4. When the frame base 4 is brought in touch with one of the pins 25, the rotation of the frame base is stopped. The same components as those of FIG. 69 are designated by the same reference numerals, and the description is omitted.

Figure 75:
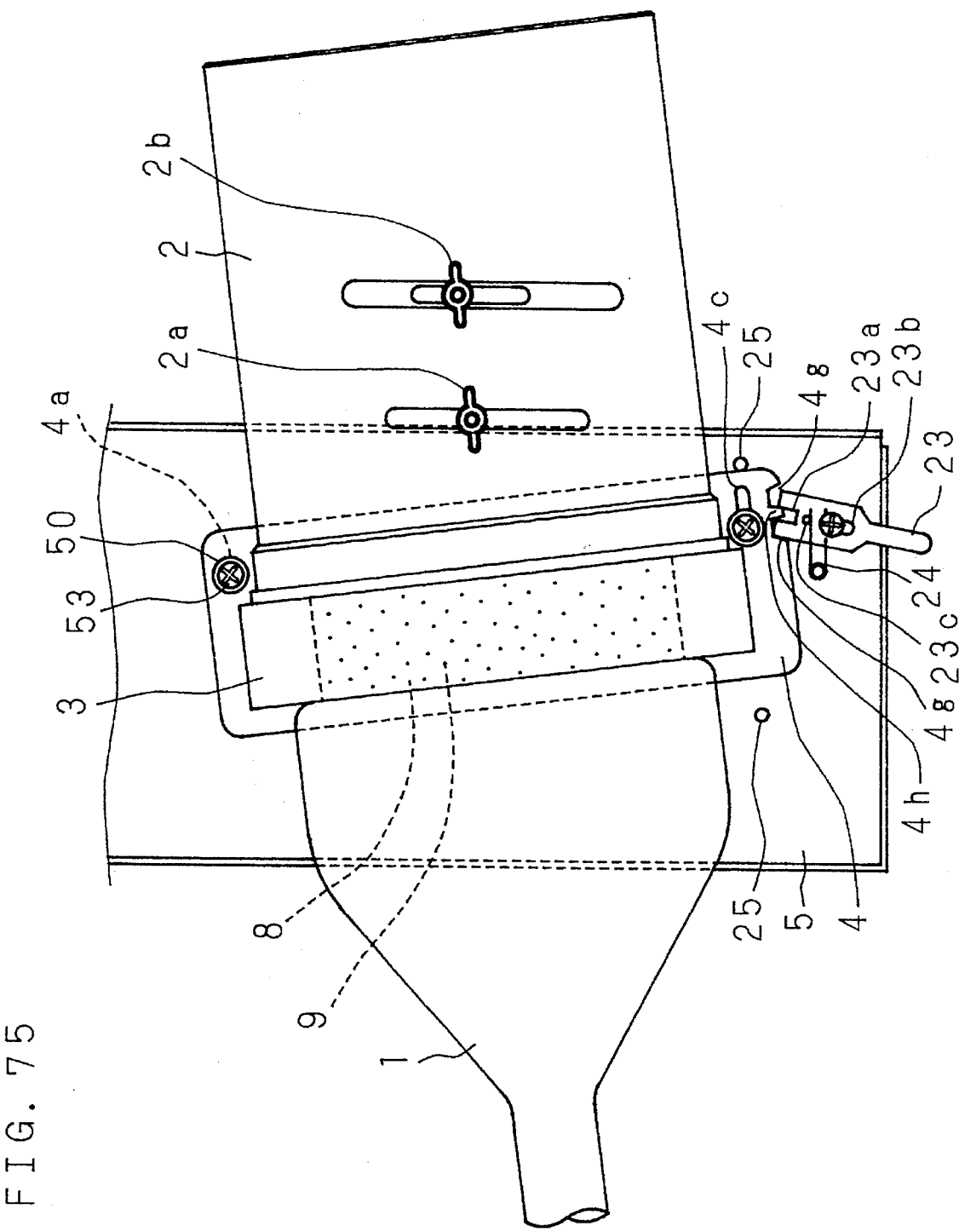
FIG. 75 is a plan view of the unit of FIG. 74 in the state where recess of a lever is moved forward.

FIG. 74 shows the state where the lever 23 is substantially perpendicular to the frame base 4, and FIG. 75 indicating the state in which the lever 23 is manipulated to move the recessed portion 23a forward (to the right side in the figure). When the recessed portion 23a of the lever 23 is moved forward as shown in FIG. 75, the frame base 4 is rotated about the shaft hole 4a in the counterclockwise direction in the figure, and stopped in contact with the Front positioning pin 25. As a result, the field angle θ1 is changed. When the recessed portion 23a of the lever Hd is moved in the opposite direction, the rotation of the frame base 4 is stopped when it is in touch with the rear positioning pin 25. Accordingly, in the above manner, the field angle θ1 of the projection unit can be changed in three steps.

Embodiment 34

Figure 76:
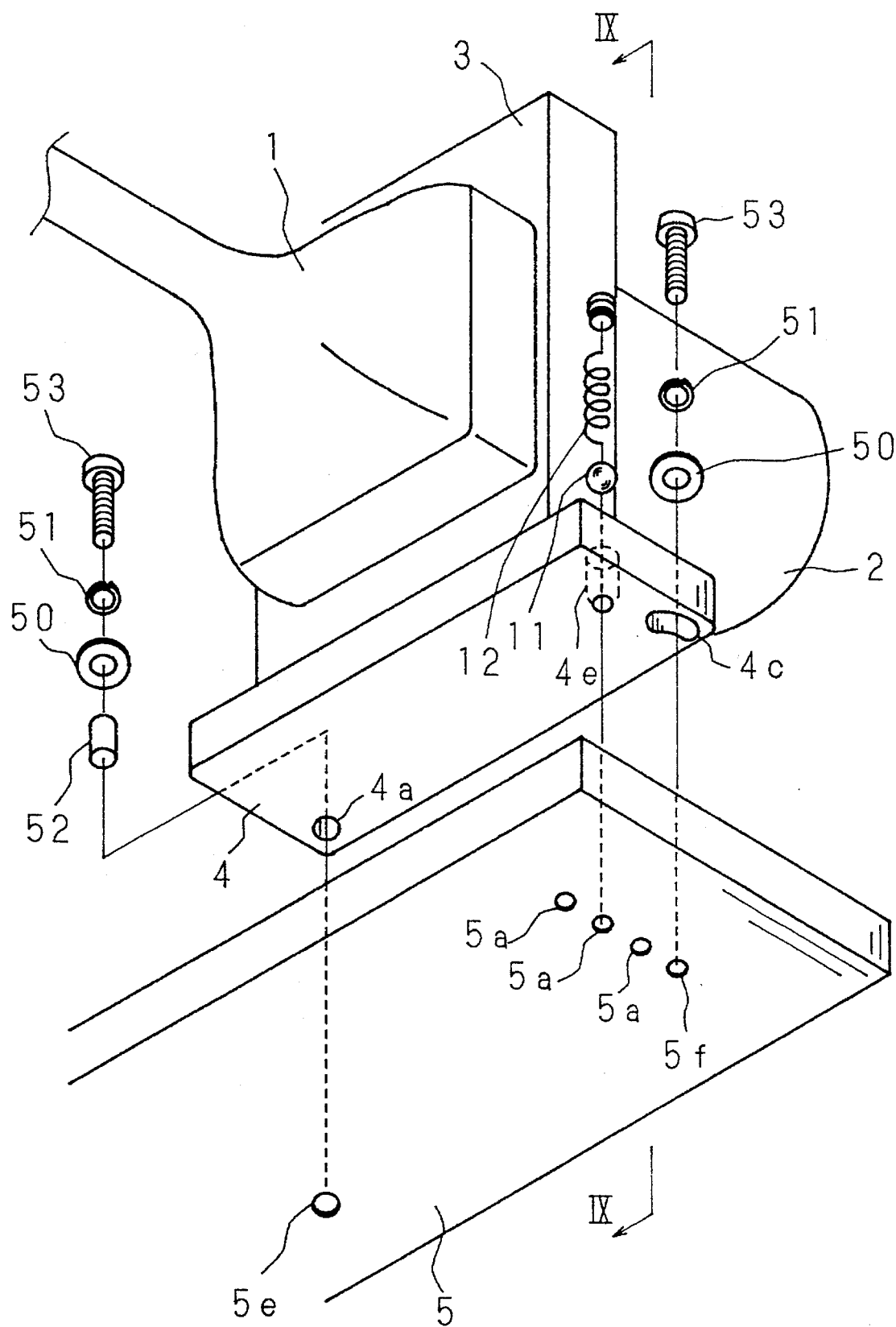
FIG. 76 is an exploded perspective view of a projection unit of Embodiment 34 of the invention seen from rear and below.
Figure 77:
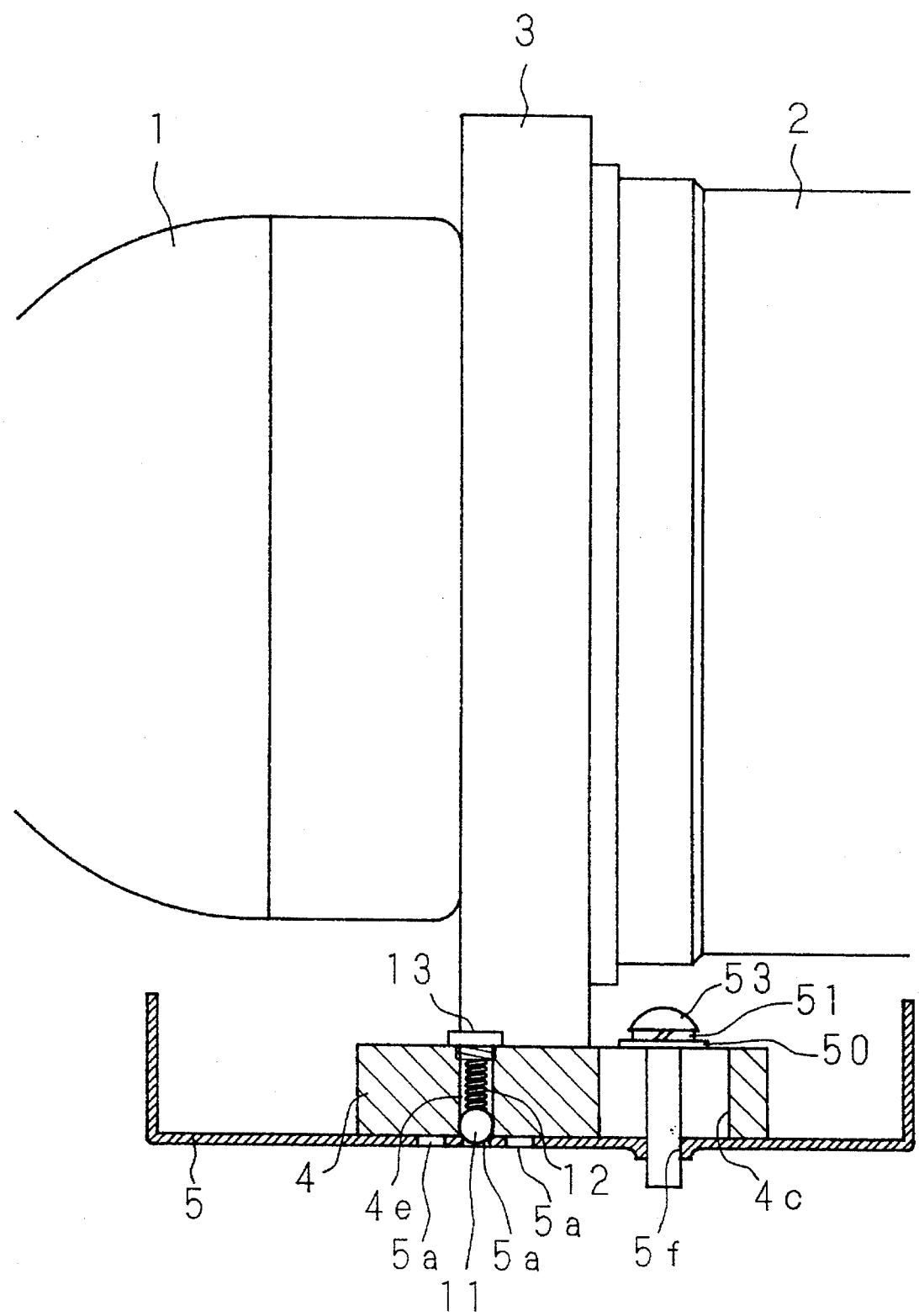
FIG. 77 is a longitudinal section view along a line IX—IX of FIG. 76.

FIG. 76 is an exploded perspective view of a projection unit (red projection unit) of Embodiment 34 of the present apparatus seen from rear and below, and FIG. 77 is a longitudinal section view along a line IX—IX of FIG. 76. A hole 4e is formed in a shorter side of a frame base 4 having also a long hole 4c. The diameter of the hole 4e is decreased from the bottom portion to the upper portion. A ball 11 is set into the hole 4e from above. At this time, about one third of the surface of the ball 11 is exposed from the lower face of the frame base 4. A spring 12 is inserted onto the ball 11 in the hole 4e, which is sealed to compress the spring 12. According to this configuration, when the ball 11 is pressed from the lower face of the frame base 4, the spring 12 is further compressed, with pushing the ball 11 into the hole 4e.

On the other hand, three fitting holes 5a are formed in a unit base 5 with a suitable distance from each other and the equal distance from the hole 5e to that between the shaft hole 4a and the hole 4e. The same components as those of FIG. 69 are designated by the same reference numerals, and the description is omitted.

In the above configuration, when, while the ball 11 is fitted into the fitting hole 5a, the rotating force is impressed to the frame base 4, the ball 11 is pressed from the peripheral wall of the fitting hole 5a and is pushed into the hole 4e. When the frame base 4 is further rotated and the hole 4e is agreed with the adjacent fitting hole 5a, the ball 11 is partly fitted into the adjacent fitting hole 5a.

In the embodiment of the regulating mechanism as above, when the frame base 4 is rotated and the exposed portion of the ball 11 is fitted into one of the fitting holes 5a, the Field angle θ1 of the projection unit is set in three steps corresponding to the desired projection distance. Since the ball 11 is freely retractable, the fitting hole 5a to be meshed with the ball is also easily changed.

The position and number of the fitting holes 5a may suitably be selected.

Embodiment 35

Figure 78:
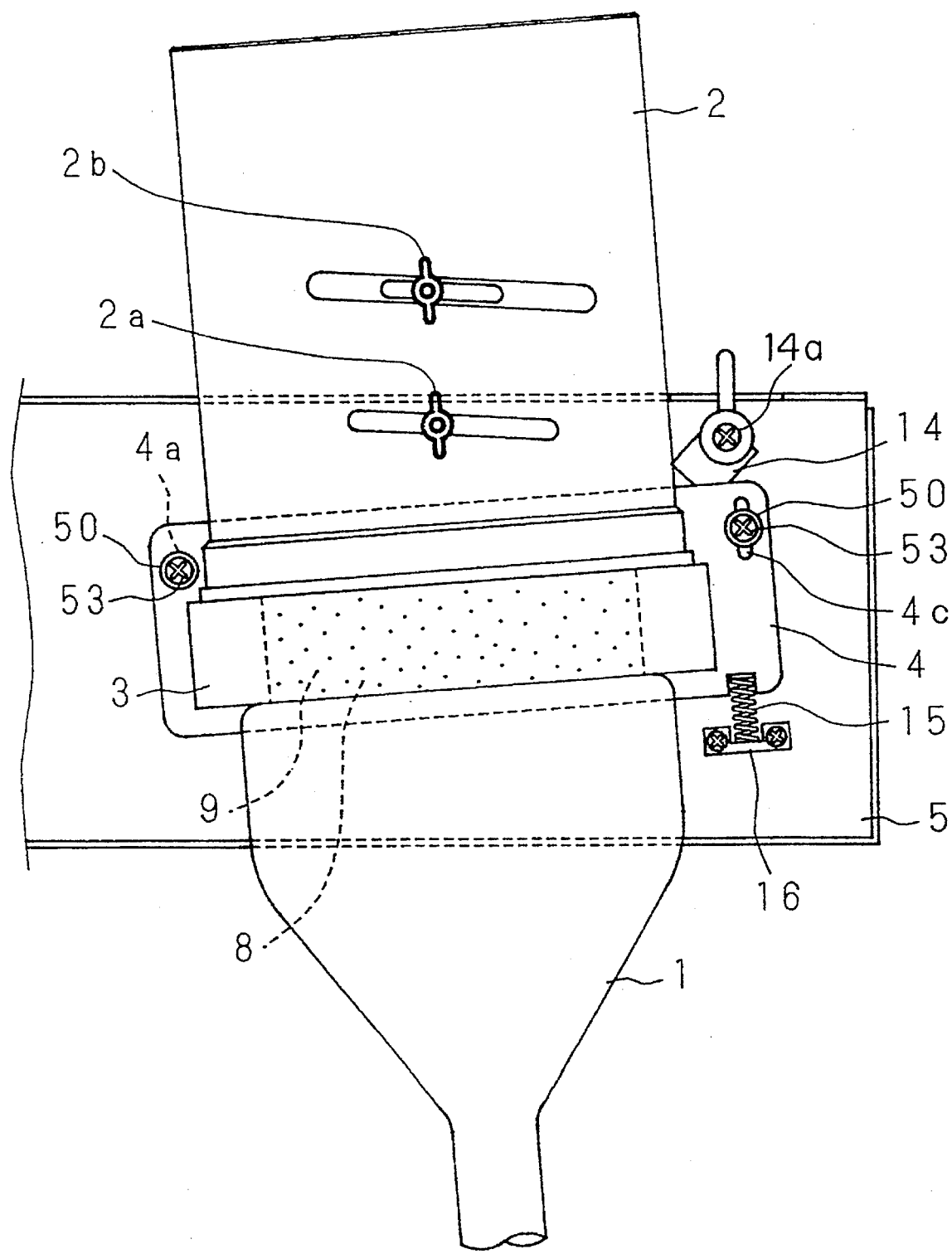
FIG. 78 is a plan view showing a projection unit of Embodiment 35 of the invention.

FIG. 78 is a plan view of a projection unit (red projection unit) of Embodiment 35 of the present apparatus. A polygonal cam 14 which is rotatable about a screw 14a is fastened by the screw to a unit base 5 at the side of a projection lens 2 (front side), while keeping touch with a frame base 4. The polygonal cam 14 is formed in a pentagonal shape obtained by obliquely cutting one corner of a rectangle, and is screwed at the oblique edge which is different from the geometric center of the polygonal cam 14. A spring holder 16 in the shape similar to rectangular parallel-piped having a recess is fixed at the rear side of the frame base 4. The recess of the spring holder 16 is opened to the frame base 4. The frame base 4 is pressed in touch with the polygonal cam 14 by a spring 15 having one end caught in the recess of the spring holder 16. The same components as of FIG. 69 are designated by the same reference numerals, and their description is omitted.

When the polygonal cam 14 is rotated about the screw 14a to switch the face in touch with the frame base 4, the distance between the screw 14a and the front of the frame base 4 is changed, and hence the projection unit rotates on the unit base 5 about the shaft hole 4a. Accordingly, the field angle θ1 of the projection unit is changed in many ways.

Embodiment 36

Figure 79:
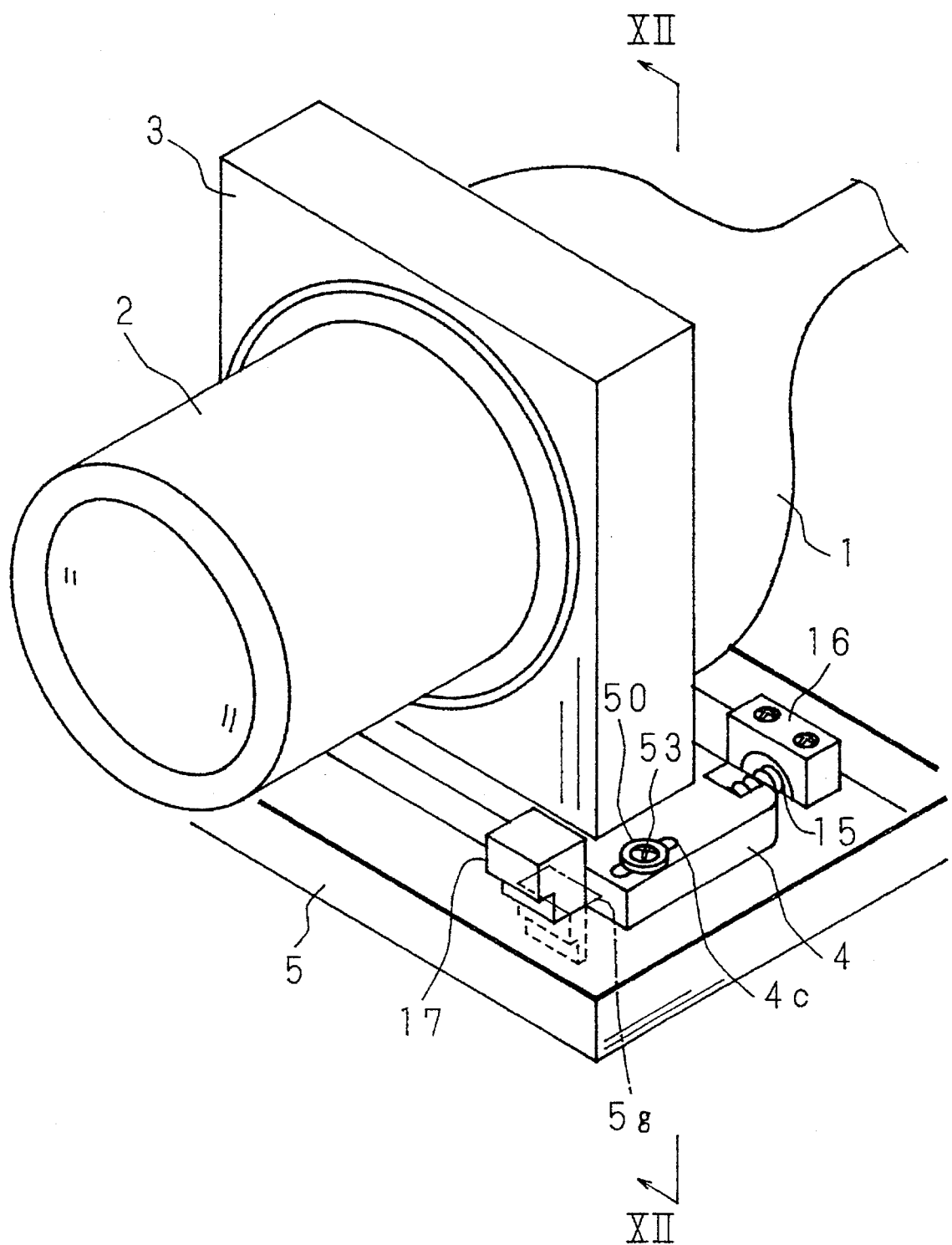
FIG. 79 is a perspective view of a projection unit of Embodiment 36 of the invention seen from rear and below.
Figure 80:
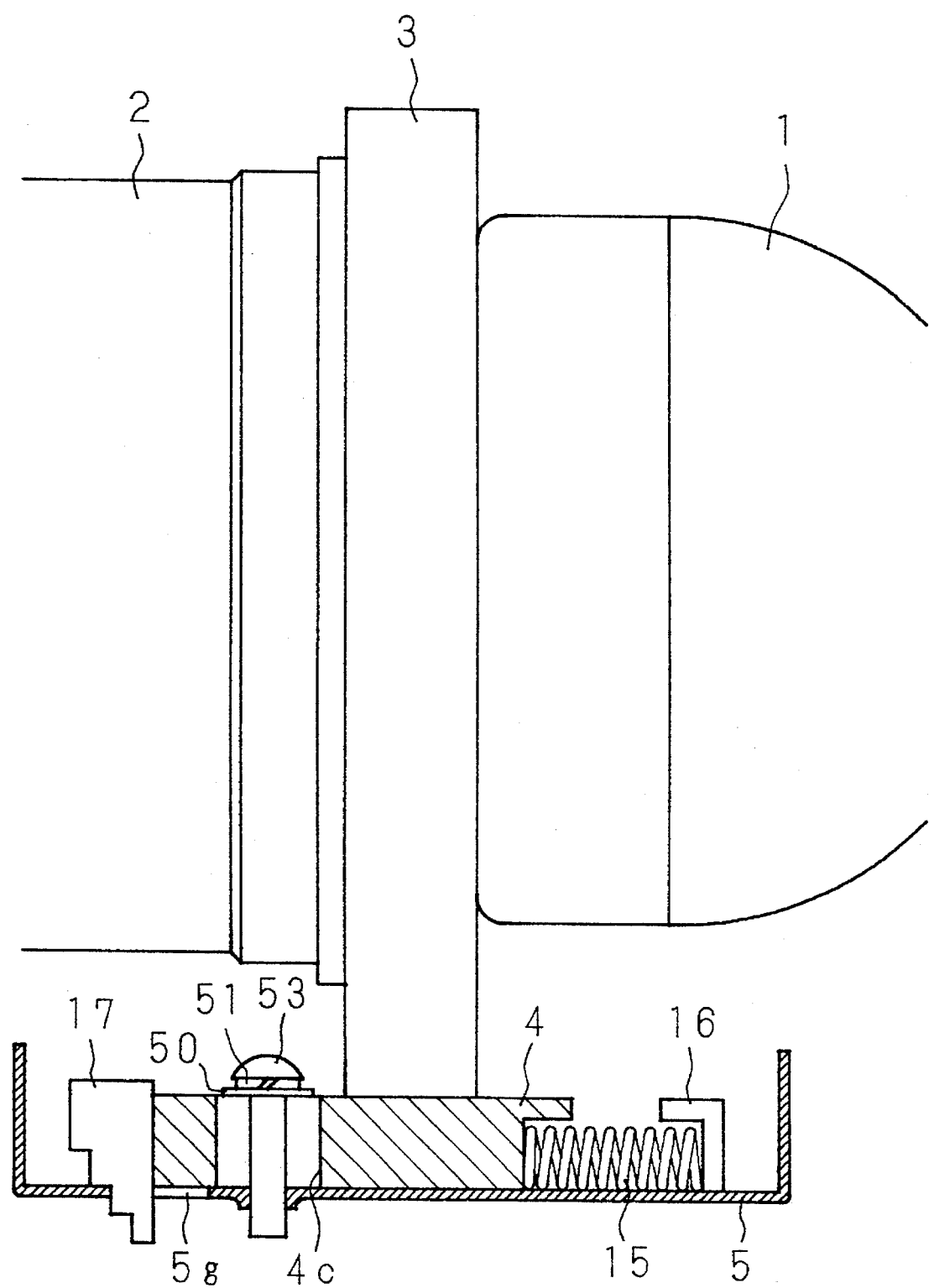
FIG. 80 is a longitudinal section view along a line XII—XII of FIG. 79.

FIG. 79 is a perspective view a projection unit (blue projection unit) of Embodiment 36 of the present apparatus seen from rear and below, and FIG. 80 is a longitudinal section view along a line XII—XII of FIG. 79. In the figures, 17 is a spacer which is obtained by forming steps in a rectangular parallelepiped so as to realize four kinds of thicknesses. A rectangular hole 5g is opened in a unit base at the front side than a hole 5f. (See FIG. 76) The hole 5g is of the size allowing the second thickest portion of the spacer 17 to be fitted thereinside. In FIG. 79, the third thickest portion of the spacer 17 is inserted into the hole 5g while the thicker side of the spacer is positioned up and the bottom face of the step is directed to be in touch with the frame base 4. In the same manner as in FIG. 73, a spring 15 for pressing the frame base 4 in contact with the spacer 17 for the rear side of the frame base 4 is installed by a spring holder 16. According to this configuration, the distance between the face of the frame base 4 in contact with the spacer 17 and the front face of the hole 5g becomes equal to the thickness of the third thickest portion of the spacer 17 inserted into the hole 5g. The same components as those of FIG. 69 are designated by the same reference numerals, and the description is omitted.

When the frame base 4 is pushed rearward to change the portion of the spacer 17 to be inserted into the hole 5g and the spacer 17 is then brought in touch with the frame base 4, the frame base 4 is rotated about a hole 5e (See FIG. 76) with respect to the unit base 5, thereby allowing the field angle θ1 of the projection unit to be easily changed, The thickness and number of steps of the spacer 17 may suitably be selected.

Embodiment 37

Figure 81:
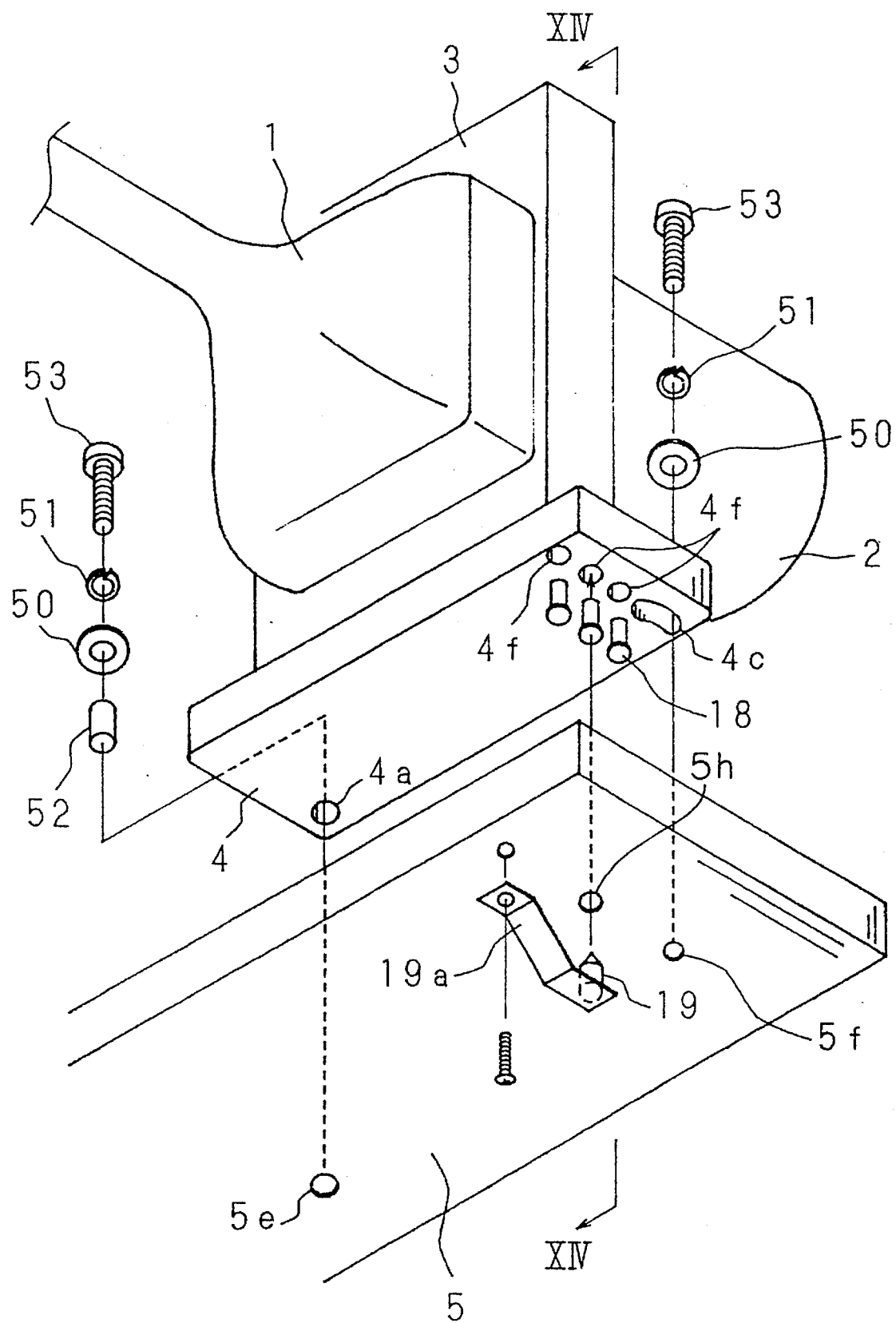
FIG. 81 is an exploded perspective view of a projection unit of Embodiment 37 of the invention seen from rear and below.
Figure 82:
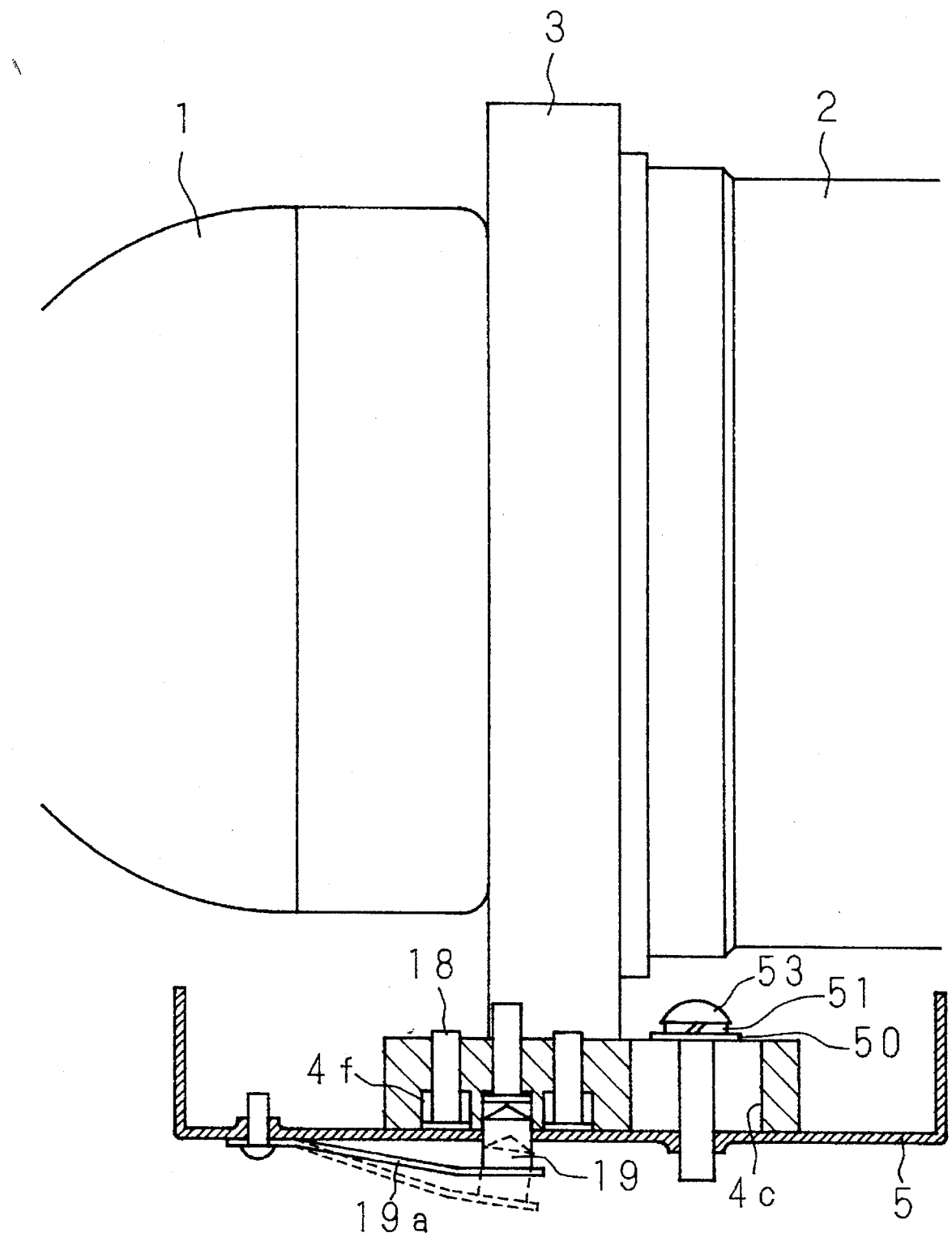
FIG. 82 is a longitudinal section view along a line XIV—XIV of FIG. 81.

FIG. 81 is an exploded perspective view a projection unit (red projection unit) of Embodiment 37 of the present apparatus as seen from the rear and belows and FIG. 82 is a longitudinal section view along a line XIV—XIV of FIG. 81. Three fitting holes 4f to receive pins 18 each having a flange at the lower portion thereof are provided in a frame base 4 at the rear side of a long hole 4c. The distance between each fitting hole 4f and a shaft hole 4a is made equal for every fitting hole. Each of the fitting holes 4f is so formed as to be fitted with the shaft portion of the pin 18 at the upper side thereof and also fit for the flange at the lower side thereof. The above pins 18 penetrate the fitting holes 4f from the lower side of the frame base 4. Since the upper side of each fitting hole 4f is smaller than the flange of the pin 18, the pin 18 is prevented from being slipped up.

A hole 5h formed at the rear side of the holes 5f in a unit base 5 is separated from the hole 5e approximately equal to the distance between the shaft hole 4a and each fitting hole 4f. A positioning pin 19 is attached to one end of a leaf spring 19a fastened at the other end thereof to the unit base 5 by a screw. The positioning pin 19 is inserted into the hole 5h by the elastic force of the leaf spring 19a. When the hole 5h is made coincident with one of the fitting holes 4f, the positioning pin 19 exerts an upward force to push up the pin 18 and is inserted into the fitting hole 4f. The same components as those of FIG. 69 are designated by the same reference numerals, and their description is omitted.

When the field angle θ1 of the projection unit is to be changed, the pushed-up pin 18 is depressed downward to remove the positioning pin 19 out from the fitting hole 4f. When the frame base 4 is then rotated about the shaft hole 4a, the positioning pin 19 is fitted into another fitting hole 4f, whereby the field angle θ1 is easily changed. The position and number of the fitting holes 4f may suitably be selected.

Embodiment 38

Figure 83:
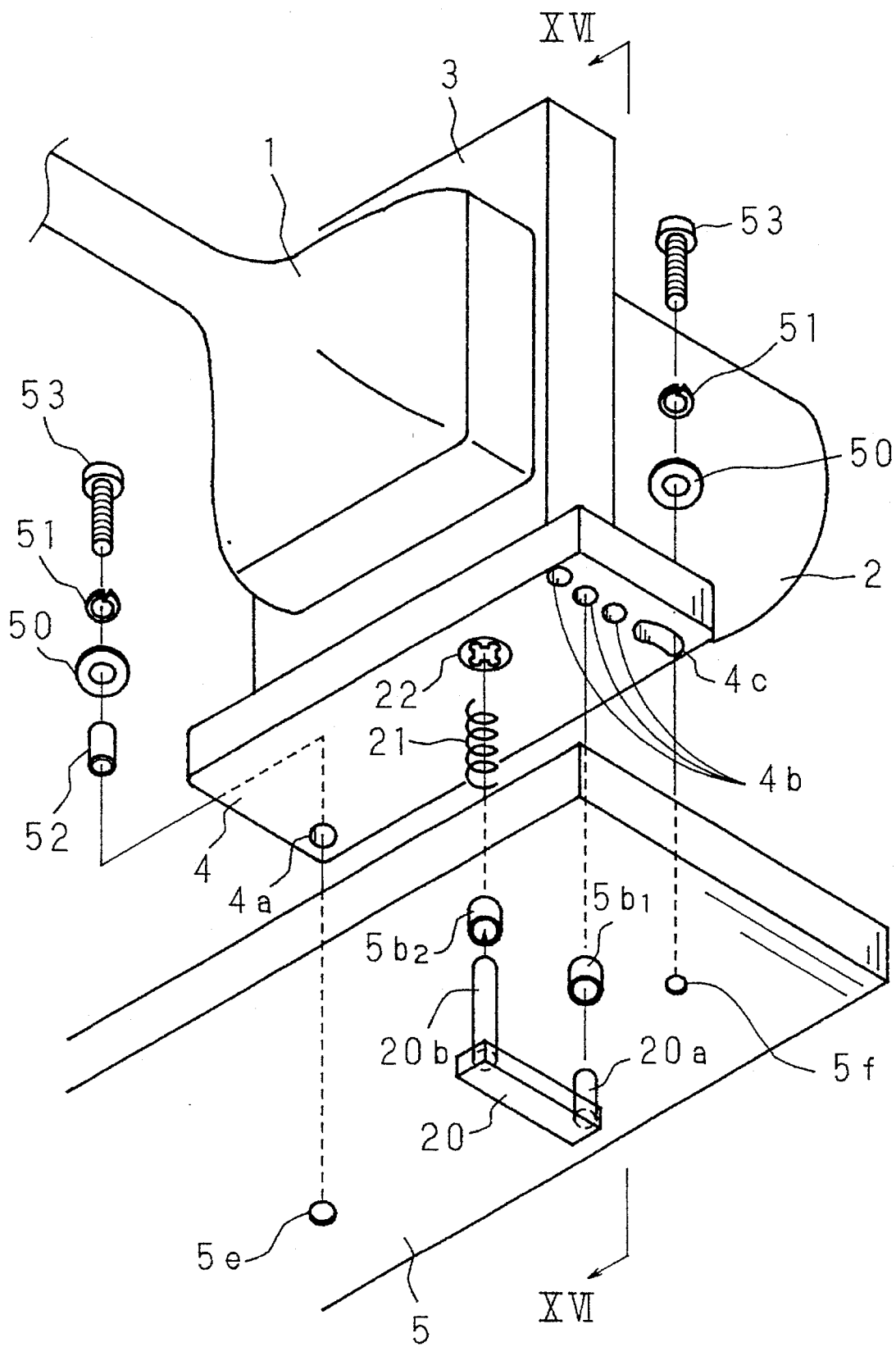
FIG. 83 is an exploded perspective view of a projection unit of Embodiment 38 of the invention seen from rear and below.
Figure 84:
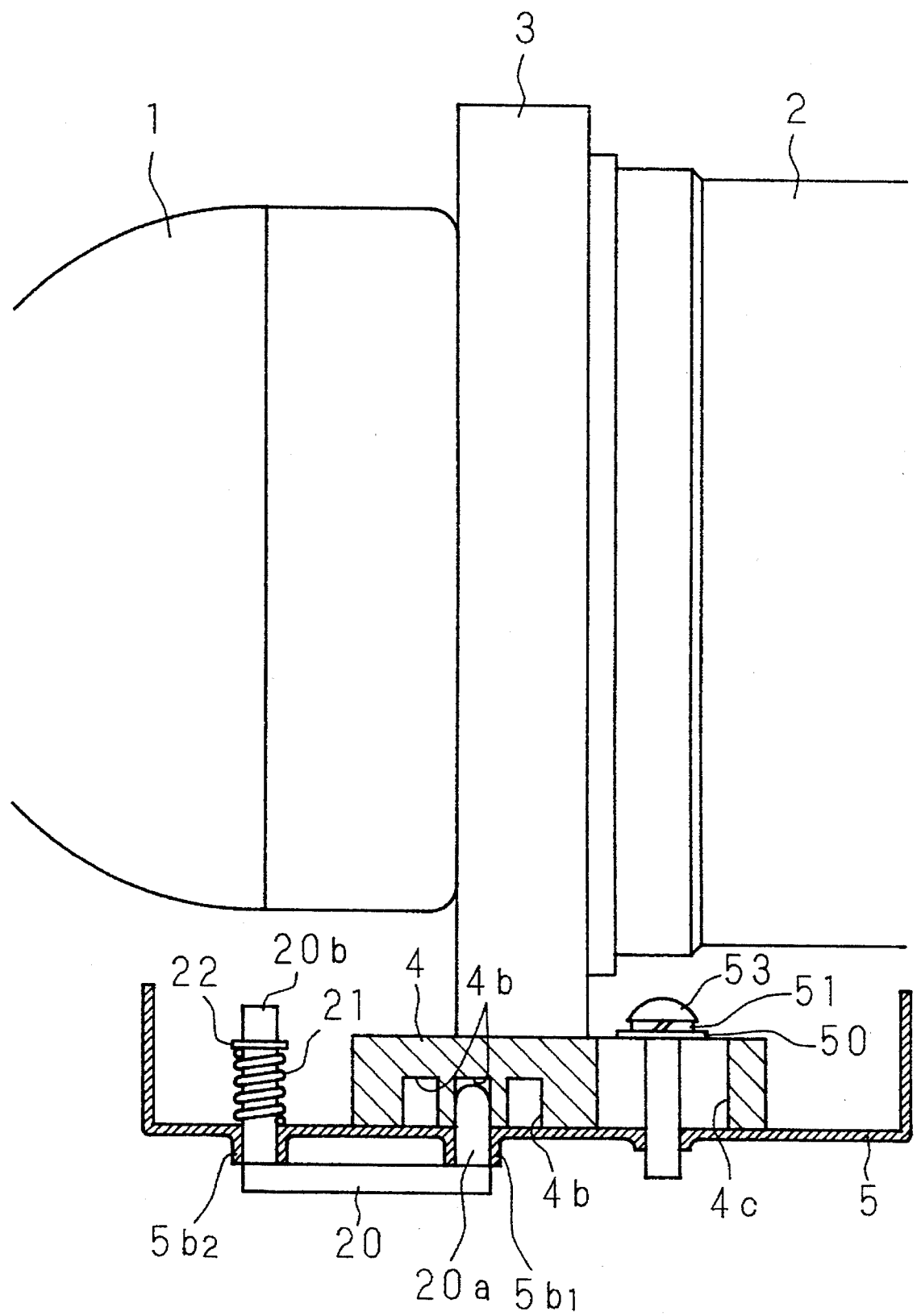
FIG. 84 is a longitudinal section view along a line XVI—XVI of FIG. 83.

FIG. 83 is an exploded perspective view of a projection unit (red projection unit) of Embodiment 38 of the present apparatus seen from rear and below, and FIG. 84 is a longitudinal section view along a line XVI—XVI of FIG. 83. Holes $5b_1$ and $5b_2$ having pipe portions projecting downward are formed in a unit base 5 at the rear side of a hole 5f. A positioning pin 20a, and a knob 20b longer than the positioning pin 20a are integrally formed in an arm 20. The arm 20, namely, pin 20a and knob 20b, are fitted in the holes $5b_1$ and $5b_2$ respectively. A spring 21, and a retaining ring 22 are set in this order from above to the knob 20b, and fixed.

On the other hand, three fitting holes 4b are formed in a frame base 4 at the rear side of a long hole 4c. The distance between each fitting hole 4b and a shaft hole 4a is equal for every fitting hole 4b, and also equal to the distance between a hole 5e and the hole $5b_1$ of the unit base 5. The same components as those of FIG. 69 are designated by the same reference numerals, and their description is omitted.

in order to change the field angle θ1 of the projection unit, the knob 20b is pressed downward thereby to move the positioning pin 20a downward to be disengaged from the fitting hole 4b of the frame base 4. When the frame base 4 is rotated about a shaft hole 4a in the above state, the positioning pin 20a is fitted into another fitting hole 4b, thereby allowing the field angle θ1 to be easily changed.

The position and number of the fitting holes 4b may suitably be selected.

Embodiment 39

Figure 85:
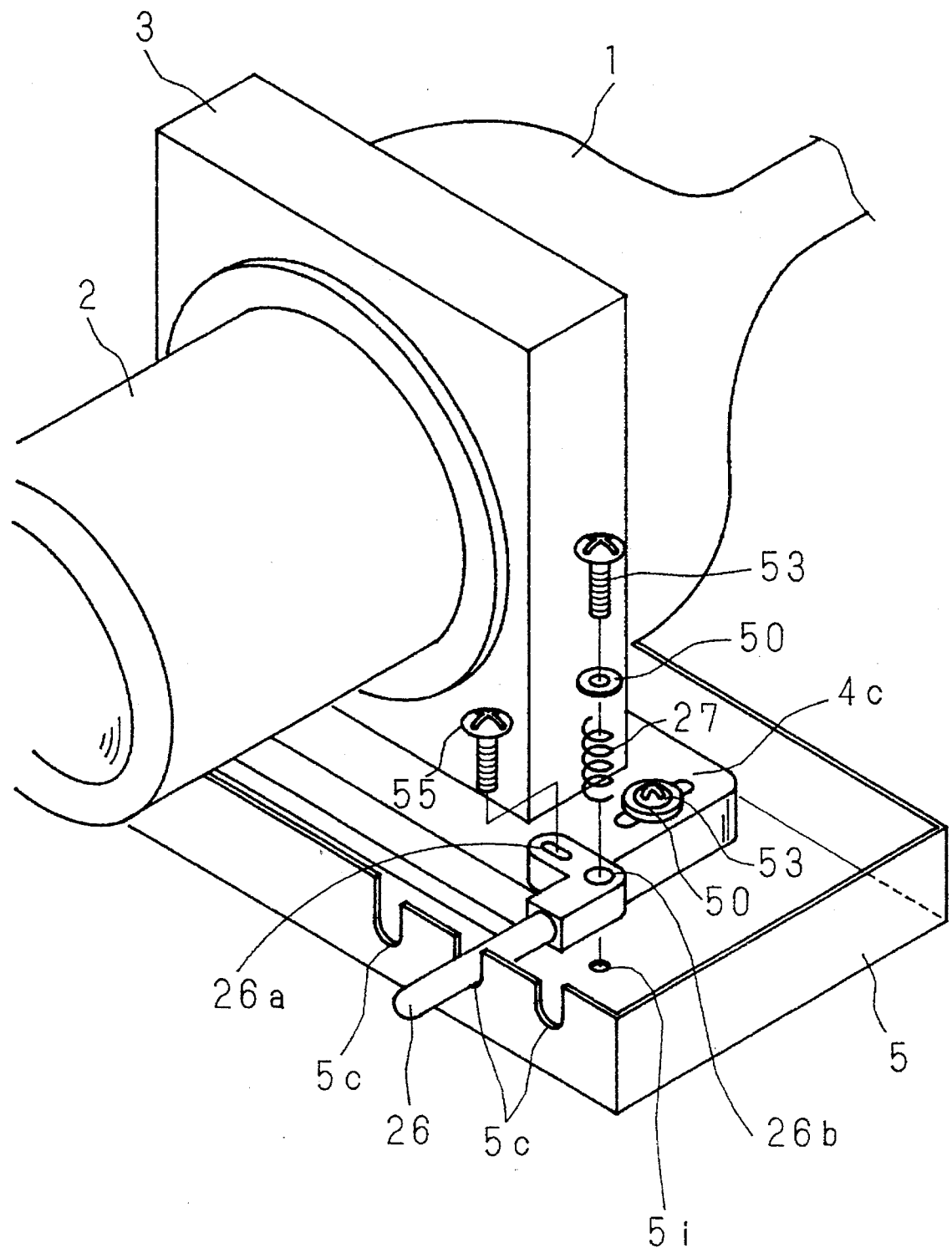
FIG. 85 is an exploded perspective view of a projection unit of Embodiment 39 of the invention seen from front and above.

FIG. 85 is an exploded perspective view of the projection unit of Embodiment 39 of the present apparatus seen from front and above. A hole (not shown) is formed in a frame base 4 at the front side of a long hole 4c, while a hole 51 is formed at an adequate position of a unit base 5 at the outer side than the above hole. An L-shaped lever 26 has a long hole 26a formed at the front end of a shorter shaft. The long hole 26a extends shorter shaft. A hole 26b is formed at the bent portion of the lever. The lever 26 is secured to the unit base 5 by inserting a spring 27 into the hole 26b and then fastening a screw 53 into the hole 5i via a washer 50 and the spring 27. Another screw 55 is screwed into the hole (not shown) via the long hole 26a so that the lever 26 is rotatable within the range of the long hole 26a. Three notched portions 5c are provided in a front long side of the unit base 5 at the side of the hole 5i. The same components as those of FIG. 69 are designated by the same reference numerals, and the description is omitted.

Figure 86:
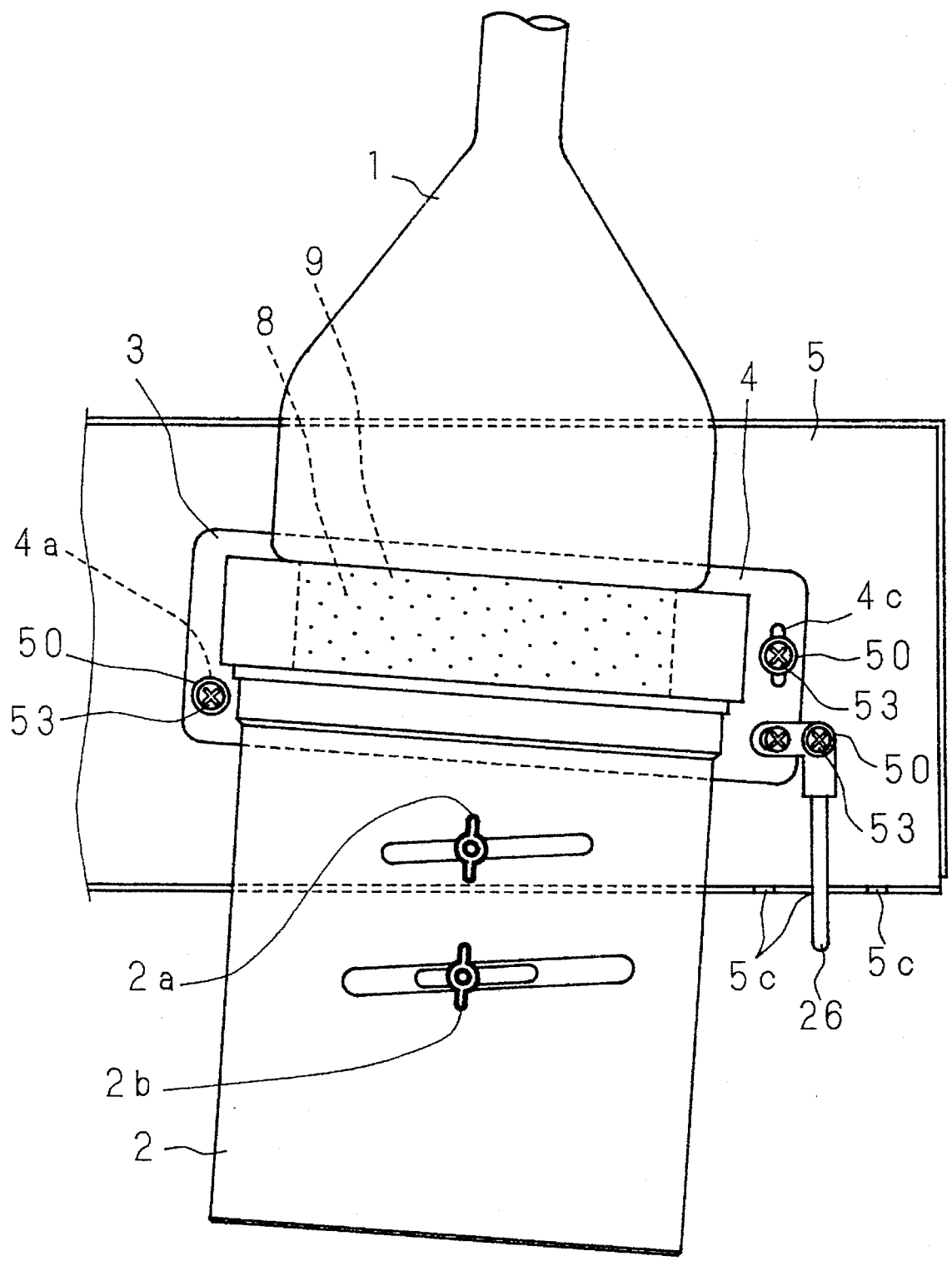
FIG. 86 is a plan view of the unit in FIG. 85 in the state where a longer shaft of a lever is fitted into a central notched portion.
Figure 87:
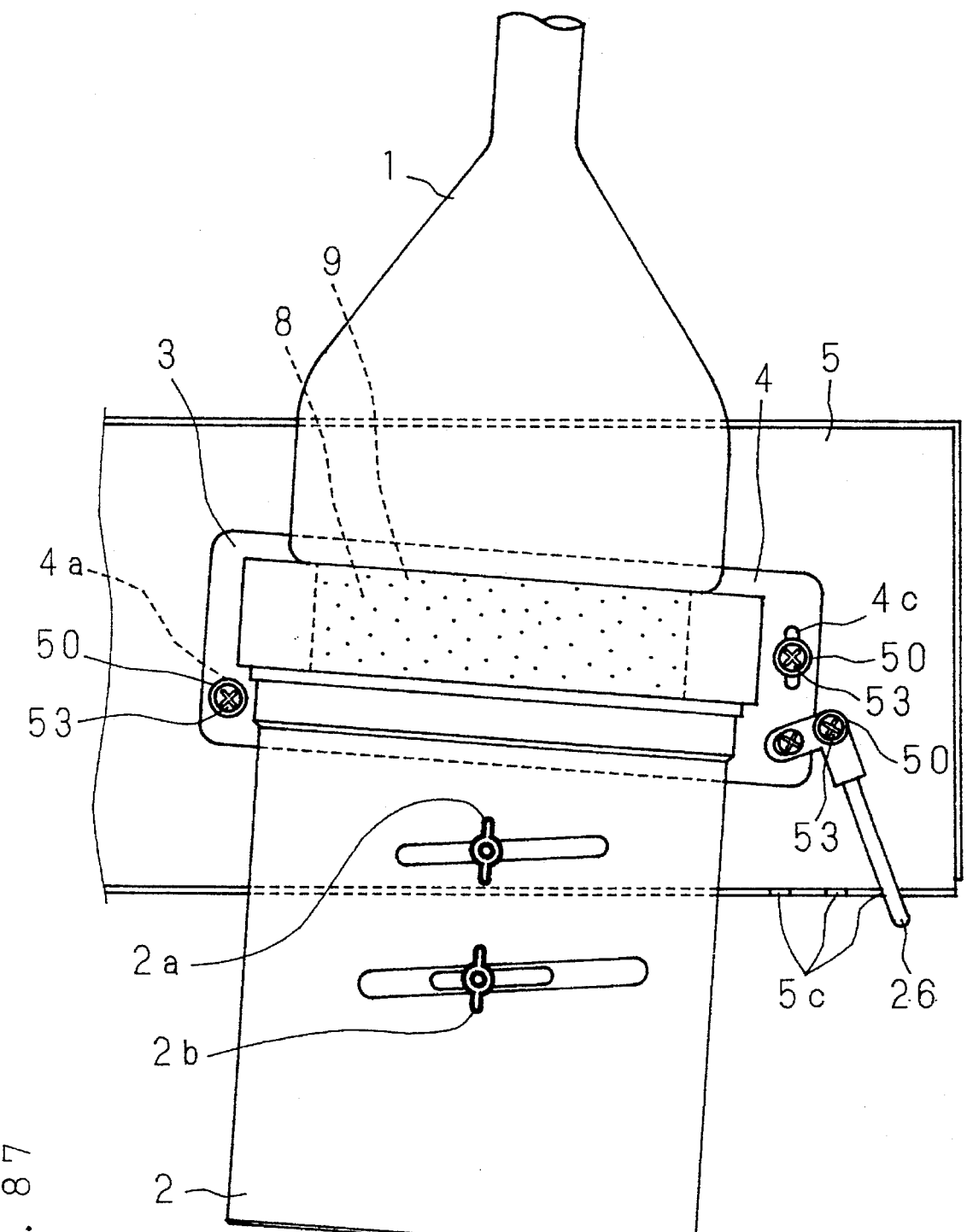
FIG. 87 is a plan view of the unit in FIG. 85 in the state where longer shaft of the lever is fitted into a notched portion closest to a corner.

FIG. 86 is a plan view of the projection unit in the state where a longer shaft of the lever 26 is fitted into the central notched portion 5c, and FIG. 87 is a plan view of the same projection unit where the longer shaft of the lever 26 is fitted into the notched portion 5c nearest to the corner. When the lever 26 is moved from the state shown in FIG. 86 to that of FIG. 87, the front end of the shorter shaft of the lever 26 is inclined forward, and hence the frame base 4 is rotated about the shaft hole 4a in the clockwise direction (in the figure). As a result, the field angle θ1 is changed. When the lever 26 is moved in the opposite direction, the frame base 4 is rotated in the opposite direction, and the field angle θ1 is changed. According to this configuration, the field angle θ1 of the projection unit can easily be set in three steps.

The positions and number of the notched portions 5c can suitably be selected.

Embodiment 40

Figure 88:
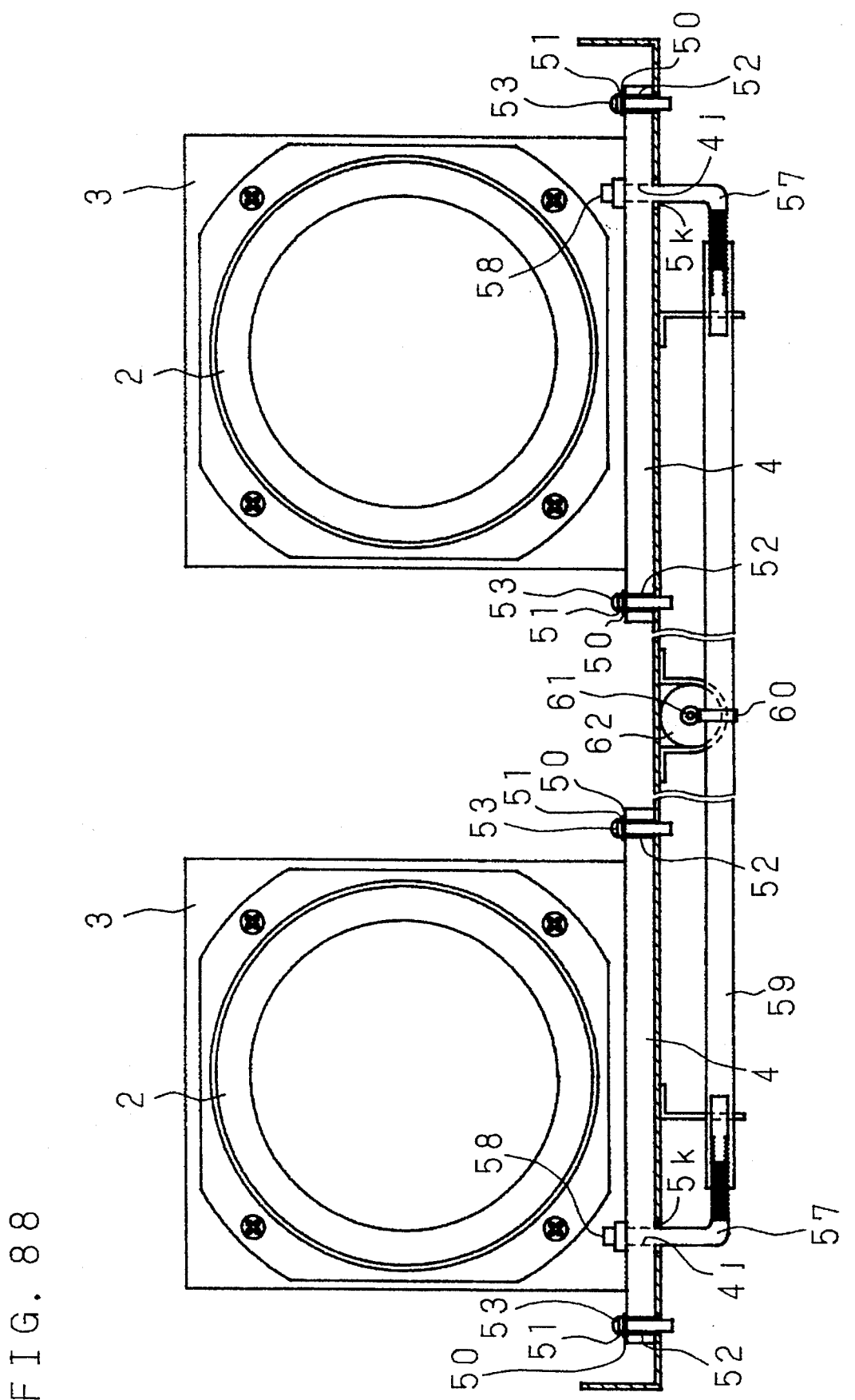
FIG. 88 is a front section view showing two projection units of Embodiment 40 of the invention.
Figure 89:
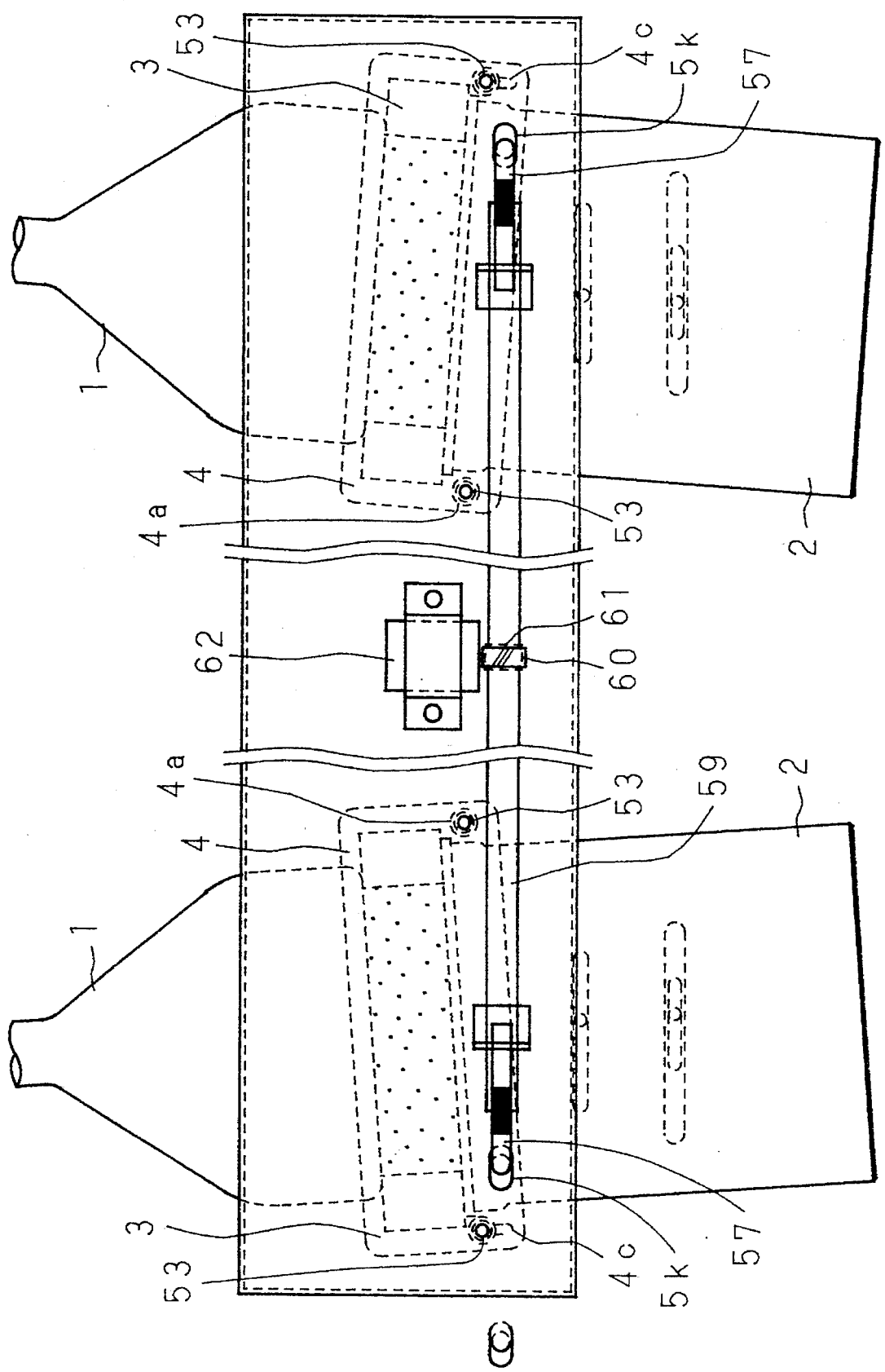
FIG. 89 is a bottom view of the two projection units shown in FIG. 88.

FIG. 88 is a front section view showing two protection units (red and blue projection units at both sides of a unit base 5) of Embodiment 40 of the present apparatus, and FIG. 89 is a bottom view of the embodiment. Holes 4j to be fitted with L-shaped bolts 57 are formed at the front side of a frame base 4 closer to long holes 4c. Long holes 5k correspond to the holes 4j, when the frame base 4 are rotated about respective shaft holes 4a.

The L-shaped bolts 57 are rotatably fitted at one end thereof from below into the holes 4j and 5k. The L-shaped bolts 57 are covered with caps 58. The other ends of the two L-shaped bolts 57 are processed to have threads in the opposite, right and left directions. L-shaped bolts 57 are combined by a rod-like nut 59 having threaded portions at both ends thereof to be meshed with the threads of the bolts 57. The rod-like nut 59 is supported substantially at the center thereof by the unit base 5 via a gear 60 for rotating the rod-like nut 59 and a worm gear 61 which is engaged with the gear 60 and driven by a motor 62. The same components as those of FIG. 69 are designated by the same reference numerals, and their description is omitted.

When the worm gear 61 is rotated by the motor 62, the rod-like nut 59 is rotated. Because of the threads in the opposite directions, the L-shaped bolts 57 are meshed with the rod-like nut 59 in a depth changing symmetrically in the right and left directions. Therefore, the distance between the holes 4j is changed, and the frame bases 4 are rotated with respect to the unit base 5 about the respective shaft holes 4a. Accordingly, the field angle θ1 is equally and continuously changed for each of the red and blue projection units, for example, the field angle is reduced equally and continuously. When the motor 62 is to rotate the rod-like nut 59 in the opposite direction, the field angle θ1 is increased.

Although the description is omitted, it is a matter of course that the configurations of Embodiments 32 to 38 can be combined with the characteristic constitution in Embodiment 33 to 39 may be combined with the configuration of Embodiment 32, that is, to rotate the frame base 4 with using as the rotation shaft the pin 30 formed on the center line in the scanning direction of an image of the projection tube 1. In the embodiment, the long holes 4c and 4j are formed arcuate. However, rectangular holes may be employed so long as the bolts are wide enough to change the field angle. Moreover, although a CRT is used as the image forming means, in the embodiment the other types of image forming means such as an LCD may be used.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A projecting-type display apparatus which magnifies and projects an image onto a screen, comprising:

image forming means for forming the image to be projected onto said screen;

an image forming means frame for holding said image forming means;

a projection lens for magnifying and projecting said image onto said screen;

a lens frame for holding said projection lens;

a flexible fastening member for fastening said image forming means frame to said lens frame;

a cooling liquid filled in a space defined by said image forming means, projection lens, and fastening member; and a holder for rotatably supporting said image forming means frame relative to said lens frame with a shaft, to provide elastic attachment between said frames such that an axis perpendicular to an image display face of said image forming means is inclinable to an optical axis of said projection lens by an arbitrary angle.

2. A projecting-type display apparatus according to claim 1, wherein a rotation fulcrum of said image forming means frame passes through an optical inclination reference point at an intersection of said image display face and an optical axis of said image forming means perpendicular to the image display face, which is inclined with respect to said optical axis of the projection lens.

3. A projecting-type display apparatus according to claim 1, further comprising positioning means for fixing a relative angle between said image forming means frame and said lens frame at any one of a plurality of predetermined angles.

4. A projecting-type display apparatus according to claim 2, further comprising adjusting means for changing the relative angle between said image forming means frame and said holder.

5. A projecting-type display apparatus which magnifies and projects an image onto a screen, comprising:

a projection unit having:

image forming means for forming the image to be projected onto said screen;

an image forming means frame for holding said image forming means;

a projection lens for magnifying and projecting said image onto said screen;

a lens frame for holding said projection lens;

a flexible fastening member for fastening said image forming means frame to said lens frame;

a cooling liquid filled in a space defined by said image forming means, projection lens, and fastening member;

a first holder for rotatably supporting said image forming means frame with a shaft; and a second holder for fixing said image forming means frame and said lens frame, such that said image forming means and said protection lens are elastically connected; and a base for holding said projection unit in which a relative angle between said image forming means frame and said lens frame is fixed, such that an axis perpendicular to an image display face of said image forming means is inclinable to an optical axis of said projection lens by an arbitrary angle.

6. A projecting-type display apparatus which magnifies and projects an image onto a screen, comprising:

image forming means for forming the image to be projected onto said screen;

an image forming means frame for holding said image forming means;

a projection lens for magnifying and projecting said image onto said screen;

a lens frame for holding said projection lens;

a holder for rotatably supporting said image forming means frame relative to said lens frame with a shaft;

a flexible fastening member for fastening said image forming means frame to said lens frame;

a cooling liquid filled in a space defined by said image forming means, projection lens, and fastening member;

a base which fixes said lens frame relative to said holder;

wherein said projection lens and said image forming means are elastically connected such that an axis perpendicular to an image display face of said image forming means is inclinable to an optical axis of said projection lens by an arbitrary angle.

7. A projecting-type display apparatus which magnifies and projects an image onto a screen, comprising:

image forming means for forming the image to be projected onto said screen;

an image forming means frame for holding said image forming means;

a projection lens for magnifying and projecting said image onto said screen;

a lens frame for holding said projection lens;

a flexible fastening member for fastening said image forming means frame to said lens frame;

a cooling liquid which is filled in a space defined by said image forming means, projection lens and fastening member;

a holder for supporting said image forming means frame and said lens frame with a shaft so as to be rotatable relatively to each other thus providing elastic connection between said projection lens and said image forming means; and positioning means for fixing said image forming means frame and said lens frame at a predetermined angle, that an axis perpendicular to an image display face of said image forming means is inclinable to an optical axis of said projection lens by an arbitrary angle.

8. A projecting-type display apparatus according to any one of claims 3, 5, 6, or 7, wherein an outer peripheral wall of said image forming means frame is a curved face.

9. A projecting-type display apparatus which magnifies and projects an image onto a screen, comprising:

image forming means for forming the image to be projected onto said screen;

an image forming means frame for holding said image forming means;

an projection lens for magnifying and projecting said image onto said screen;

a lens frame for holding said projection lens;

a flexible fastening member for fastening said image forming means frame to said lens frame;

a cooling liquid filled in a space defined by said image forming means, projection lens, and fastening member;

a first holder for supporting said image forming means frame with a first shaft in such a manner as to be rotatable within a first plane perpendicular to an optical axis of said projection lens;

a second holder for supporting said first holder with a second shaft in such a manner as to be rotatable within a second plane including said optical axis and perpendicular to said first plane wherein said second holder and said lens frame are formed in an integral body; and a base for holding said second holder, wherein said projection lens is elastically connected to said image forming means such that an axis perpendicular to an image display face of said image forming means is inclinable to said optical axis of the projection lens by an arbitrary angle.

10. A projecting-type display apparatus according to claim 9, further comprising positioning means for setting a relative angle between said first holder and said second holder at any one of a plurality of predetermined angles stepwise.

11. A projecting-type display apparatus according to claim 9, wherein said base includes a rotation mechanism which allows the rotation of a projection unit having said image forming means and said projection lens within said second plane.

12. A projecting-type display apparatus which magnifies and projects an image onto a screen, comprising:

image forming means for forming the image to be projected onto said screen;

an image forming means frame for holding said image forming means;

a projection lens for magnifying and projecting said image onto said screen;

a lens frame for holding said projection lens;

a flexible fastening member for fastening said image forming means frame to said lens frame;

a cooling liquid filled in a space defined by said image forming means, projection lens and fastening member;

a first holder for supporting said image forming means frame with a first shaft in such a manner as to be rotatable within a first plane perpendicular to an optical axis of said projection lens;

a second holder for supporting said first holder with a second shaft in such a manner as to be rotatable within a second plane including said optical axis and perpendicular to said first plane; and a base for rotatably supporting said lens frame, wherein said projection lens and said image display means are elastically connected, such that an axis perpendicular to an image display face of said image forming means is inclinable to said optical axis of said projection lens by an arbitrary angle.

13. A projecting-type display apparatus which magnifies and projects an image onto a screen, comprising:

image forming means for forming the image to be projected onto said screen;

an image forming means frame for holding said image forming means;

a projection lens for magnifying and projecting said image onto said screen;

a lens frame for holding said projection lens;

a flexible fastening member for fastening said image forming means frame to said lens frame;

a cooling liquid which is filled in a space defined by said image forming means, projection lens, and fastening member;

a first holder for supporting said image forming means frame with a first shaft in such a manner as to be rotatable within a first plane perpendicular to an optical axis of said projection lens;

a second holder for supporting said first holder with a second shaft in such manner as to be rotatable within a second plane including said optical axis and perpendicular to said first plane; and a base for rotatably supporting said lens frame about said first shaft wherein said projection lens is elastically connected to said image forming means, such that an axis perpendicular to an image display face of said image forming means is inclinable to the optical axis of the projection lens by an arbitrary angle.

14. A projecting-type display apparatus according to claim 13, wherein said base comprises positioning means for setting a relative angle between said base and said lens frame at any one of a plurality of predetermined angles.

15. A projecting-type display apparatus which magnifies and projects an image onto a screen, comprising:

image forming means for forming the image to be projected onto said screen;

an image forming means frame for holding said image forming means;

a projection lens for magnifying and projecting said image onto said screen;

a lens frame for holding said projection lens;

a flexible fastening member for fastening said image forming means frame to said lens frame; and a cooling liquid filled in a space defined by said image forming means, projection lens, and fastening member, and a plurality of stepped bolts inserted between said image forming means frame and said lens frame to elastically fasten said frames to each other.

16. A projecting-type display apparatus according to claim 15, wherein said stepped bolts have different lengths.

17. A projecting-type display apparatus according to claim 15, wherein said stepped bolts are used in a combination with washers, having a fixed length, whereas the thickness of is made different.

18. A projecting-type display apparatus according to claim 15, wherein said image forming means frame and/or said lens frame are provided with a plurality of insertion holes different in thickness, whereby said stepped bolts of a fixed length are selectively inserted into said insertion holes.

19. A projecting-type display apparatus which magnifies and projects an image onto a screen, comprising:

image forming means for forming the image to be projected onto said screen;

an image forming means frame for holding said image forming means;

a projection lens for magnifying and projecting said image onto said screen;

a lens frame for holding said projection lens;

a flexible fastening member for fastening said image forming means frame to said lens frame; and a cooling liquid filled in a space defined by said image forming means, projection lens, and fastening member, and a plurality of spacers inserted between said image forming means frame and said lens frame, said image forming means frame and/or said lens frame having a stepped-thickness at an interior surface of four corners of said frames to elastically fasten said frames to each other.

20. A projecting-type display apparatus according to claim 19, wherein an insertion portion of each of said spacers is a spherical shape.

21. A projecting-type display apparatus according to claim 19, wherein an insertion portion of each of said spacers is polygonal of an even number in cross section differing in the distance between two opposed sides of said polygon from each other, so that the distance between said image forming means frame and said lens frame is changed by rotating said insertion portion of each of said spacers about a shaft.

22. A projecting-type display apparatus which magnifies and projects and images onto a screen, comprising:

image forming means for forming the image to be projected onto said screen;

a projection lens the magnifying and projecting said image onto said screen;

a frame for holding said image forming means and said projection lens;

a frame base securely fixed to one face of said frame;

a unit base for supporting said frame base with a shaft in such a manner as to be rotatable with respect to said screen in a direction to change a field angle defined by an optical axis of said projection lens to said screen; and positioning means for fixing said frame base at said field angle incorporated in both said frame base and said unit base.

23. A projecting-type display apparatus according to claim 22, wherein said positioning means comprises a long hole formed at a position separated from a rotation shaft of said frame base, and an engaging member to be engaged with said long hole is provided in said unit base.

24. A projecting-type display apparatus according to claim 22, wherein said positioning means comprises a plurality of fitting portions formed at a side portion of said frame base separated from a rotation shaft, while a positioning member is set in said unit base to determine a rotation angle of said frame base with respect to said unit base when selectively fitted in one of said fitting portions.

25. A projecting-type display apparatus according to claim 22, wherein said positioning comprises a hole having a decreasing diameter formed in said frame base at a position separated from a rotation shaft of said frame base, an engaging stopper being inserted in said hole in a manner to be partly exposed from said hole, and further comprising a plurality of holes formed in said unit base and separated the same distance from a rotation shaft as that of said shaft to said hole, so that said exposed part of said engaging stopper is fitted into said hole of the unit base.

26. A projecting-type display apparatus according to claim 22, wherein said positioning means comprises:

a polygonal cam which is rotatably supported with a shaft at an eccentric position by said unit base, having a plurality of faces, and means for pressing said frame base into contact with said polygonal cam, wherein one of said plurality of faces of the polygonal cam is selectively held in contact with said frame base by the rotation of said polygonal cam.

27. A projecting-type display apparatus according to claim 22, wherein said positioning means comprises:

a spacer having portions of different thicknesses;

means for pressing said frame base into contact with said spacer in the rotating direction of said frame base, and a hole formed in said unit base to receive said spacer.

28. A projecting-type display apparatus according to claim 22, wherein said positioning means comprises a plurality of holes formed at positions separated from a rotation shaft of said unit frame base, while said base includes a positioning member to be selectively fitted into said holes, and means for elastically pressing said positioning member against said frame base.

29. A projecting-type display apparatus according to claim 22, wherein said positioning means comprises:

a lever having a fulcrum rotatably set in said unit base, and one end engaged with said frame base, wherein a plurality of recesses are formed in said unit base to be selectively meshed with the other end of said lever.

30. A projecting-type display apparatus according to claim 27, wherein said positioning means comprises:

a pair of L-shaped bolts having ends threaded in the opposite directions;

a rod-like nut having both ends threaded in different directions to be meshed with one end of each of said L-shaped bolts; and means for rotating said rod-like nut fixed to said unit base, wherein the other ends of said L-shaped bolts are rotatably held by said frame base, so that the angle of said frame base to said unit base is changed by rotating said rod-like nut.

31. A projecting-type display apparatus according to claim 22, wherein a rotation shaft of said frame base is on a center line in a main scanning direction of an image formed by said image forming means.

32. A projection-type display apparatus according to claim 24, wherein a mark to confirm the field angle is formed in the vicinity of said plurality of fitting portions separated from a rotation shaft of said frame base.

33. A projecting-type display apparatus which magnifies and projects an image onto a screen, comprising:

image forming means for forming the image to be projected onto said screen;

an image forming means frame for holding said image forming means;

a projection lens for magnifying and projecting said image onto said screen;

a lens frame for holding said projection lens;

a flexible fastening member for fastening said image forming means frame to said lens frame; and a cooling liquid filled in a space defined by said image forming means, projection lens, and fastening member, and a plurality of spacers inserted between said image forming means frame and said lens frame, an insertion portion of each of said spacers being polygonal of an even number in cross section, differing in the distance between two opposite sides of said polygon from each other, so that the distance between said image forming means frame and said lens frame is changed by rotating said insertion portion of each of said spacers about a shaft and said frames are elastically fastened to each other.

* * * * *